US011127099B2

(12) United States Patent
Eidelman et al.

(10) Patent No.: US 11,127,099 B2
(45) Date of Patent: Sep. 21, 2021

(54) SYSTEMS AND METHODS FOR PREDICTING FUTURE EVENT OUTCOMES BASED ON DATA ANALYSIS

(71) Applicant: FiscalNote, Inc., Washington, DC (US)

(72) Inventors: Vladimir Eidelman, Chevy Chase, MD (US); Brian Grom, Lake Worth, FL (US); Daniel Argyle, Alexandria, VA (US); Jervis Pinto, Silver Spring, MD (US)

(73) Assignee: FiscalNote, Inc., Washington, DC (US)

( * ) Notice: Subject to any disclaimer, the term of this patent is extended or adjusted under 35 U.S.C. 154(b) by 310 days.

(21) Appl. No.: 15/494,390

(22) Filed: Apr. 21, 2017

(65) Prior Publication Data

US 2017/0308976 A1 Oct. 26, 2017

Related U.S. Application Data

(60) Provisional application No. 62/326,618, filed on Apr. 22, 2016.

(51) Int. Cl.
*G06Q 50/26* (2012.01)
*G06Q 10/06* (2012.01)
(Continued)

(52) U.S. Cl.
CPC .......... *G06Q 50/26* (2013.01); *G06F 3/0482* (2013.01); *G06F 3/04847* (2013.01);
(Continued)

(58) Field of Classification Search
CPC ..................................................... G06Q 50/26
See application file for complete search history.

(56) References Cited

U.S. PATENT DOCUMENTS 7,260,773 B2 8/2007 Zernik
7,657,493 B2 2/2010 Meijer et al.
(Continued)

OTHER PUBLICATIONS

How the FiveThirtyEight Senate Forecast Model Works, Sep. 17, 2014.*

(Continued)

*Primary Examiner* — Aryan E Weisenfeld
(74) *Attorney, Agent, or Firm* — Finnegan, Henderson, Farabow, Garrett & Dunner, LLP

(57) ABSTRACT

A hybrid prediction system may aggregate electronic data to identify and initially predict an outcome of a future event and subsequently update the initial prediction. The system may include at least one processor and a memory. The processor may access data scraped from the Internet. The data may be associated with at least one future event. The processor may further store the scraped data, determine, from the scraped data, an initial prediction of the outcome of the at least one future event, generate, from the scraped data, an initial likelihood indication associated with the initial prediction, and transmit the initial prediction and the initial likelihood indication to a device associated with one or more users. The processor may further receive proprietary information, store the proprietary information, determine, using the scraped data and the proprietary information, a subsequent likelihood indication, and transmit the subsequent likelihood indication to the device.

23 Claims, 60 Drawing Sheets

(51) Int. Cl.

| | |
|---|---|
| *G06F 16/28* | (2019.01) |
| *G06F 16/33* | (2019.01) |
| *G06F 40/30* | (2020.01) |
| *G06F 40/205* | (2020.01) |
| *G06F 40/263* | (2020.01) |
| *G06N 5/02* | (2006.01) |
| *G06Q 50/18* | (2012.01) |
| *G06F 3/0482* | (2013.01) |
| *G06F 3/0484* | (2013.01) |
| *G06N 5/04* | (2006.01) |
| *G06N 20/00* | (2019.01) |
| *G06F 16/95* | (2019.01) |
| *G06T 11/20* | (2006.01) |

(52) U.S. Cl.
CPC ........ *G06F 16/288* (2019.01); *G06F 16/3331* (2019.01); *G06F 40/205* (2020.01); *G06F 40/263* (2020.01); *G06F 40/30* (2020.01); *G06N 5/022* (2013.01); *G06N 5/04* (2013.01); *G06Q 10/06375* (2013.01); *G06Q 50/18* (2013.01); *G06F 16/95* (2019.01); *G06N 20/00* (2019.01); *G06Q 2230/00* (2013.01); *G06T 11/206* (2013.01); *G06T 2200/24* (2013.01)

(56) References Cited

U.S. PATENT DOCUMENTS

| | | | |
|---|---|---|---|
| 8,117,209 | B1 | 2/2012 | Dean et al. |
| 8,160,977 | B2 | 4/2012 | Poulin |
| 8,171,038 | B2 | 5/2012 | Tomicki et al. |
| 8,706,659 | B1 | 4/2014 | Mann et al. |
| 8,793,781 | B2 | 7/2014 | Grossi et al. |
| 9,436,726 | B2 | 9/2016 | Matthews |
| 9,602,559 | B1 | 3/2017 | Barros et al. |
| 2002/0107698 | A1 | 8/2002 | Brown et al. |
| 2008/0033929 | A1 | 2/2008 | Al-Kofahi et al. |
| 2011/0191335 | A1 | 8/2011 | Miller et al. |
| 2012/0310841 | A1 | 12/2012 | Payne |
| 2015/0106170 | A1* | 4/2015 | Bonica ................ G06F 17/3053 705/12 |

OTHER PUBLICATIONS

Rasmussen Account Benefits, Mar. 21, 2015.*
Silver 2012.*
Smith (Year: 2012).*
270toWin (Year: 2016).*
Gerrish Sean M. et al., Predicting Legislative Roll Calls from Text, Department of Computer Science, Princeton University, 2011, pp. 1-11.
Gerrish, Sean M, et al., How They Vote: Issue-Adjusted Models of Legislative Behavior, 26th Annual Conference on Neural Information Processing Systems, 2012, pp. 1-17.
Sebastiani, Fabrizio, Machine Learning in Automated Text Categorization, ACM Computing Surveys, vol. 34, No. 1, Mar. 2002, pp. 1-47.
Wang, Jun et al., Legislative Prediction via Random Walks over a Heterogeneous Graph, Business Analytics and Mathematical Sciences Department, IBM Thomas J. Watson Research Center, 2012, pp. 1095-1106.
Yano, Tae et al., Textual Predictors of Bill Survival in Congressional Committees, 2012 Conference of the North American Chapter of the Association for Computational Linguistics: Human Language Technologies, Jun. 3-8, 2012, pp. 793-802.
FiscalNote "Prophecy," dated Dec. 11, 2013 (7 pgs.).
"Government Relations Use Case," dated Dec. 16, 2013 (2 pgs.).
FiscalNote Prophecy "Unlocking Legislative Data and Making it Useful for Government Affairs Professionals," dated Feb. 19, 2014 (1 pg.).
FiscalNote Prophecy "Applying Real-time Analytics to Make Government Data Actionable," dated Feb. 26, 2014 (12 pgs.).
"FiscalNote Prophecy For Academia," dated May 19, 2015 (1 pg.).
FiscalNote "Predictive Analytics for Legislation & Regulation," dated Jul. 17, 2015 (21 pgs.).
Prophecy—FiscalNote "Legislative Data, Analyzed," dated Aug. 14, 2015 (2 pgs.).
Prophecy Premium—FiscalNote "For Ultimate Effectiveness," dated Aug. 14, 2015 (1 pg.).
FiscalNote Sonar "Regulatory Tracking and Analytics," dated Aug. 14, 2015 (14 pgs.).
Sonar—FiscalNote "Regulatory Data, Redefined," dated Aug. 14, 2015 (2 pgs.).
FiscalNote "Using Document-Analysis to Provide Insights," dated Aug. 14, 2015 (8 pgs.).
FiscalNote "Legislative and Regulatory Analytics," dated Aug. 14, 2015 (23 pgs.).
FiscalNote "Take Control of Your Government Affairs Strategy," dated Sep. 16, 2015 (34 pgs.).
FiscalNote Sonar "Regulatory Tracking and Analytics," dated Sep. 17, 2015 (14 pgs.).
"Legislator Scorecard," dated Sep. 29, 2015 (2 pgs.).
Sonar "Regulatory Data, Redefined," dated Sep. 29, 2015 (2 pgs.).
Prophecy Premium "Prophecy Premium Goes Beyond Tracking and Analysis, with Powerful Tools for Reaching out and Getting Results," dated Sep. 29, 2015 (1 pg.).
Prophecy Plus "Prophecy Plus Combines Legislative Tracking with Revolutionary Predictive Analytics to Keep You One Step Ahead," dated Sep. 29, 2015 (1 pg.).
Prophecy Basic Discovery & Tracking "Prophecy Basic Puts Everything you Need to Find and Track Relevant Legislation in One, Simple Place," dated Sep. 29, 2015 (1 pg.).
FiscalNote Prophecy, "Track Legislation Across all 50 States D.C. and Congress," dated Jan. 13, 2016 (1 pg).
Prophecy Mailing List "Create Highly Targeted Lists in Minutes/ Prophecy Keeps Your Lists up to Date Automatically," dated Jan. 13, 2016 (1 pg.).
FiscalNote—Data Indexing, "Centralizing open data from over 100 scattered government sources into one user friendly platform," dated Mar. 21, 2016 (1 pg.).
FiscalNote "Using Natural Language Processing and Machine Learning to Forecast Legislative Outcomes," dated Aug. 14, 2015 (10 pgs.).
FiscalNote "Data Science in the World of Policy," dated Sep. 22, 2015 (16 pgs.).
"Prophecy Legislator Analytics," dated Sep. 25, 2015 (2 pgs.).
"How Educated Algorithms Give Us Insightful Answers," dated Sep. 30, 2015 (9 pgs.).
FiscalNote "Using Document Analysis to Provide Insights," dated Sep. 30, 2015 (6 pgs.).
FiscalNote "The 'Moneyball Approach to Capitol Hill,'" dated Oct. 2, 2015 (6 pgs.).
FiscalNote "Determining Sentiment on Federal Regulations," dated Oct. 12, 2015 (8 pgs.).
"Legislator Scorecard™," dated Oct. 26, 2015 (1 pg.).
Fiscal Note "FiscalNote and the Three Types of Analytics," dated Apr. 14, 2016 (13 pgs.).
FiscalNote "Taking Control of Regulatory Risk Can Have Large Return on Investment," dated Jun. 14, 2016 (5 pgs.).
FiscalNote "Aggregating Data into a Unified Platform," dated Jun. 14, 2016 (7 pgs.).
FiscalNote "The Buyer's Guide to Legislative Tracking Tools," dated Sep. 22, 2015 (6 pgs.).
Prophecy Discussion, Prophecy Basic, Plus & Premium "Keep Everyone on your Team Informed . . . " dated Sep. 25, 2015 (1 pg.).
FiscalNote "5 Reasons to Use a Legislative Tracking Service," dated Sep. 30, 2015 (4 pgs.).
FiscalNote "How to Plan a Fly-In Day with FiscalNote," dated Sep. 30, 2015 (5 pgs.).
Marketplace "FiscalNote offers our subscribers industry-leading analysis . . . ," dated Jan. 13, 2016 (2 pgs.).
FiscalNote Professional Services "Legislator Scorecard," dated Jan. 27, 2016 (2 pgs.).

(56) References Cited

OTHER PUBLICATIONS

Atlantis State Regulations, Simplified "Need Easily Accessible State Regulatory Data . . . ," dated Feb. 18, 2016 (1 pg.).
FiscalNote Discussions "Keep Everyone on Your Team Informed . . . ," dated Apr. 22, 2016 (1 pg.).
FiscalNote Actions "Log Efforts Made and Stay in Sync with Team Strategies," dated Apr. 22, 2016 (1 pg.).
FiscalNote Notes "Record Information, Intelligence and Strategy," dated Apr. 22, 2016 (1 pg.).
"Forecasting Legislative Outcomes," dated Apr. 26, 2016 (4 pgs.).
FiscalNote Collaboration Tools "Everything You Need to Strategize with Your Team, All in One Place," dated May 24, 2016 (1 pg.).
Defendant's Opening Brief in support of Motion to Dismiss for Lack of Patentable Subject Matter Under Fed. R. Civ. P. 12(b)(6) in *FiscalNote, Inc. v. Quorum Analytics, Inc.*, Case No. 1:20-cv-01736-LPS (D. Del.), Mar. 15, 2021 (26 pages).
Plaintiff's Answering Brief in opposition of Motion to Dismiss for Lack of Patentable Subject Matter Under Fed. R. Civ. P. 12(b)(6) in *FiscalNote, Inc. v. Quorum Analytics, Inc.*, Case No. 1:20-cv-01736-LPS (D. Del.), Apr. 8, 2021 (25 pages).
Defendant's Reply Brief in support of Motion to Dismiss for Lack of Patentable Subject Matter Under Fed. R. Civ. P. 12(b)(6) in *FiscalNote, Inc. v. Quorum Analytics, Inc.*, Case No. 1:20-cv-01736-LPS (D. Del.), Apr. 22, 2021 (16 pages).
Order granting Defendant's Motion to Dismiss for Lack of Patentable Subject Matter Under Fed. R. Civ. P. 12(b)(6) in *FiscalNote, Inc. v. Quorum Analytics, Inc.*, Case No. 1:20-cv-01736-LPS (D. Del.), Jul. 2, 2021 (19 pages).

\* cited by examiner

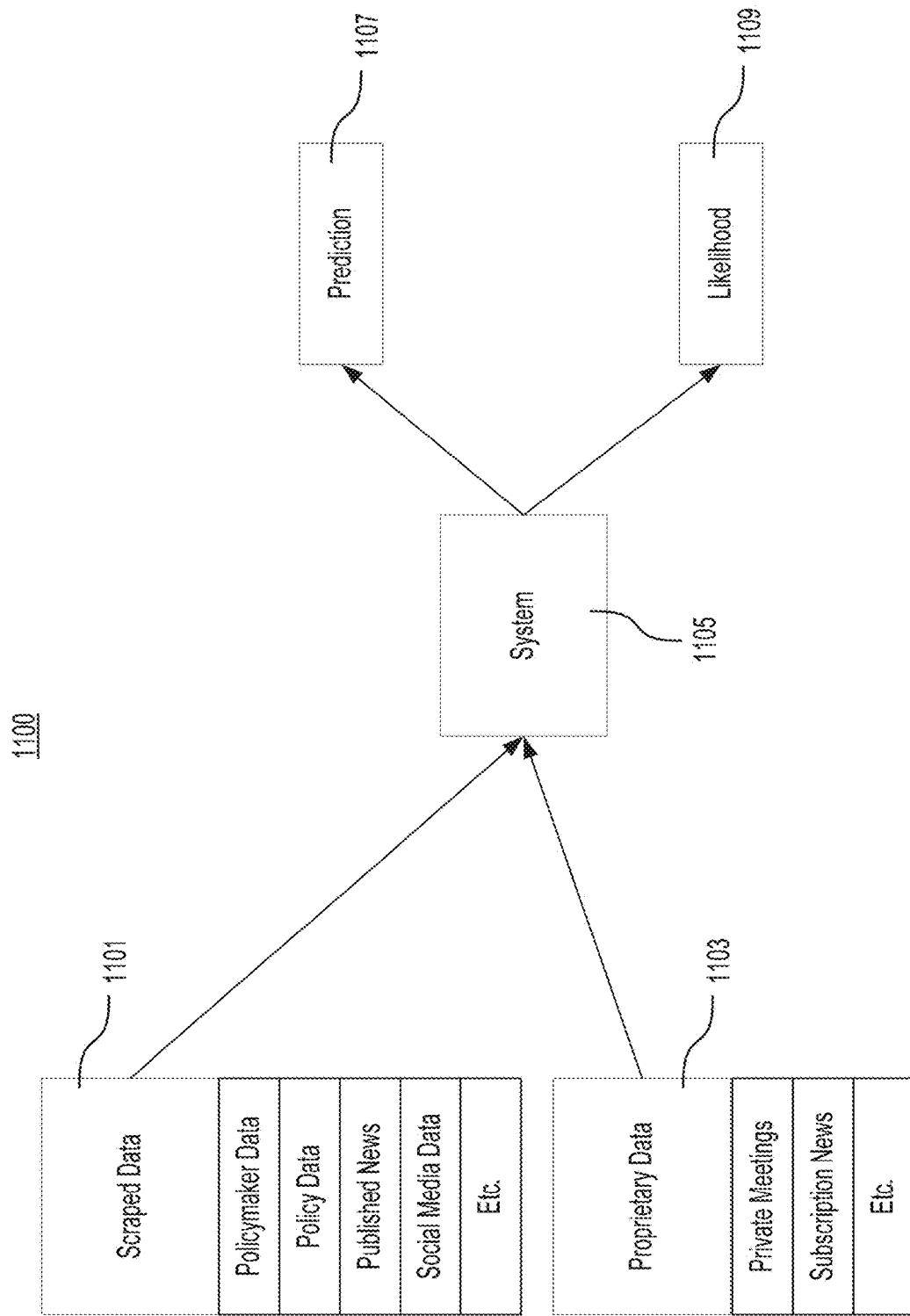

Passed Senate
Jan 19, 2017

Introduced
Dec. 15, 2016

Jan 19, 2017
3rd Reading:Passed 29-1-0-0-0

Jan 18, 2017
2nd Reading:Passed

Jan 17, 2017
S02 – Appropriations:Recommend Do Pass 4-0-1-0-0
Placed on General File
COW:Passed Jan 11, 2017
S04 – Education:Recommend Do Pass 4-0-1-0-0
Refer to S02 – Appropriations Jan 10, 2017
Introduced and Referred to S04 - Education Jan 9, 2017
Received for Introduction Dec 15, 2016
Bill Number Assigned Collapse

| Projects | | | | | |
|---|---|---|---|---|---|
| + New Project  Search issues... | | | | | Showing 6 of 10 columns |
| ☐ Project Name | Lead | Labels | Impact | Status | Last Action |
| ☐ EU Privacy Directive 2016/680 | Spencer M. | Drug Pricing  Privacy  +1 | -$117M | First Reading | Phone Call - Preparing for...  Mar 21, 2017 3:30 PM \| Candance |
| ☐ TTIP | Crystal Y. | Privacy | +$103M | Implementation | Phone Call - Preparing for...  Mar 7, 2017 3:30 PM \| Candance |
| ☐ EU Directive on Cybersecurity and... | John Z. | Int'l Trade  +1 | +$98M | Consultation | Uploaded Talking Points \| John |
| ☐ Export Ban | Amanda W. | Int'l Trade | +$86M | Implementation | Meeting - Preparing for...  Feb 2, 2017 3:00 PM \| Candance |
| ☐ Endangered Species Act | Manuela R. | Int'l Trade | +$91M | First Reading | Uploaded Talking Points \| John |
| ☐ EU Directive on Supply Chain and... | Trent L. | Int'l Trade | -$74M | First Reading | Updated Weekly  Legislative Report \| Trent |
| ☐ Generic Drug Sales | Mike P. | Privacy | -$52M | Consultation | Uploaded Talking Points \| Mike |

FIG. 16D

Basic Information — WV HB 2518

STATE LEGISLATION > Bills > HR

1650

WATCH | ACTIONS | NOTES | SHARE

Outlook

Compared to other bills in West Virginia, this bill is much more likely to pass.

We calculated this based on the strength of the bill sponsor, the language in the bill, and the network of the co-sponsor.

- A referred committee has given a favorable recommendation
- The primary sponsor has a significant negative effect
- The cosponsorship effect is mixed
- The language in this bill has a considerably negative effect
- A number of assorted factors make this bill less likely to pass Click to Hide Analytics

| House Pre-Floor Score | House Floor Score | Senate Pre-Floor Score | Senate Floor Score |
|---|---|---|---|
| 94.9% | 78.8% | 5.9% | 78.8% |

| | |
|---|---|
| TITLE | Creating a legislative rule to permit a pharmacist or pharmacy intern to administer certain immunization |
| CATEGORIES | Health, Crime, Labor & Employment |
| BILL SUMMARY | *Enter your bill summary* / |
| BILL SUMMARY | ☐ Engrossed Version |

Chamber and Session Information

| | |
|---|---|
| SESSION DATES | Feb 8, 2018 - Apr 8, 2018 |
| SESSION | 2018 Regular Session 15 days left in session |
| CHAMBER | WV House |

Sponsors and Cosponsors  ✉ Email Sponsors

| | |
|---|---|
| PRIMARY SPONSORS | Joe Smith |
| BREAKDOWN | 1 Republican |
| CO-SPONSORS | Amy Margaret Johnson (R)  Matthew O'Reilly (R)  Ruth Miller (R)  show all (5) |
| BREAKDOWN | 5 Republicans |

Documents and Similar Bills

| | |
|---|---|
| BILL VERSIONS | ☐ Engrossed Version  ☐ Introduced Version |
| | Compare Bill Versions |
| AMENDMENTS | ☐ Committee Amendment: HB2518 H HR AM 2-23  ☐ Floor Amendment: HB2518 HFA SMITH 1  ☐ Floor Amendment: HB2518 HFA 1 |

Timeline

Current Status of WV HB 2518: In Senate

In Senate ●

Mar 15, 2018
☐ To Health and Human Resources
☐ Introduced in Senate
☐ House Message received ☐ WV HB 2518  ☐ All Discussions

| STATE LEGISLATION ▾ | HR | | | | |
|---|---|---|---|---|---|
| Legislators | | | | | Search |
| Del. Joe Smith (R) | CHAMBER<br>WV House | REELECTION YEAR<br>2020 | AVG BILLS INTRODUCED<br>17/session | ACTIONS | NOTES | SHARE |

Committees | Caucuses 2018-2018 ▾

Member of 11 Committees

House Committee on Health and Human Resources
Position: Chair

Joint Committee on Health
Position: Chair

Joint Interim Legislative Oversight Commission on Health and Human Resources Accountability
Position: Chair

House Select Committee on Prevention and Treatment of Substance Abuse
Position: Chair Expand

Legislators similar to Del. Smith

Sort by: Overall ▾ | Voting ▾ | ↓ Desc ▾

| Name | Chamber | District | Voting | Cosponsorship |
|---|---|---|---|---|
| Eric Jones III (R) | House | WV001 | 99% | 52% |
| Michael McGrat (R) | House | WV051 | 99% | 54% |
| Celia Stone (R) | House | WV033 | 98% | 53% |
| Leroy Lindsay (R) | House | WV036 | 98% | 53% |
| Billy Bob McCutchen (R) | House | WV049 | 98% | 55% |
| Kayla Thompson (R) | House | WV032 | 98% | 56% |
| Sara Minstein (R) | House | WV035 | 98% | 55% |
| Larry Cohen (R) | House | WV017 | 98% | 58% |
| Shermon Smith (R) | House | WV059 | 98% | 53% |

Expand

Top Policy Issues

Del. Smith is in the top 16% of legislators in the WV House, so they are very effective as a primary sponsor, particularly on legislation related to health, food & beverage, and crime.

■ Joe Smith   ■ All Discussions

Sponsored Bills 11 Total Bills

🔍 Search Bills

● Watch ▾ | ↓ Export ▾

☐ ¡ Selected ▾

| ☐ | BILL NUMBER | SESSION | FN Outlook |
|---|---|---|---|

Compared to other bills in California, this bill is less likely to pass.

We calculated this based on the strength of the bill sponsor, the language in the bill, and the network of the cosponsors.

The language in this bill has a considerably positive effect, particularly "increasing subsidies for agricultural development"
The referred committee, Senate Judiciary, has given a favorable recommendation
There are no cosponsors to support the bill
The primary sponsor, Mary Jordan, has a very significant negative effect.

Recommended Action:
We predict there is a 67% chance you support this bill.
We recommend finding additional senior cosponsors on the referred committee to increase the passage likelihood.

Contact: Senator Rob Smith    Senator Kevin Bloom

We predict several legislators are undecided and can vote either way. We recommend ensuring their support to bring additional votes.
Contact: Senator Julie Andrews    Senator John Sammy

| | SENATE PASSAGE | | SENATE PASSAGE | |
|---|---|---|---|---|
| 37% likely to vote yes. Improves 3 voters by up to 13% | 53.5% | 87.7% | 56% likely to vote yes. Improves 6 voters by up to 15% | 42.1% | 92.5% |

Votes

2210

Watched Bills | All

Search for a specific bill number

| Bill Number | Session | Priority | Position | Vote | Alignment With Me |
|---|---|---|---|---|---|
| US S 89 | 17-18 RS | ⇆ | 👍 | NO | ✓ |
| US HJRES 43 | 17-18 RS | ← | 👎 | NO | ✓ |
| US HJRES 67 | 17-18 RS | → | 👍 | NO | ✗ |
| US SJRES 34 | 17-18 RS | → | 👎 | NO | ✓ |
| US HJRES 83 | 17-18 RS | — | — | NO | ? |
| US HJRES 69 | 17-18 RS | — | — | NO | ? |

Comment Deadline
Sep 30, 2013 at 11:59 PM ET

Basic Information
Attachments

- Regulation
- total fat comments draft FINAL
- Competitive Foods Interim Rule Comments on Total Fat Final CSPI 9-26-16
- Academy Comments to USDA re Total Fat Competitive Foods FINAL
- 2016_ MSDE OSCNP Comments_ Total Fat in Smart Snacks Final Rule 9.27.16
- CDE Comments_FNS-2011-0019
- Regulation
- Capstone DemonstrationonPoliciesandRegulationsNationalSchoolProgramandBreakfastProgram
- Attachment1_Sabra Citizen Response to RIN 0584-AE09
- Academy Comments to USDA re Total Fat Competitive Foods FINAL
- Attachment1_Sabra Citizen Response to RIN 0584-AE09
- Academy Comments to USDA re Total Fat Competitive Foods FINAL
- 2016_ MSDE OSCNP Comments_ Total Fat in Smart Snacks Final Rule 9.27.16
- CDE Comments_FNS-2011-0019
- Attachment1_Sabra Citizen Response to RIN 0584-AE09
- Academy Comments to USDA re Total Fat Competitive Foods FINAL
- 2016_ MSDE OSCNP Comments_ Total Fat in Smart Snacks Final Rule 9.27.16
- CDE Comments_FNS-2011-0019

September 30, 2013

Division of Dockets Management ( HFA-305)
Food and Drug Administration
5630 Fisher Lane, Room 1061
Rockville, MD 20852

Re: Docket No. FDA-2013-D-920
Select Updates for Non-Clinical Engineering Tests and Recommended Labeling for Intravascular Stents and Associated Delivery Systems Dear Sir or Madam:

We submit these comments on behalf of Cook Group Inc. (Cook). Cook is a privately held group of domestic and international corporations engaged in the manufacture of diagnostic and therapeutic products for use in various medical specialties including radiology, cardiology, vascular surgery, critical care, gastroenterology, women's health, urology, wound care and surgery. Cook sells more than 14,000 different product variations. Our company employs about 11,000 people around the world. Eight thousand of those are based in the United States. While more than 55 percent of our products are sold outside the United States, 80 percent are manufactured in this country.

We thank the food and Drug Administration (FDA) for the opportunity to provide comments on the
recently issued document, *Draft Guidance for Industry and Food and Drug Administration Staff Select Updates for Non-Clinical Engineering Tests and Recommended Labeling for Intravascular Stents and Associates Delivery Systems*.

General Comments

This draft guidance provides information on the expectations of the FDA related to corrosion and nickel release testing of stents. Based on decades of experience in developing, testing, and commercializing intravascular stents, Cook considers the proposed extent of attention and effort related to corrosion and

3401

( This section will most likely not change )

( Back to Top )

3403

| | Search comment text or comment ID | | | | |
|---|---|---|---|---|---|
| Published Date | Organization | Submitter | Sentiment | Analysis | Attachments |
| Nov 27, 2015 | Nitinol Devices | Tom Sawyer | Oppose | Negative | 0 |
| Nov 27, 2015 | Cook Group Inc. | B. Thatcher | Support | Positive | 1 |
| Oct 29, 2013 | WL Gore & Assoc. | Huck Finn | Neither | Neither | 8 |
| Oct 18, 2013 | AMT Association | B. Wayne | Support | Positive | 12 |
| Oct 18, 2013 | Boston Scientific | D. Prince | Support | Positive | 99 |

SYSTEMS AND METHODS FOR PREDICTING FUTURE EVENT OUTCOMES BASED ON DATA ANALYSIS

CROSS REFERENCE TO RELATED APPLICATION

This application claims the benefit of priority of U.S. Provisional Patent Application No. 62/326,618, filed Apr. 22, 2016, which is incorporated herein by reference in its entirety.

BACKGROUND

Technical Field

This disclosure generally relates to systems and methods for formulating predictions and conducting analyses relating to policymaking. More specifically, and without limitation, the present disclosure relates to systems and methods for automatically predicting outcomes of and analyzing documents related to legislative, regulatory, and judicial processes.

Background Information

Organizations often follow policy making processes to best strategize how to promote their interests within a governmental unit. For example, an organization might have particular interest in the outcome of a particular policymaking process that might affect the organization's day-to-day operations. One approach used by organizations is to monitor and conduct qualitative and quantitative analysis on the impact various outcomes of the policymaking process may have on the organizations' interests. A second approach is to provide direct or indirect input to policymakers through outreach, advocacy, and educational initiatives. However, understanding what a policymaking process will impact is very difficult without specialized knowledge. One approach for providing input is through the use of a lobbyist. However, traditional lobbyists are often expensive and may specialize at one level of government, for example, federal, state, local, etc. Furthermore, the sheer volume of policymaking and quantity of information involved in each policymaking process across different levels and governmental entities can make it impractical for an internal analyst or a lobbyist to monitor, track, and participate in potentially relevant policymaking initiatives. Manual analysis of policymaking requires a significant investment of time and financial resources with the difficulty of consistently and objectively collating related information while simultaneously accounting for multiple possible outcomes across different affected areas of interest.

With the emergence of the Internet, some algorithms have been developed that can track policymaking processes and predict policy outcomes. However, existing algorithms are typically limited to one level of government and/or one governmental unit. For example, govtrack.us provides a database limited to federal policies in the U.S. Congress. Further, existing tools are often limited in that they do not provide any analysis or context for the vast quantities of materials stored in disparate databases.

Another drawback is the simplicity of many existing algorithms. For example, applying a principal components analysis (PCA), which is a statistical process that uses an orthogonal transformation to convert a set of observations (in this case, policymaking outcomes and possible causes) into a set of linearly uncorrelated variables, based on co-sponsorship and/or voting records does not account for more complex indicators of political position. Similarly, logistic regression is only as accurate at predicting outcomes as the predetermined factors and weights that are input into the regression. Such algorithms often fail to dynamically adjust in light of news, comments, or changing positions of certain policymakers, or other variables that affect policymaking. Accordingly, there is a need for improved aggregation techniques coupled with analysis that is both multi-variate and dynamic.

SUMMARY

Embodiments consistent with the present disclosure provide systems and methods that incorporate machine-learning and data aggregation techniques to provide policymaking analyses and predictions. The policymaking analyses and predictions may encompass a wide range of policymaking processes (e.g., legislative, regulatory, and judicial processes) and may provide more accurate and targeted predictions.

There are many possible applications for such capabilities. For example, organizations that cannot afford analysts, government relations experts, or traditional lobbyists and organizations that engage in in-house lobbying may benefit from the disclosed systems and methods. In addition, the disclosed systems and methods may eliminate redundancies when analyzing data across governmental levels and units.

According to an aspect of the present disclosure, a hybrid prediction system is disclosed for aggregating electronic data from at least one Internet server and proprietary data, to identify and initially predict an outcome of a future event and to subsequently update the initial prediction. The system may comprise at least one processor configured to execute instructions and a memory storing the instructions. The instructions may comprise instructions to access data scraped from the Internet. The data may be associated with at least one future event. The instructions may further comprise instructions to store the scraped data and determine, from the scraped data, an initial prediction of the outcome of the at least one future event. The instructions may further comprise instructions to generate, from the scraped data, an initial likelihood indication associated with the initial prediction and transmit the initial prediction and the initial likelihood indication to a device. The device may be associated with one or more users. The instructions may further comprise instructions to receive proprietary information, store the proprietary information, and determine, using the scraped data and the proprietary information, a subsequent likelihood indication. The subsequent likelihood indication may reflect a change in the initial likelihood associated with the initial prediction. The instructions may further comprise instructions to transmit the subsequent likelihood indication to the device.

According to another aspect of the present disclosure, a method is disclosed for aggregating electronic data from at least one Internet server and proprietary data to identify and initially predict an outcome of a future event and to subsequently update the initial prediction. The method may comprise accessing data scraped from the Internet. The data may be associated with at least one future event. The method may further comprise storing the scraped data and determining, from the scraped data, an initial prediction of the outcome of the at least one future event. The method may further comprise generating, from the scraped data, an initial likelihood indication associated with the initial prediction and transmitting the initial prediction and the initial likelihood indication to a device. The device may be associated with one or more users. The method may further comprise receiving proprietary information, storing the proprietary information, and determining, using the scraped data and the proprietary information, a subsequent likelihood indication. The subsequent likelihood indication may reflect a change in the initial likelihood associated with the initial prediction. The method may further comprise transmitting the subsequent likelihood indication to the device.

According to another aspect of the present disclosure, a system is disclosed for normalizing aggregated electronic data from at least one Internet server. The system may comprise at least one processor configured to execute instructions and a memory storing the instructions. The instructions may comprise instructions to access data scraped from the Internet. The scraped data may have been gathered from a plurality of local databases for a plurality of temporal local milestones. Each local database may store localized terms for characterizing the temporal local milestones, such that at least a first localized term for at least a first temporal milestone in a first local database associated with a first locale differs from at least a second localized term for a similar second temporal milestone in a second localized database associated with a second locale. The instructions may further comprise instructions to store the temporal local milestones in a central database and determine a mapping of each of the localized terms for each temporal local milestone to a normalized term for each milestone. The instructions may further comprise instructions to identify, in a displayed timeline associated with the first locale, each associated temporal local milestone using the normalized term for each milestone, even when the normalized term is not officially recognized in the first locale. The instructions may further comprise instructions to identify, in a displayed timeline associated with the second locale, each associated temporal local milestone using the normalized term for each milestone, even when the normalized term is not officially recognized in the second locale.

According to another aspect of the present disclosure, a hybrid prediction system is disclosed for aggregating electronic data from at least one Internet server and proprietary data, to identify and initially predict an outcome of a future event and to subsequently update the initial prediction. The system may include at least one processor configured to execute instructions; and a memory storing the instructions to access data scraped from the Internet, the data being associated with at least one future event; store the scraped data; determine, from the scraped data, an initial prediction of the outcome of the at least one future event; generate, from the scraped data, an initial likelihood indication associated with the initial prediction; transmit the initial prediction and the initial likelihood indication to a device; automatically receive proprietary information obtained through automated scraping of at least one proprietary data source; store the proprietary information; determine, using the scraped data and the proprietary information, a subsequent likelihood indication reflecting a change in the initial likelihood associated with the initial prediction; and transmit the subsequent likelihood indication to the device.

According to another aspect of the present disclosure, a method is disclosed for normalizing aggregated electronic data from at least one Internet server. The method may comprise accessing data scraped from the Internet. The scraped data may have been gathered from a plurality of local databases for a plurality of temporal local milestones. Each local database may store localized terms for characterizing the temporal local milestones, such that at least a first localized term for at least a first temporal milestone in a first local database associated with a first locale differs from at least a second localized term for a similar second temporal milestone in a second localized database associated with a second locale. The method may further comprise storing the temporal local milestones in a central database and determining a mapping of each of the localized terms for each temporal local milestone to a normalized term for each milestone. The method may further comprise identifying, in a displayed timeline associated with the first locale, each associated temporal local milestone using the normalized term for each milestone, even when the normalized term is not officially recognized in the first locale. The method may further comprise identifying, in a displayed timeline associated with the second locale, each associated temporal local milestone using the normalized term for each milestone, even when the normalized term is not officially recognized in the second locale.

Another aspect of the present disclosure is directed to a collaborative prediction system for altering predictive outcomes of dynamic processes. The system may include a processor configured to store initial information about a specific dynamic process having a plurality of potentially differing outcomes, assign to the specific dynamic process a first likelihood of occurrence of at least one of the potentially differing outcomes, and receive, from a first system user, notification data, the notification data being associated with the specific dynamic process. The processor may be configured to transmit, based on the notification data, at least some of the stored initial information about the specific dynamic process to the second system user and the third system user, receive from the second system user, first additional information responsive to the at least some of the stored initial information about the specific dynamic process and impacting the specific dynamic process, and generate, based on the first additional information and the initial information, a second likelihood different from the first likelihood. The processor may further be configured to transmit to the first system user, the second system user, and the third user an indication of the second likelihood, receive from the third system user, second additional information impacting the specific dynamic process, generate, based at least in part on the second additional information, a third likelihood different from the first likelihood and the second likelihood, and transmit to the first system user, the second system user, and the third system user an indication of the third likelihood.

Another aspect of the present disclosure is directed to a collaborative prediction method for altering predictive outcomes of dynamic processes. The method may be performed by a processor, and may include storing initial information about a specific dynamic process having a plurality of potentially differing outcomes, assigning to the specific dynamic process a first likelihood of occurrence of at least one of the potentially differing outcomes, and receiving, from a first system user, notification data, the notification data being associated with the specific dynamic process. The method may include transmitting, based on the notification data, at least some of the stored initial information about the specific dynamic process to the second system user and the third system user, receiving from the second system user, first additional information responsive to the at least some of the stored initial information about the specific dynamic process and impacting the specific dynamic process, and generating, based on the first additional information and the initial information, a second likelihood different from the first likelihood. The method may further include transmitting to the first system user, the second system user, and the third user an indication of the second likelihood, receiving from the third system user, second additional information impacting the specific dynamic process, generating, based at least in part on the second additional information, a third likelihood different from the first likelihood and the second likelihood, and transmitting to the first system user, the second system user, and the third system user an indication of the third likelihood.

Another aspect of the present disclosure is directed to data pattern analysis system for determining patterns in aggregated electronic data from at least one Internet server. The system may include at least one processor configured to access data scraped from the Internet to identify information that identifies individuals with a role in an outcome of at least one prospective future event related to a predefined subject matter, the information including portions unrelated to the subject matter of the at least one prospective future event, process the information to determine patterns in portions of the data unrelated to the predefined subject matter, determine an influence factor for each of the identified individuals, based, at least in part, on the patterns in the data unrelated to the predefined subject matter, and predict the outcome of the future event based at least in part on the patterns in the data unrelated to the predefined subject matter.

Another aspect of the present disclosure is directed to a data pattern analysis method for determining patterns in aggregated electronic data from at least one Internet server. The method may be performed by a processor, and may include accessing data scraped from the Internet to identify information that identifies individuals with a role in an outcome of at least one prospective future event related to a predefined subject matter, the information including portions unrelated to the subject matter of the at least one prospective future event, processing the information to determine patterns in portions of the data unrelated to the predefined subject matter, determining an influence factor for each of the identified individuals, based, at least in part, on the patterns in the data unrelated to the predefined subject matter, and predicting the outcome of the future event based at least in part on the patterns in the data unrelated to the predefined subject matter.

Another aspect of the present disclosure is directed to an Internet-based agenda data analysis system. The system may include at least one processor configured to maintain a list of user-selectable agenda issues, present to a user via a user interface, the list of user-selectable agenda issues, and receive via the user interface, based on a selection from the list, agenda issues of interest to an organization. The processor may be configured to access information scraped from the Internet to determine, for a plurality of policymakers, individual policymaker data from which an alignment position of each policymaker on each of the agenda issues is determinable, calculate alignment position data from the individual policymaker data, the alignment position data corresponding to relative positions of each of the plurality of policymakers on each of the plurality of selected issues, and transform the alignment position data into a graphical display that presents the alignment positions of multiple policymakers.

Another aspect of the present disclosure is directed to an Internet-based agenda data analysis method. The method may be performed by a processor, and may include maintaining a list of user-selectable agenda issues, presenting to a user via a user interface, the list of user-selectable agenda issues, and receiving via the user interface, based on a selection from the list, agenda issues of interest to an organization. The method may include accessing information scraped from the Internet to determine, for a plurality of policymakers, individual policymaker data from which an alignment position of each policymaker on each of the agenda issues is determinable, calculating alignment position data from the individual policymaker data, the alignment position data corresponding to relative positions of each of the plurality of policymakers on each of the plurality of selected issues, and transforming the alignment position data into a graphical display that presents the alignment positions of multiple policymakers.

Another aspect of the present disclosure is directed to a prediction system with an integrated communications interface. The system may include at least one processor configured to scrape the Internet to identify a currently pending legislative bill and to identify information about legislators slated to vote on the pending bill. The processor may be further configured to parse the information to determine a tendency position for each legislator. The tendency position may reflect a prediction of how each legislator is likely to vote on the pending bill. The processor may be further configured to transmit for display to a system user a virtual whipboard that groups legislators into a plurality of groups based on determined tendency positions. The processor may be further configured to receive from the system user a selected one of the plurality of groups of legislators selected for a communication interaction based on the determined tendency position of the group. The processor may be further configured to access a legislator database that includes legislative communication addresses of legislative personnel scraped from the Internet and divided into a plurality of legislative function categories and receive from the system user a selection of at least one of the plurality of legislative function categories. The processor may be further configured to export, to a communication platform, the communication addresses of the legislative personnel associated with both the selected group of legislative function categories and the selected one of the plurality of groups of legislators.

Another aspect of the present disclosure is directed to a prediction method that may include scraping the Internet to identify a currently pending legislative bill and to identify information about legislators slated to vote on the pending bill, and parsing the information to determine a tendency position for each legislator. The tendency position may reflect a prediction of how each legislator is likely to vote on the pending bill. The method may further include transmitting for display to a system user a virtual whipboard that groups legislators into a plurality of groups based on determined tendency positions and receiving from the system user a selected one of the plurality of groups of legislators selected for a communication interaction based on the determined tendency position of the group. The method may further include accessing a legislator database that includes legislative communication addresses of legislative personnel scraped from the Internet and divided into a plurality of legislative function categories and receiving from the system user a selection of at least one of the plurality of legislative function categories. The method may also include exporting, to a communication platform, the communication addresses of the legislative personnel associated with both the selected group of legislative function categories and the selected one of the plurality of groups of legislators.

Another aspect of the present disclosure is directed to a system for predicting and prescribing actions for impacting policymaking outcomes. The system includes at least one processor configured to access first information scraped from the Internet to identify, for a particular pending policy, information about a plurality of policymakers slated to make a determination on the pending policy. The processor may be further configured to parse the scraped first information to determine an initial prediction relating to an outcome of the pending policy. The initial prediction may include a prediction for each of the plurality of policymakers and a measure of the propensity of each of the plurality of policymakers to decide in accordance with the initial prediction. The processor may be further configured to display to a system user the initial prediction including how each of the plurality of policymakers is likely to decide and the associated propensity to decide in the predicted manner and to access second information to identify an action likely to change at least one of the initial prediction and the propensity of at least one policymaker, to thereby generate a subsequent prediction corresponding to an increase in a likelihood of achieving the desired outcome. The processor may be further configured to display to the system user a recommendation to take the action in order to increase the likelihood of achieving the desired outcome.

Another aspect of the present disclosure is directed to a method for predicting and prescribing actions for impacting policymaking outcomes. The method may include accessing first information scraped from the Internet to identify, for a particular pending policy, information about a plurality of policymakers slated to make a determination on the pending policy. The method may also include parsing the scraped first information to determine an initial prediction relating to an outcome of the pending policy, the initial prediction including a prediction for each of the plurality of policymakers and a measure of the propensity of each of the plurality of policymakers to decide in accordance with the initial prediction. The method may further include displaying to a system user the initial prediction including how each of the plurality of policymakers is likely to decide and the associated propensity to decide in the predicted manner. The method may also include accessing second information to identify an action likely to change at least one of the initial prediction and the propensity of at least one policymaker, to thereby generate a subsequent prediction corresponding to an increase in a likelihood of achieving the desired outcome. The method may also include displaying to the system user a recommendation to take the action in order to increase the likelihood of achieving the desired outcome.

Another aspect of the present disclosure is directed to a data analysis system for aggregating data from at least one internet server and providing a predicted outcome based on the aggregated data. The system may include at least one processor configured to receive event data from the at least one internet server. The processor may be further configured to receive, from the at least one internet server, alignment data associated with the event data. The alignment data may include support or opposition data of at least one individual relating to an outcome of the event. The processor may be further configured to receive from a system user, via an interactive interface of a browser, a desired outcome indicator corresponding to the event and to generate, based on the event data and the alignment data, assumption data. The assumption data may be output to the interface. The processor may be further configured to calculate, based on the assumption data and the desired outcome data, a success probability of the desired outcome, the success probability being output to the interface. The processor may also be configured to generate a suggested alteration to the assumption data that impacts the success probability, the suggested alteration being generated based on the event data, the alignment data, and the success probability.

Another aspect of the present disclosure is directed to a text analytics system that may ascertain sentiment about multi-sectioned documents and may associate the sentiment with particular sections. The system may include at least one processor configured to scrape the Internet for text data associated with comments expressed by a plurality of individuals about a common multi-sectioned document. The comments may not be linked to a particular section. The at least one processor may be further configured to analyze the text data in order to determine a sentiment associated with each comment; apply an association analysis filter to the text data in order to correlate at least a portion of each comment with one or more sections of the multi-sectioned document; and transmit for display to the system user a visualization of the sentiment mapped to one or more sections of the multi-sectioned document.

Another aspect of the present disclosure is directed to a method that may ascertain sentiment about multi-sectioned documents and associate the sentiment with particular sections. The method may include scraping the Internet for text data associated with comments expressed by a plurality of individuals about a common multi-sectioned document. The comments may not be not linked to a particular section. The method may further include analyzing the text data in order to determine a sentiment associated with each comment; applying an association analysis filter to the text data in order to correlate at least a portion of each comment with one or more sections of the multi-sectioned document; and transmitting for display to the system user a visualization of the sentiment mapped to one or more sections of the multi-sectioned document.

Another aspect of the present disclosure is directed to a text analytics system that may predict whether a policy will be adopted. The system may include at least one processor configured to access information scraped from the Internet to identify text data associated with comments expressed by a plurality of individuals about a proposed policy. The at least one processor may be further configured to analyze the text data in order to determine a sentiment of each comment; apply an influence filter to each comment to determine an influence metric associated with each comment; weight each comment using the influence metric; determine based on an aggregate of the weighted comments, an indicator associated with adoption of the policy; and transmit the indicator to a system user.

Another aspect of the present disclosure is directed to a method that may predict whether a policy will be adopted. The method may include accessing information scraped from the Internet to identify text data associated with comments expressed by a plurality of individuals about a proposed policy; analyzing the text data in order to determine a sentiment of each comment; applying an influence filter to each comment to determine an influence metric associated with each comment; weighing each comment using the influence metric; determining based on an aggregate of the weighted comments, an indicator associated with adoption of the policy; and transmitting the indicator to a system user.

Consistent with other disclosed embodiments, non-transitory computer-readable storage media may store program instructions, which are executed by at least one processor and perform any of the methods described herein.

BRIEF DESCRIPTION OF THE DRAWINGS

The accompanying drawings, which are incorporated in and constitute a part of this disclosure, illustrate various disclosed embodiments. In the drawings:

FIG. 11 is a depiction of example inputs into the systems of FIGS. 5 and 7.

FIG. 12A is a screenshot of an example of a graphical user interface for receiving input from a user.

FIG. 12B is a screenshot of an example of a graphical user interface for causing a geographical display including sub-areas to include a term of interest.

FIG. 12E is a screenshot of an example of a graphical user interface for enabling a user to click on a geographical display including sub-areas.

FIG. 14B is a second screenshot of an example of a graphical user interface for displaying one or more normalized terms in a timeline.

FIG. 16D is a diagrammatic illustration of an example of a graphical user interface used for user collaboration.

FIG. 16F is a diagrammatic illustration of an example of a graphical user interface used for displaying a dashboard indicating a likelihood of one or more outcomes related to the selected legislative bill.

FIG. 16H is a diagrammatic illustration of an example of a graphical user interface displaying a virtual whipboard.

FIG. 19A is a diagrammatic illustration of an example of a graphical user interface used for viewing unrelated legislator or other public official data.

FIG. 19B is a diagrammatic illustration of an example of a graphical user interface used for viewing additional unrelated legislator or other public official data.

FIG. 19C is a diagrammatic illustration of an example of a graphical user interface used for viewing additional unrelated legislator or other public official data.

FIG. 19D is a diagrammatic illustration of an example of a graphical user interface used for viewing additional unrelated legislator or other public official data.

FIG. 19E is a diagrammatic illustration of an example of a graphical user interface used for viewing information related to influencing an outcome.

FIG. 22A is diagrammatic illustration of an example of a graphical user interface used for presenting a list of user-selectable agenda issues for performing internet-based agenda data analysis.

FIG. 22B is diagrammatic illustration of an example of a graphical user interface used for presenting a dashboard of alignment of bills with users.

FIG. 34 illustrates another example of a multi-sectioned document with correlated comments.

FIG. 38 illustrates an example of a prediction with an indicator of an outcome.

DETAILED DESCRIPTION

Figure 1:
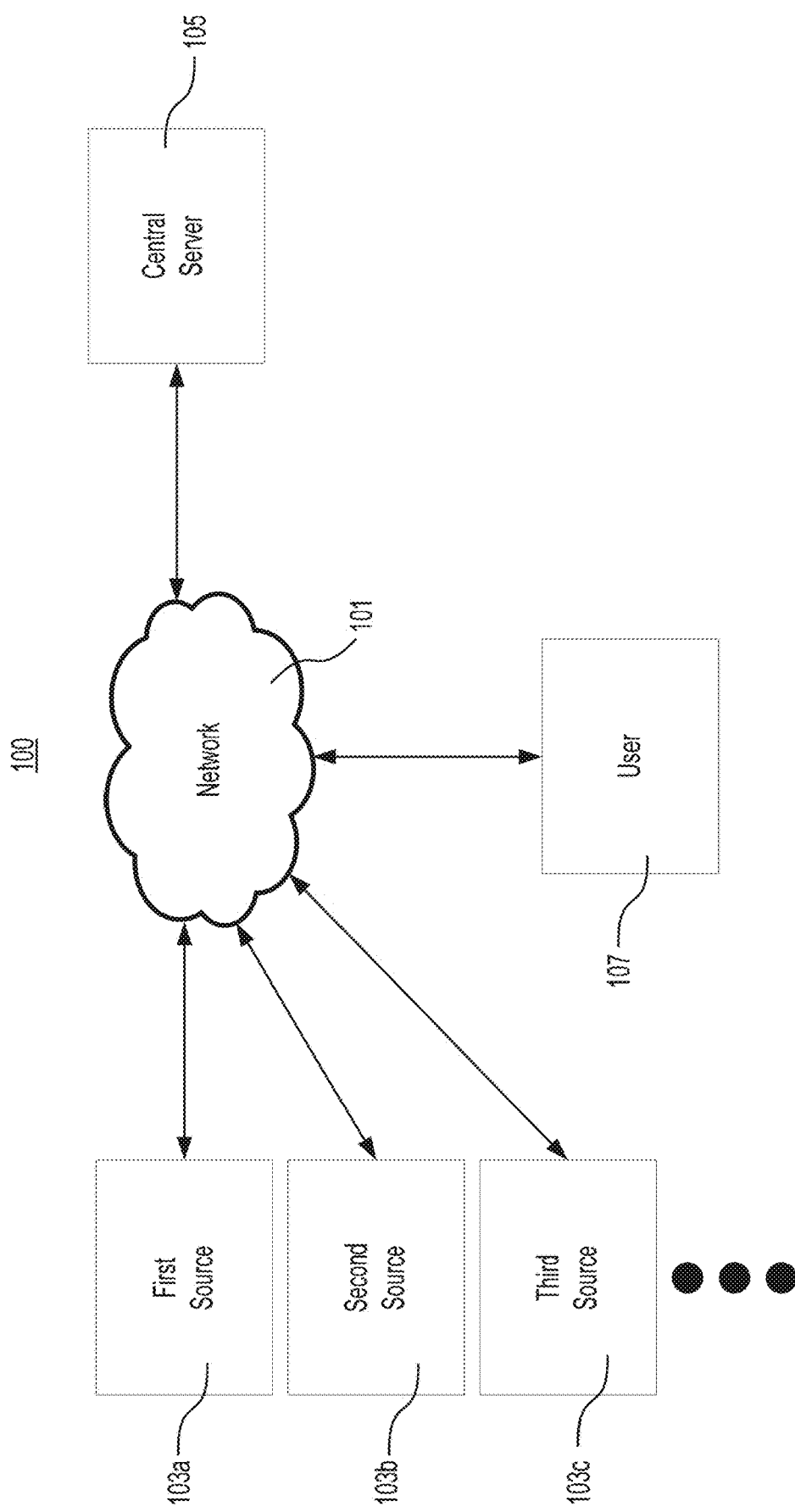
FIG. 1 is a depiction of an example of a system consistent with one or more disclosed embodiments of the present disclosure.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope is defined by the appended claims.

The disclosed embodiments relate to systems and methods for predicting and analyzing one or more aspects of a policymaking process. Embodiments of the present disclosure may be implemented using a general-purpose computer. Alternatively, a special-purpose computer may be built using suitable logic elements.

Embodiments of the present disclosure may provide more accurate prediction and more global analysis of policymaking than traditional lobbying and/or algorithms.

Policymaking generally results in the production of large numbers of documents. These documents may be produced among various governmental levels. One governmental level may comprise, for example, international governmental bodies (e.g., the European Council, the United Nations, the World Trade Organization, etc.). A second governmental level may comprise, for example, federal governmental bodies (e.g., the United States, China, the United Kingdom, etc.). A third governmental level may comprise, for example, state governmental bodies (e.g., New York, British Columbia, etc.). A fourth governmental level may comprise, for example, county governmental bodies (e.g., San Bernardino County, Essex County, Abhar County, etc.). A fifth governmental level may comprise, for example, local governmental bodies (e.g., Chicago, Hidaj, Cambridge, etc.). Other governmental levels between those listed are possible (e.g., Chinese prefectures may exist between the county level and the state (or province) level). Accordingly, as is evident, a wide range of governmental levels exist and may produce a vast array of policymaking documents.

Policymaking documents produced at a given level of government may be produced across a plurality of jurisdictions. For example, at the federal level, documents may be produced by the United States, Belgium, etc. Policymaking documents produced at a given level of a given jurisdiction may be produced across a plurality of governmental units. For example, within the United States, the U.S. Congress may comprise a governmental unit, the U.S. Court of Appeals for the Federal Circuit may comprise another governmental unit, etc. In addition, some governmental units may comprise a plurality of subunits; for example, the U.S. House may comprise a subunit of the U.S. Congress, the Bureau of Labor Statistics may comprise a subunit of the U.S. Department of Labor. Some subunits may further comprise a plurality of sub-subunits. As used herein, a "governmental unit" may refer to a unit, subunit, sub-subunit, etc.

In general, governmental units may be grouped into three categories. Legislatures comprise governmental units that produce laws (or legislation), e.g., the U.S. Congress, the UK Parliament, etc. Legislatures usually sit for preset periods of time called "sessions." Any particular piece of legislation may be termed a "legislative bill." Generally, a number of documents are produced that relate to bills (e.g., one or more committee reports, transcripts of one or more floor proceedings and/or debates, etc.). These documents may be "legislative documents" and a group of these documents that relate to a single bill may be termed a "legislative history."

Commissions or regulatory agencies comprise governmental units that produce regulations and/or enforcement actions (e.g., the Federal Trade Commission, the Federal Institute for Drugs and Medical Devices, etc.). Regulatory rules comprise rules and/or guidelines that may have the force of law and may implement one or more pieces of legislation. A collection of documents related to a particular rule or guideline may comprise a "regulatory history." In addition, commissions/agencies may further comprise one or more panels and/or administrative judges that rule on enforcement actions (e.g., actions to enforce antitrust laws, actions to enforce privacy laws, etc.).

Courts comprise governmental units that resolve disputes between parties (e.g., the U.S. District Court for Wyoming, the Akita District Court, etc.). Resolution of these dispute, or "court cases," usually result in one or more written or oral "court decisions." Decisions may include intermittent decisions (e.g., decisions on motions to exclude evidence, minute orders, motions to remittitur, etc.), as well as final decisions on the merits.

As used herein, the term "policymaker" may refer to any person within a governmental unit involved with producing policymaking documents. Thus, the term "policymaker"

may include persons having a vote on a particular policy (e.g., a member of a congress or parliament, a member of a regulatory commission or agency, a judge sitting on a panel, etc.). A record of all previous votes that a policymaker has cast may be termed a "voting history."

The term "policymaker" may also include persons with power to take unilateral action (e.g., an attorney general, a president or prime minister, etc.). Furthermore, the term "policymaker" may also include persons who support other policymakers yet do not possess a vote or any unilateral authority (e.g., staffers, assistants, consultants, lobbyists, etc.).

The volume of documents produced during policymaking may be overwhelming to track and manage, not only by hand, but even through the use of automated approaches. By hand, mere aggregation of relevant governmental documents, news, etc., may impose too heavy of a cost, both with respect to time and financial cost. Even if the aggregation is automated, however, manual analysis may still impose a heavy time and financial cost. Moreover, traditional algorithms may be limited to one level of government and/or one governmental unit, as well as fail to account for a sufficient amount of the aggregated information. Systems and methods of the present disclosure may alleviate one or more of these technical problems.

For example, systems and methods of the present disclosure may aggregate documents produced during and/or related to policymaking. In some embodiments, the disclosed systems and methods may convert each aggregated document to one or more forms appropriate for machine analysis. For example, each document may be represented as an N-dimensional vector with coordinates determined by one or more words, phrases, sentence, paragraphs, pages, and/or combinations thereof. In some embodiments, a document vector may represent a superposition of features associated with the document. As used herein, a "feature" may refer to a term of interest or other linguistic pattern derived from the text of or a subset of the text of the document. In addition, the term "feature" may also refer to one or more pieces of metadata either appended to or derived from the document. Further, the term "feature" may also refer to one or more pieces of data derived from at least one linguistic pattern, e.g., a part-of-speech identification, syntactic parsing, mood/sentiment analysis, tone analysis, or the like. The term "feature" is also not limited to a single document but may represent one or more relationships between documents.

In some embodiments, a value may be computed for each feature and form the basis for the subsequent superposition. For example, if a feature comprises whether a given term appears in the document, the value may comprise +1 if the term appears and may comprise 0 if the term does not appear. By way of further example, the value of the feature may be weighted according to its rate of occurrence in the document (e.g., the value is greater if the term occurs more often), weighted according to its rate of occurrence across a plurality of documents (e.g., the value is greater if the term is more unique to the document), or the like.

In some embodiments, other techniques may be used in lieu of or in addition to the vector analysis described above. For example, features may be assigned a multi-dimensional vector rather than a real value. Word embedding using neural networks or performing dimensionality reductions are two examples of additional techniques that may be used to convert features into formats appropriate for machine analysis.

In some embodiments, the machine analysis may include machine modeling. As used herein, a "model" may refer to any function or operator that represents an association between an input feature vector(s) and an output prediction and/or likelihood. Further, a model may take into account one or more parameters. In some embodiments, a feature, as discussed above may constitute a parameter. In the context of a future event, a "prediction" may refer to any one of a finite set of outcomes of that event. For example, in an election having three candidates, there may be three possible outcomes: the first candidate is elected, the second candidate is elected, or the third candidate is elected. By way of further example, if a policymaker is casting a vote, there may be at least two possible outcomes: the policymaker votes yes (e.g., "yea"), or the policymaker votes no (e.g., "nay"). Further, in the context of a prediction, a "likelihood" may refer to a probability that the prediction will be fulfilled.

As used herein, an "outcome" is not limited to the resolution of a vote. The term "outcome" may refer to any possible future event with respect to one or more policies. For example, with respect to legislation, outcomes may include whether or not a particular bill will be introduced, to which committees it will be assigned, whether or not it will be recommended out of committee, whether or not it will be put to a floor vote, what the final tally of the floor vote will be, and the like. Similarly, with respect to regulatory rules, outcomes may include whether or not a particular rule will be promulgated, which persons or companies will submit comments thereon, whether the rule will be amended in response to one or more comments, and the like. With respect to court cases, outcomes may include whether or not a motion will be granted, granted in part, or denied, whether or not a party will be sanctioned, how much in damages a judge or jury will award, and the like.

Furthermore, an "outcome" may include the date associated with the future event (e.g., on what date the vote is taken, on what date a rule will be published in the Federal Register, on what date a hearing concerning one or motions is held, etc.). The term "outcome" may further include one or more effects that a policy has on existing policies. For example, an "outcome" may include one or more statutes that will be amended by a pending bill, one or more regulations that will be amended by a pending regulatory rule, one or more judicial precedents that will be affected by a pending judicial decision, etc.

The term "outcome" may also refer to an impact that a policy has on one or more geographic areas, one or more sectors of an economy (e.g., manufacturing or retail), one or more industries within an economy (e.g., health care industry or services industry), or one or more companies (e.g., a non-profit, a public corporation, a private business, or a trade association). As used herein, an "impact" may refer to an assessment of the qualitative (e.g., favorable or unfavorable) or quantitative (e.g., 9/10 unfavorable, $1 billion additional costs) effects of a policy. Further, in some embodiments, an outcome may contain a subset of outcomes, and a group of outcomes may include intermediate outcomes.

In some embodiments, the model may also output one or more scores reflecting the weight that one or more input features may have on the outcome prediction and/or likelihood. In certain aspects, the scores may be integrated with the model. In other aspects, the scores may be computed based on the model (e.g., by raw tallying of outcomes based on a plurality of input features, by tallying of outcomes subject to a threshold, etc.).

As used herein, a "model" is not limited to a function or operator with one set of inputs and one set of outputs. A "model" may have intermediate operations in which, for example, a first operation produces one or more outputs that comprise one or more features that are then operated on by a second operation that produces one or more outputs therefrom. For example, a first operation may accept a full set of features as input and output a subset of the features that meet a threshold for statistical significant; a second operation may then accept the subset of features as input and output additional derived features; a third operation may then accept the subset of features and/or the derived features as input and output one or more predictions and/or likelihoods.

In some embodiments, the disclosed systems and methods may generate a model, at least in part, based on one or more partitions of feature vectors from a collection of documents according to one or more similarity measures. The collection of documents may include, at least in part, one or more documents comprising a training set. As used herein, a "training set" may refer to documents created for the purpose of training a model or may refer to documents created during or related to policymaking that have been manually analyzed.

Thus, the disclosed systems and methods may generate a model using machine learning. Further, consistent with disclosed embodiments, a model may comprise a logistic regression model, a support vector machine model, a Naïve Bayes model, a neural network model, a decision tree model, a random forest model, any combination thereof, or the like. Further, a model may be modified and/or updated using machine learning such that the model is modified during subsequent uses of the model.

In some embodiments, a plurality of models may be developed and applied to one or more documents. For example, a plurality of predictions and/or likelihoods may be output by the plurality of models. In certain aspects, a subsequent model may accept the plurality of predictions and/or likelihoods as input and output a single prediction and/or likelihood representing a combination and/or normalization of the input predictions and/or likelihoods.

The aforementioned techniques for aggregation and modeling may be used with one or more of the systems discussed below and/or with one or more of the methods discussed below.

FIG. 1 is a depiction of a system 100 consistent with the embodiments disclosed herein. As depicted in FIG. 1, system 100 may comprise a network 101, a plurality of sources, e.g., source 103a, 103b, and 103c, a central server 105, and user(s) 107. One skilled in the art could vary the structure and/or components of system 100. For example, system 100 may include additional servers—for example, central server 105 may comprise multiple servers and/or one or more sources may be stored on a server. By way of further example, one or more sources may be distributed over a plurality or servers, and/or one or more sources may be stored on the same server.

Network 101 may be any type of network that provides communication(s) and/or facilitates the exchange of information between two or more nodes/terminals. For example, network 101 may comprise the Internet, a Local Area Network (LAN), or other suitable telecommunications network. In some embodiments, one or more nodes of system 100 may communication with one or more additional nodes via a dedicated communications medium.

Figure 2:
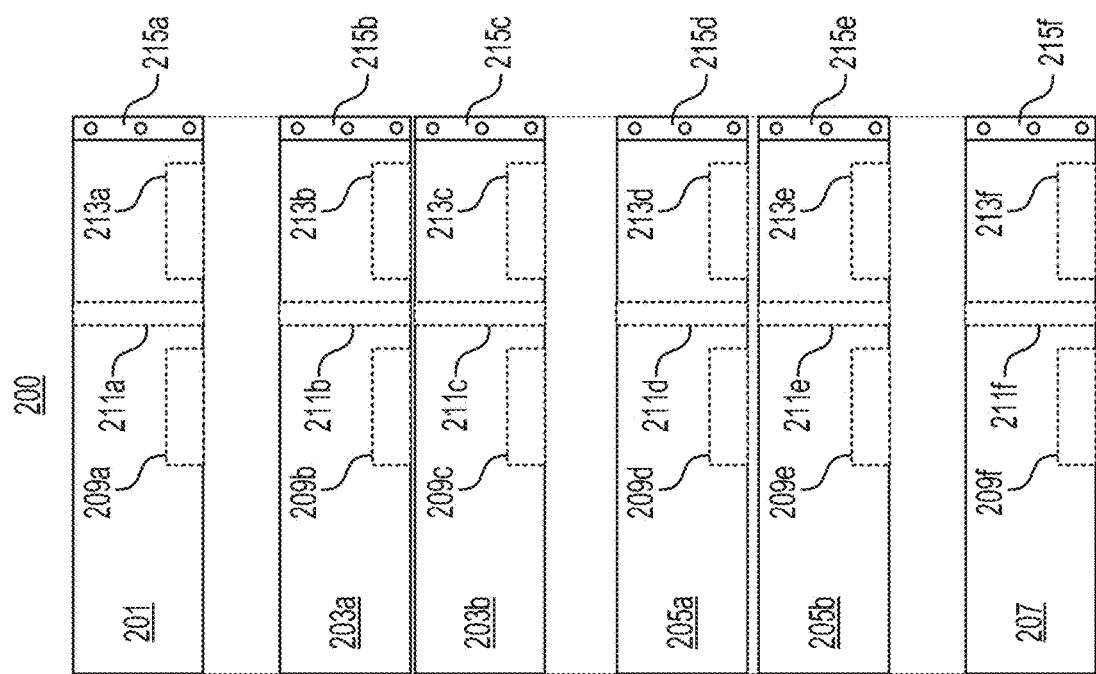
FIG. 2 is a depiction of an example of a server rack for use in the system of FIG. 1.

Central server 105 may comprise a single server or a plurality of servers. In some embodiments, the plurality of servers may be connected to form one or more server racks, e.g., as depicted in FIG. 2. In some embodiments, central server 105 may store instructions to perform one or more operations of the disclosed embodiments in one or more memory devices. Central server 105 may further comprise one or more processors (e.g., CPUs, GPUs) for performing stored instructions. In some embodiments, central server 105 may send information to and/or receive information from user(s) 107 through network 101.

In some embodiments, sources 103a, 103b, and 103c may comprise one or more databases. As used herein, a "database" may refer to a tangible storage device, e.g., a hard disk, used as a database, or to an intangible storage unit, e.g., an electronic database. For example, a local database may store information related to particular locale. A locale may comprise an area delineated by natural barriers (e.g., Long Island), an area delineated by artificial barriers (e.g., Paris), or an area delineated by a combination thereof (e.g., the United Kingdom). Thus, the website of any governmental body may comprise a local database.

In other embodiments, sources 103a, 103b, and 103c may comprise one or more news databases (e.g., the website of The New York Times or the Associated Press (AP) RSS feed. As used herein, the term "news" is not limited to information from traditional media companies but may include information from blogs (e.g., The Guardian's Blog), websites (e.g., a senator's campaign website and/or institutional website), or the like.

In still other embodiments, sources 103a, 103b, and 103c may comprise other databases. For example, sources 103a, 103b, and 103c may comprise databases of addresses, phone numbers, and other contact information. By way of further example, sources 103a, 103b, and 103c may comprise databases of social media activity (e.g., Facebook or Twitter). By way of further example, sources 103a, 103b, and 103c may comprise online encyclopedias or wikis.

Further, system 100 may include a plurality of different sources, e.g., source 103a may comprise a local database, source 103b may comprise a news database, and source 103c may comprise one of the other databases. In some embodiments, one or more sources may be updated on a rolling basis (e.g., an RSS feed may be updated whenever its creator updates the feed's source) or on a periodic basis (e.g., the website of a town newspaper may be updated once per day). In certain aspects, one or more sources may be operably connected together (e.g., sources 103b and 103c) and/or one or more sources may be operably independent (like source 103a).

In some embodiments, central server 105 may receive information from one or more of the plurality of sources, e.g., sources 103a, 103b, and 103c. For example, central server 105 may use one or more known data aggregation techniques in order to retrieve information from sources 103a, 103b, and 103c.

In some embodiments, network 101 may comprise, at least in part, the Internet, and central server 105 may perform scraping to receive information from the plurality of sources. As used herein, "scraping" or "scraping the Internet" may include any manner of data aggregation, by machine or manual effort, including but not limited to crawling across websites, identifying links and changes to websites, data transfer through API's, FTP's, GUI, direct database connections through, e.g. using SQL, parsing and extraction of website pages, or any other suitable form of data acquisition. In certain aspects, central server 105 may execute one or more applications configured to function as web scrapers. A web scraper may comprise a web crawler and an extraction bot. A web crawler may be configured to find, index, and/or fetch web pages and documents. An extraction bot may be configured to copy the crawled data to central server 105 or may be configured to process the crawled data and copy the processed data to central server 105. For example, the bot may parse, search, reformat, etc., the crawled data before copying it.

Information scraped from the plurality of sources may comprise web pages (e.g., HTML documents) as well as other document types (e.g., pdf, txt, rtf, doc, docx, ppt, pptx, opt, png, tiff, png, jpeg, etc.). The web scraper may be configured to modify one or more types of scraped data (e.g., HTML) to one or more other types of scraped data (e.g., txt) before copying it to central server 105.

The web scraper may run continuously, near continuously, periodically at scheduled collection intervals (e.g., every hour, every two hours, etc.), or on-demand based on a request (e.g., user 107 may send a request to central server 105 that initiates a scraping session). In some embodiments, the web scraper may run at different intervals for different sources. For example, the web scraper may run every hour for source 103a and run every two hours for source 103b. This may allow the web scraper to account for varying excess traffic limits and/or to account for varying bandwidth limits that may result in suboptimal performance or crashes of a source.

In some embodiments, manual operators may supplement the processes performed by the web scraper. For example, a manual operator may assist with indexing one or more web pages that employ anti-crawling technology. By way of further example, a manual operator may assist with parsing data that the extraction bot cannot interpret.

User(s) 107 may connect to network 101 by using one or more devices with an operable connection to network 101. For example, user(s) 107 may connect to network 101 using one or more devices of FIG. 3 or 4 (described below). In some embodiments, user(s) 107 may send information to and receive information from central server 105 though network 101.

In some embodiments, user 107 may send proprietary information to central server 105 via network 101. For example, proprietary information may comprise information privy to user 107 like the results of a private meeting between user 107 and one or more persons, or non-public organizational actions. By way of further example, proprietary information may comprise information obtained by user 107 from a subscription news service or other service requiring payment in exchange for information. By way of further example, proprietary information may comprise information generated by the user, such as through their own efforts or by a collective group of, e.g., an organization. Accordingly, proprietary information may be described as information determined through "proprietary research." Moreover, in some embodiments, proprietary information may be considered to be non-scraped, and in other embodiments, proprietary information may be scraped from a resource (e.g., from a server).

FIG. 2 is a depiction of a server rack 200 for use in system 100 of FIG. 1. As depicted in FIG. 2, server rack 200 may comprise a management/control server 201, one or more compute servers, e.g., servers 203a and 203b, one or more storage servers, e.g., servers 205a and 205b, and spare server 207. The number and arrangement of the servers shown in FIG. 2 is an example, and one of skill in the art will recognize any appropriate number and arrangement is consistent with the disclosed embodiments.

In some embodiments, one or more servers of server rack 200 may comprise one or more memories. For example, as depicted in FIG. 2, management/control server 201 comprises memory 209a, compute server 203a comprises memory 209b, compute server 203b comprises memory 209c, storage server 205a comprises memory 209d, storage server 205b comprises memory 209e, and spare server 207 comprises memory 209f. A memory may comprise a traditional RAM, e.g., SRAM or DRAM, or other suitable computer data storage. The one or more memories may store instructions to perform one or more operations of the disclosed embodiments. In addition, the one or more memories may store information scraped from the Internet.

In some embodiments, one or more servers of server rack 200 may further comprise one or more processors. For example, as depicted in FIG. 2, management/control server 201 comprises processor 211a, compute server 203a comprises processor 211b, compute server 203b comprises processor 211c, storage server 205a comprises processor 211d, storage server 205b comprises processor 211e, and spare server 207 comprises processor 211f. A processor may comprise a traditional CPU, e.g., an Intel®, AMD®, or Sun® CPU, a traditional GPU, e.g., an NVIDIA® or ATI® GPU, or other suitable processing device. In some embodiments, the one or more processors may be operably connected to the one or more memories. Further, in some embodiments, a particular server may include more than one processor (e.g., two processors, three processors, etc.).

In some embodiments, one or more servers of server rack 200 may further comprise one or more non-volatile memories. For example, as depicted in FIG. 2, management/control server 201 comprises non-volatile memory 213a, compute server 203a comprises non-volatile memory 213b, compute server 203b comprises non-volatile memory 213c, storage server 205a comprises non-volatile memory 213d, storage server 205b comprises non-volatile memory 213e, and spare server 207 comprises non-volatile memory 213f. A non-volatile memory may comprise a traditional disk drive, e.g., a hard disk drive or DVD drive, an NVRAM, e.g., flash memory, or other suitable non-volatile computer data storage. The one or more non-volatile memories may store instructions to perform one or more operations of the disclosed embodiments. In addition, the one or more non-volatile memories may store information scraped from the Internet.

In some embodiments, one or more servers of server rack 200 may further comprise one or more network interfaces. For example, as depicted in FIG. 2, management/control server 201 comprises network interface 215a, compute server 203a comprises network interface 215b, compute server 203b comprises network interface 215c, storage server 205a comprises network interface 215d, storage server 205b comprises network interface 215e, and spare server 207 comprises network interface 215f. A network interface may comprise, for example, an NIC configured to use a known data link layer standard, such as Ethernet, Wi-Fi, Fibre Channel, or Token Ring. In some embodiments, the one or more network interfaces may permit the one or more servers to execute instructions remotely. In addition, the one or more network interfaces may permit the one or more servers to access information from the plurality of sources.

Server rack 200 need not include all components depicted in FIG. 2. Additionally, server rack 200 may include additional components not depicted in FIG. 2 (e.g., a backup server or a landing server).

Figure 3:
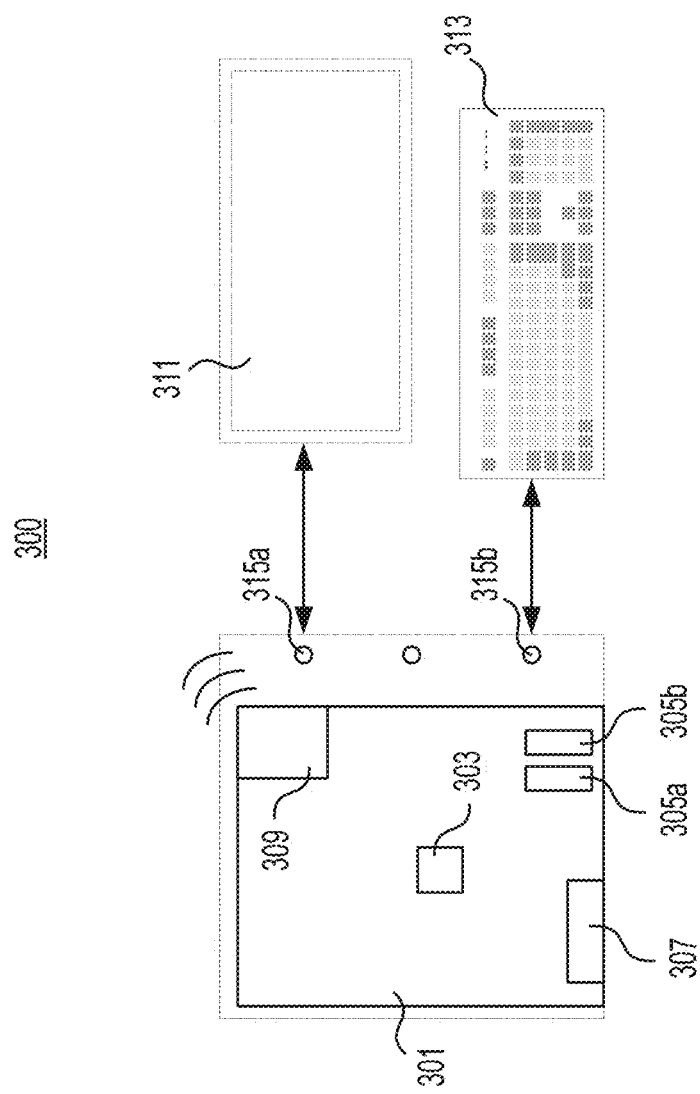
FIG. 3 is a depiction of an example of a device for use by the user(s) of the system of FIG. 1.

FIG. 3 is a depiction of an example of a device 300 for use by user(s) 107 of system 100 of FIG. 1. For example, device 300 may comprise a desktop or laptop computer. As depicted in FIG. 3, device 300 may comprise a motherboard 301 having a processor 303, one or more memories (e.g., memories 305a and 305b, a non-volatile memory 307, and a network interface 309). As further depicted in FIG. 3, network interface 309 may comprise a wireless interface (e.g., an NIC configured to utilize Wi-Fi, Bluetooth, 4G, etc.). In other embodiments, network interface 309 may comprise a wired interface (e.g., an NIC configured to use Ethernet, Token Ring, etc.). In some embodiments, network interface 309 may permit device 300 to send information to and receive information from a network.

In some embodiments, device 300 may further comprise one or more display modules (e.g., display 311). For example, display 311 may comprise an LCD screen, an LED screen, or any other screen capable of displaying text and/or graphic content to the user. In some embodiments, display 311 may comprise a touchscreen that uses any suitable sensing technology (e.g., resistive, capacitive, infrared, etc.). In such embodiments, display 311 may function as an input device in addition to an output module.

In some embodiments, device 300 may further comprise one or more user input devices (e.g., keyboard 313 and/or a mouse (not shown)). As further depicted in FIG. 3, the one or more display modules and one or more user input devices may be operably connected to motherboard 301 using hardware ports (e.g., ports 315a and 315b). For example, a hardware port may comprise a PS/2 port, a DVI port, an eSata port, a VGI port, an HDMI port, a USB port, or the like.

Device 300 need not include all components depicted in FIG. 3. Additionally, device 300 may include additional components not depicted in FIG. 3 (e.g., external disc drives, graphics cards, etc.).

Figure 4B:
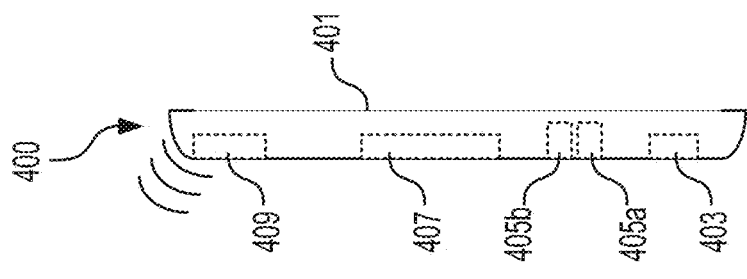
FIG. 4B is a side-view of the device of FIG. 4A.
Figure 4A:
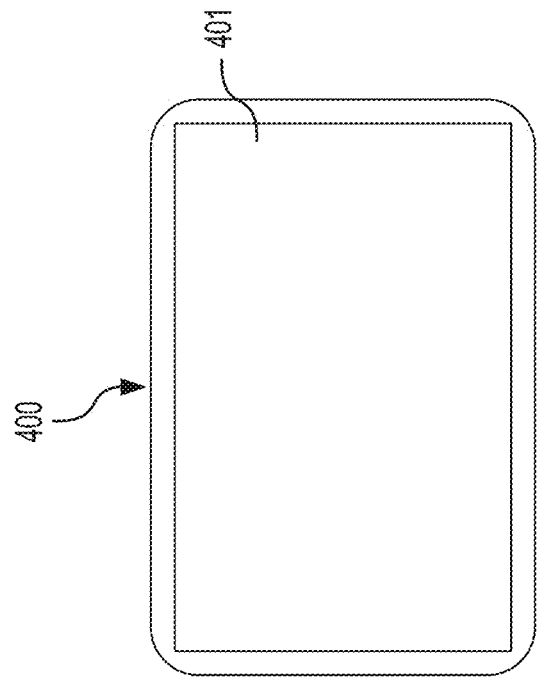
FIG. 4A is a depiction of another example of a device for use by the user(s) of the system of FIG. 1.

FIG. 4A is a depiction of an example of a device 400 for use by user(s) 107 of system 100 of FIG. 1. For example, device 400 may comprise a tablet (e.g., an iPad or Microsoft Surface), or a cell phone (e.g., an iPhone or an Android smartphone). As depicted in FIG. 4A, device 400 may comprise screen 401. For example, screen 401 may comprise an LCD touchscreen, an LED touchscreen, or any other screen capable of receiving input from the user and displaying text and/or graphic content to the user.

FIG. 4B is a side view of example device 400 that depicts example hardware included within device 400. As depicted in FIG. 4B, device 400 may comprise a processor 403, one or more memories (e.g., memories 405a and 405b), a non-volatile memory 407, and a network interface 409. As further depicted in FIG. 4, network interface 409 may comprise a wireless interface, e.g., an NIC configured to use Wi-Fi, Bluetooth, 4G, or the like. In some embodiments, network interface 409 may permit device 400 to send information to and receive information from a network.

Device 400 need not include all components depicted in FIG. 4. Additionally, device 400 may include additional components not depicted in FIG. 4 (e.g., external hardware ports, graphics cards, etc.).

Predicting Future Event Outcomes Based on Data Analysis

In some embodiments, systems and methods consistent with the present disclosure may determine one or more predictions for one or more future events. A prediction may refer to a specific outcome for a future event. An outcome may, for example, be a resolution of a vote or other possible future event with respect to one or more policies.

Systems and methods of the present disclosure may also determine a likelihood for the one or more predictions. A likelihood may refer to a probability that the prediction will be fulfilled. For example, a likelihood may be a probability associated with a particular vote resolution or other possible outcome of a future event with respect to one or more policies.

Figure 5:
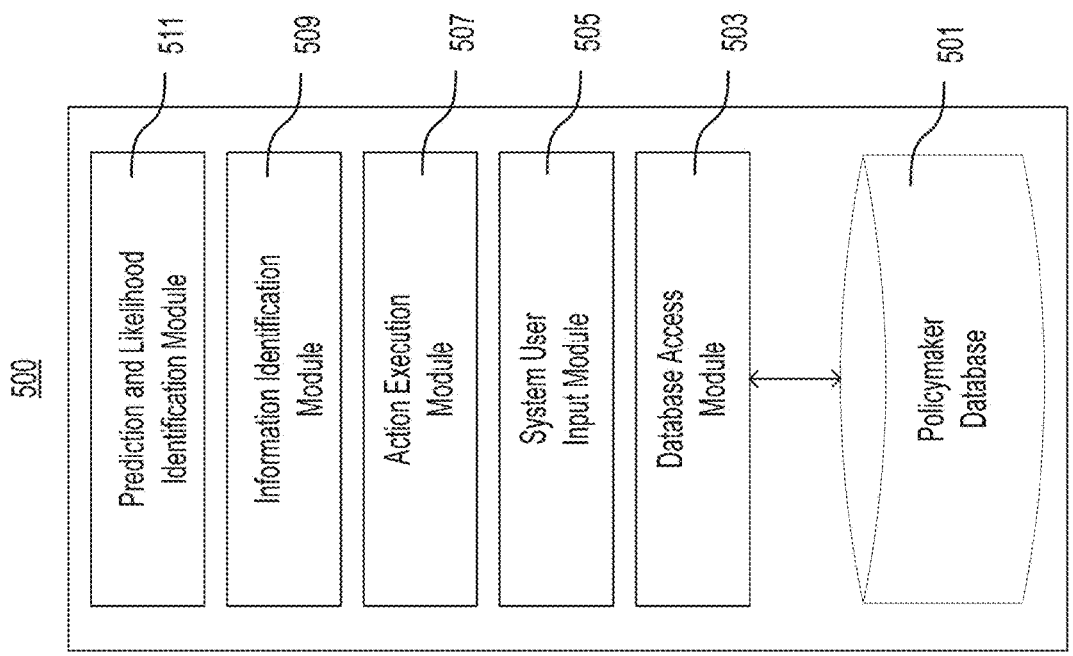
FIG. 5 is a depiction of an example of a system for predicting an outcome of a future event.

FIG. 5 is a depiction of a memory 500 storing program modules and data for predicting an outcome of a future event. In some embodiments, memory 500 may be included in, for example, central server 105, discussed above. Further, in other embodiments, the components of memory 500 may be distributed over more than one location (e.g., stored in a plurality of servers in communication with, for example, network 101).

As depicted in FIG. 5, memory 500 may include a policymaker database 501. Policymaker database 501 may store information related to policies and policymakers that is aggregated from a plurality of sources and/or parsed via machine analysis. For example, policymaker database 501 may store information related to one or more future events and indexed by policy and/or policymaker.

As further depicted in FIG. 5, memory 500 may include a database access module 503. Database access module 503 may control access to the information stored in database 501. For example, database access module 503 may require one or more credentials from a user or another application in order to receive information from policymaker database 501.

Memory 500 may further include a system user input module 505. System user input module 505 may receive input from one or more users of memory 500. For example, a user may send input to system user input module 505 using one or more networks (e.g., network 100) operably connected to a server (e.g., central server 105) storing system user input module 505.

As depicted in FIG. 5, memory 500 may further include an action execution module 507. Action execution module 507 may manage one or more execution lists executed on one or more processors (not shown) operably connected to memory 500. For example, action execution module 507 may permit for multi-threading in order to increase the efficiency with which one or more execution lists are executed.

Memory 500 may also include an information identification module 509. Information identification module 509 may associate one or more identities with information received from policymaker database 501 using system user input module 505. For example, information identification module 509 may associate an identity of a policymaker with a news story received from database 501 via system user input module 505. By way of further example, information identification module 509 may associate an identity of a policy with a legislative report received from policymaker database 501 via system user input module 505.

As further depicted in FIG. 5, memory 500 may include a prediction and likelihood identification module 511. Prediction and likelihood identification module 511 may generate and/or apply one or more models as discussed above. For example, prediction and likelihood identification module 511 may receive information from policymaker database 501 using system user input module 505 and use the received information as input in one or more models. After applying one or more models, prediction and likelihood identification module 511 may output one or more predictions and/or one or more likelihoods related to a future event.

Figure 6:
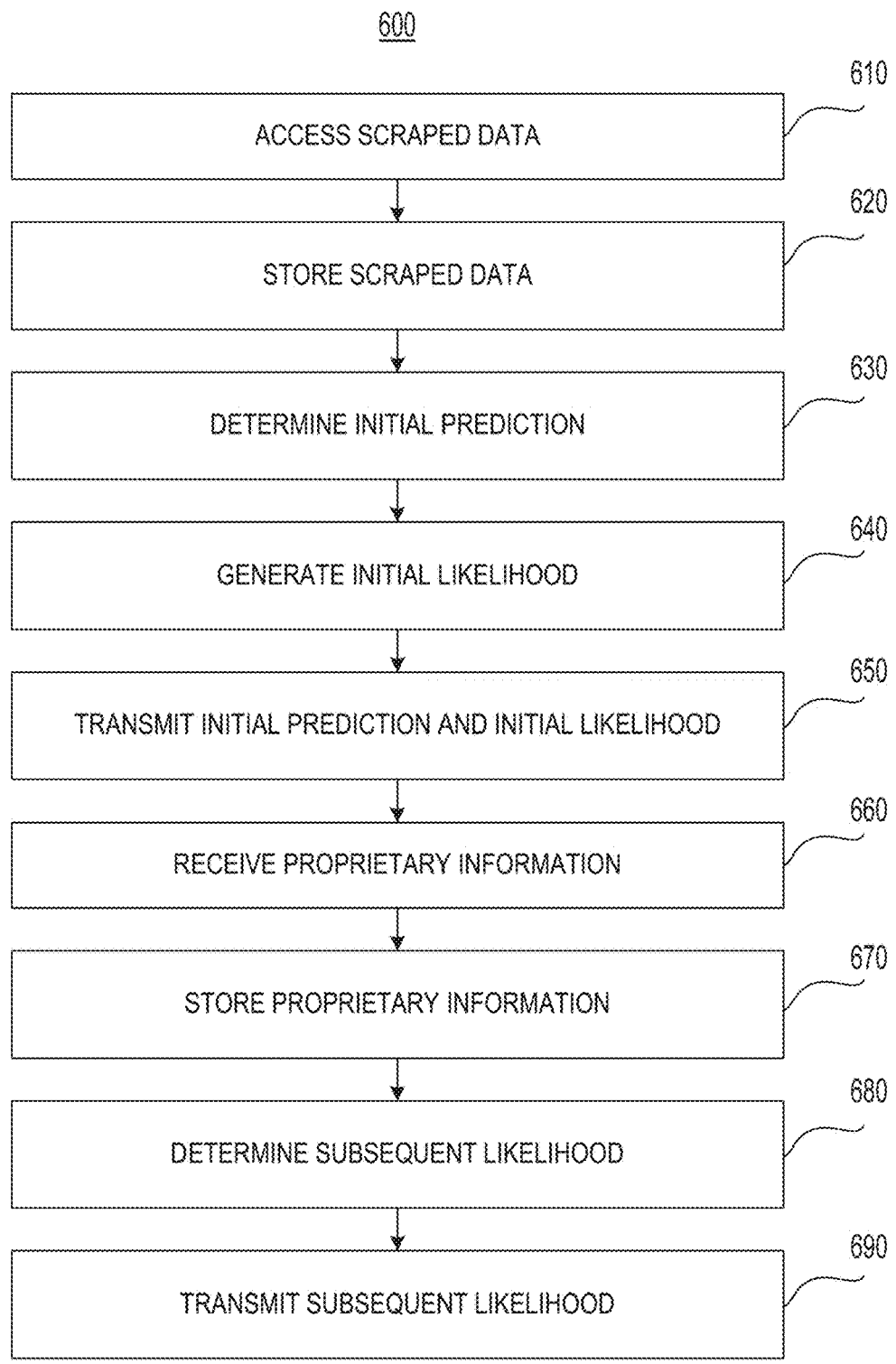
FIG. 6 is a flowchart of an example of a method for predicting an outcome of a future event.

FIG. 6 is a flowchart of exemplary method 600 for predicting an outcome of a future event, consistent with disclosed embodiments. Method 600 may, for example, be executed by one or more processors of a server (e.g., central server 105 of FIG. 1) or any other appropriate hardware and/or software. Further, when executing method 600, the one or more processors may execute instructions stored in one or more of the modules discussed above in connection with FIG. 5.

At step 610, the server may access scraped data. For example, the server may implement one or more techniques for scraping data from the Internet as, described above. In other embodiments, the server may access data from a separate web scraper.

At step 620, the server may store the scraped data. For example, the server may store the scraped data in a database (e.g., policymaker database 501). In some embodiments, the server may parse the data prior to storing it and/or associated one or more identities with the data prior to storing it. For example, the server may remove one or more formatting tags from a scraped HTML documents before storing the document. By way of a further example, the server may associate a scraped document with one or more policymakers and/or one or more policies before storing it.

In some embodiments, the server may receive previously scraped and stored data from one or more databases in lieu of accessing scraped data and storing it.

At step 630, the server may determine an initial prediction regarding a future event based on the scraped data. For example, the server may apply one or more models with some or all of the scraped data as one or more inputs. Instead of using raw scraped data, the server may extract one or more features from the data, as discussed above, to use as inputs for the model.

In some embodiments, the server may identify the future event, at least in part, via a query from a user. For example, the server may receive a query from a user via a data input terminal. The data input terminal may comprise a device associated with the user, e.g., a cell phone, a tablet, or other personal computing device. For example, the user may input the number of a pending legislative bill, and the server may identify the future event as the outcome of a floor vote on that bill. Similarly, the user may input the number of a pending regulatory rule, and the server may identify the future event as the enactment or non-enactment of the pending rule. By way of further example, the user may input the number of a pending court case, and the server may identify the future event as which party the jury will find in favor of.

In some embodiments, the server may receive the query before accessing scraped data or before storing the data. For example, the server may determine, at least in part, which scraped data to access based on the query. The server may determine which scraped data to access based on preexisting tags in the data and/or based on a dynamic determination of relevance. For example, if the user query included "healthcare," the server may determine which scraped data to access based on whether the data was tagged as related to "healthcare."

By way of a further example, if the future event involves a vote on a legislative bill, the server may access one or more websites of governmental bodies to identify pending legislation related to the query (in this example, "healthcare"). Similarly, if the future event involves adoption of a government regulation, the server may access one or more websites of governmental bodies to identify pending regulations related to the query (in this example, "healthcare"). By way of a further example, if the future event involves a decision in a court case, the server may access one or more websites of governmental bodies to identify pending cases related to the query (in this example, "healthcare").

At step 640, the server may determine an initial likelihood regarding the initial prediction. For example, if the initial likelihood is that a particular bill is likely to pass a legislature, the server may then determine that the bill has a 62% likelihood of passing. In some embodiments, the server may use the same model(s) that determined the initial prediction to determine the initial likelihood. In other embodiments, the server may use one or more different models, either separately or in combination with the model(s) used to determine the initial prediction, to determine the initial likelihood.

For example, the server may determine the initial likelihood based on one or more voting histories or records of one or more policymakers. In this example, the server may access the voting history of a policymaker (e.g., using policymaker database 501) and then determine the likelihood of that policymaker voting a particular way on a particular policy based on similarities between the policy and other policies included in the voting history. In this example, the server may determine the initial likelihood based on an aggregation of the likelihoods associated with each policymaker.

By way of a further example, the server may determine the initial likelihood based on one or more identified policymakers supporting and opposing a policy and an influence measure associated with each of the identified policymakers. For example, the server may identify one or more members of the National Assembly of South Korea that support and/or oppose a particular policy and then predict how other members will vote based on influence measures associated with the identified member(s). The server may determine the initial likelihood based on an aggregation of the predictions associated with each policymaker.

In some embodiments, the server may perform steps 630 and 640 simultaneously. For example, the server may use one or more models that generate an initial prediction in conjunction with an initial likelihood.

At step 650, the server may transmit the initial prediction and initial likelihood to one or more devices. For example, the server may transmit the initial prediction and initial likelihood to a device associated with a user, e.g., a cell phone, a tablet, or other personal computing device.

At step 660, the server may receive proprietary information. For example, the server may receive the information from a user via a device associated with the user or from a server over a network (e.g., the Internet). As discussed above, proprietary information may include information privy to the user, such as the results of a private meeting between the user and one or more persons or information obtained by the user from a subscription news service or other service requiring payment in exchange for information. In some embodiments, the proprietary information may constitute non-scraped proprietary information. In other embodiments, the server may automatically receive proprietary information obtained through automated scraping of at least one proprietary data source.

In some embodiments, the server may receive the proprietary information via a data input terminal. For example, as discussed above, the data input terminal may comprise a device associated with the user, e.g., a cell phone, a tablet, or other personal computing device. For example, the user may enter into the data terminal that a specific policymaker will vote a particular way based on a meeting between the user and the policymaker. In some embodiments, the server may receive proprietary information by scraping a source provided by the user. For example, a user may provide access to proprietary source, e.g. an internal network, a database, an API.

At step 670, the server may store the received proprietary information. For example, the proprietary information may be stored in policymaker database 501 or in a separate database. In some embodiments, the system may use the received proprietary information without storing it.

At step 680, the system may determine a subsequent likelihood based on the scraped information and the proprietary information. For example, a user may input, as proprietary information, information indicating one or more policymakers will vote differently than in the initial prediction. In this example, the system may then determine a subsequent likelihood based on the scraped information that produced that initial likelihood and the new vote(s) of one or more policymakers input by the user.

In some embodiments, the user may provide access to a database of proprietary information such as, for example, financial contributions to one or more policymakers. In this example, the server may then determine a subsequent likelihood based on the scraped information that produced that initial likelihood and the financial contributions to one or more policymakers provided by the user.

By way of a further example, a user may input, as non-scraped proprietary information, information indicating a pending bill will be amended to include new and/or different language. In this example, the server may then determine a subsequent likelihood based on the scraped information that produced that initial likelihood and the new and/or different language input by the user.

In some embodiments, the server may use the same model(s) used to determine the initial likelihood to determine the subsequent likelihood. In other embodiments, the server may use one or more different models, either separately or in combination with the model(s) used to determine the initial likelihood, to determine the subsequent likelihood.

At step 690, the server may transmit the subsequent likelihood to one or more devices. For example, the server may transmit the initial prediction and initial likelihood to a device associated with a user, e.g., a cell phone, a tablet, a smart watch, or other personal computing device. The server may transmit the subsequent likelihood to a device associated with the user that inputted the proprietary information and/or a user different from the user that inputted the proprietary information.

Systems and methods consistent with the present disclosure may calculate initial predictions, initial likelihoods, and subsequent likelihoods for a plurality of users. One or more subsets of the plurality of users may prefer to share some or all predictions, likelihoods, proprietary information, and the like. Other subsets of the plurality of users may prefer to keep private some of all predictions, likelihoods, proprietary information, and the like. Systems and methods consistent with the present disclosure may allow for subsets of users to select and enforce such desired privacy settings.

Figure 7:
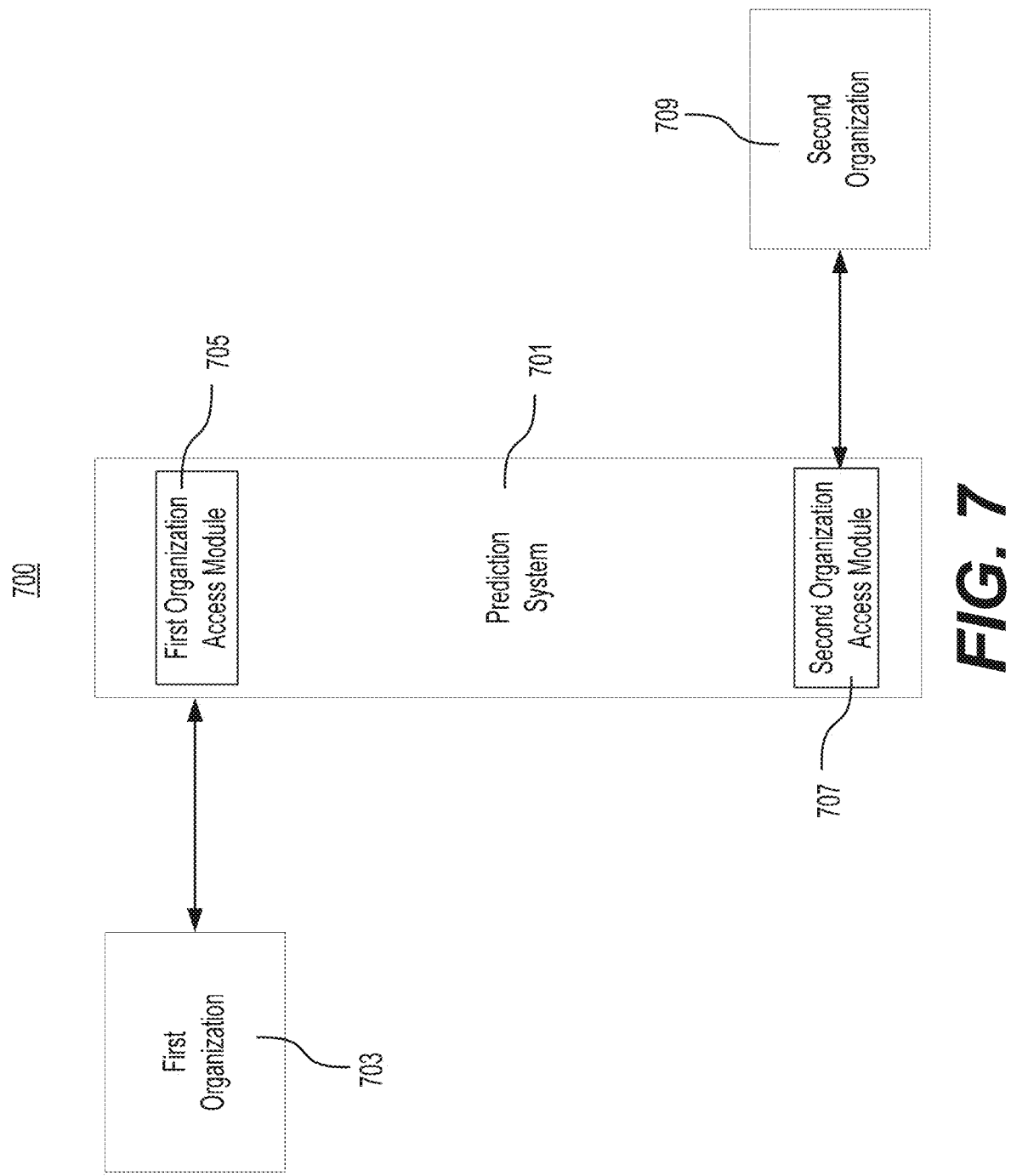
FIG. 7 is a depiction of the system of FIG. 5 and a first and second organization.

FIG. 7 is a depiction of a system 700 adapted to include a first and second organization. Exemplary system 700 may comprise a variation of central server 105 of FIG. 1. As depicted in FIG. 7, system 700 may include a prediction system 701. Prediction system 701 may include memory 500 of FIG. 5. As depicted in FIG. 5, module 705 and module 709 may be located within a memory of system 700 or may be located on another server. Prediction system 701 may be configured to execute, for example, method 600 of FIG. 6.

As further depicted in FIG. 7, system 700 may include a first organization 703 operably connected to prediction system 701 via a first organization access module 705. First organization 703 may comprise one or more users (e.g., user 107 of FIG. 1), operably connected to first organization access module 705 via one or more devices associated with the user(s). Similarly, system 700 may include a second organization 707 operably connected to prediction system 701 via a second organization access module 709. Second organization 707 may also comprise one or more users (e.g., user 107 of FIG. 1), operably connected to second organization access module 709 via one or more devices associated with the user(s).

As used herein, an "organization" may refer to a legally cognizable organization such as a corporation, one or more official groups internal to a legally cognizable organization such as human resources, or one or more unofficial groups internal to a legally cognizable organization like a project team or working group. The term "organization" may also refer to one or more groups of employees across different legally cognizable organizations or one or more groups of individual persons. As used herein, the term "individual" includes any person, government, corporation, or organization. Accordingly, one or more users of system 700 may self-organize themselves into a first organization or a second organization.

In some embodiments, first organization access module 705 may require authentication from a user that confirms the user is a member of the first organization in order to access prediction system 701. Similarly, in some embodiments, second organization access module 709 may require authentication from a user that confirms the user is a member of the second organization in order to access prediction system 701. For example, first organization access module 705 and second organization access module 709 may receive a password, a fingerprint, or other identifier and compare the received identifier to a stored identifier associated with the first or second organization. In some embodiments, first organization access module 705 and second organization access module 709 may hash the received identifier before comparing the hashed identifier to a stored identifier that is stored in a hashed format.

Further, first organization access module 705 may determine whether users associated with other organizations are permitted to access proprietary information input by users associated with the first organization and/or subsequent likelihoods determined therefrom. Similarly, second organization access module 709 may determine whether users associated with other organizations are permitted to access proprietary information input by users associated with the second organization and/or subsequent likelihoods determined therefrom. For example, if the first organization and the second organization agree to collaborate, first organization access module 705 and second organization access module 709 may allow each organization to access proprietary information input by the other organization. Moreover, first organization access module 705 and second organization access module 709 may allow each organization to access subsequent likelihoods (which may be termed "first organizational updates" and/or "second organizational updates") determined using the proprietary information input by the other organization.

Accordingly, if predication system 701 or central server 105 or the like determines an initial prediction, an initial likelihood, and a subsequent likelihood based on proprietary information from one or more users associated with the first organization, system 701 may store the initial prediction, initial likelihood, subsequent likelihood, and proprietary information in a manner preventing access by one or more users associated with a second organization. In such an example, the second organization may be referred to as an "unrelated organization." By way of a further example, system 700 may store the initial prediction, initial likelihood, subsequent likelihood, and proprietary information in a manner preventing access to some of the information (e.g., the subsequent likelihood, the proprietary information) and permitting access to other of the information (e.g., the initial prediction, the initial likelihood) by one or more users associated with a second organization. In a third example, system 700 may store the initial prediction, initial likelihood, subsequent likelihood, and proprietary information in a manner permitting access to the information by one or more users associated with a second organization. Thus, system 700 may allow for customization of sharing settings by a plurality of organizations.

Addition collaborative setups using system 700 are possible. For example, collaborative agreements involving more than two organizations are possible. By way of further example, collaborative agreements involving a subset of proprietary information and/or a subset of subsequent likelihoods are also possible.

As discussed above, systems and methods consistent with the present disclosure may relate to policymaking among various governmental levels (e.g., an international level, a federal level, a state level, a county level, a local level, etc.). To more easily communication information relating to nested governmental levels, systems and methods consistent with the present disclosure may allow for graphic displays of multiple sub-areas comprising one or more levels of government within a larger area comprising one or more higher levels of government.

Figure 8:
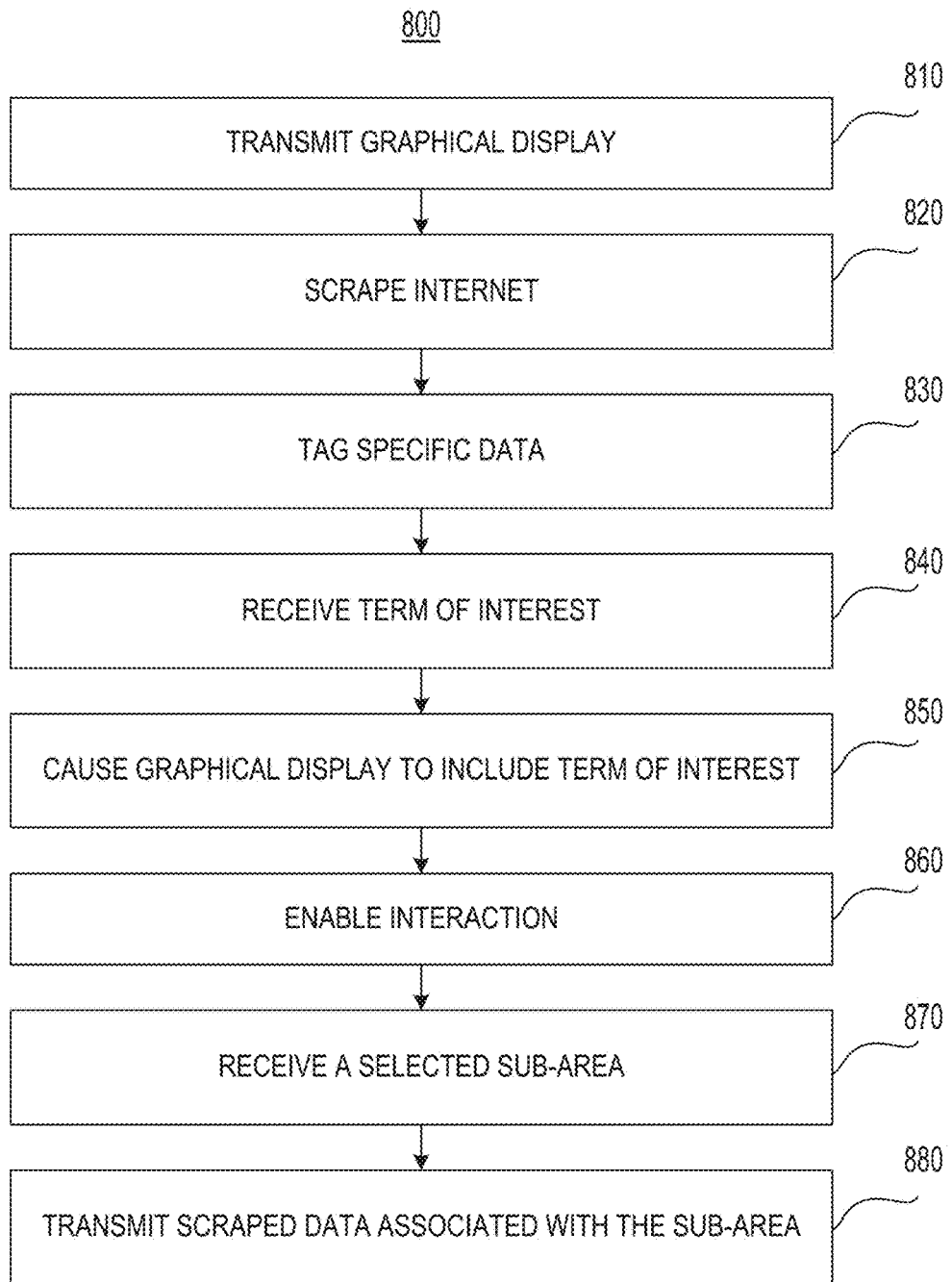
FIG. 8 is a flowchart of an example of a method of incorporating geographic sub-areas into the method of FIG. 6.

FIG. 8 is a flowchart of a method 800 of incorporating geographic sub-areas into method 600 of FIG. 6. Method 800 may, for example, be executed by one or more processors of a server (e.g., central server 105 of FIG. 1) or any other appropriate hardware and/or software. Further, when executing method 800, the one or more processors may execute instructions stored in one or more of the modules discussed above.

At step 810, the server may transmit a graphical display having sub-areas to one or more devices. For example, the server may transmit the graphical display to a device associated with a user, e.g., a cell phone, a tablet, or other personal computing device. In some embodiments, the graphical display may represent one or more regions corresponding to a government level having a plurality of sub-levels. The sublevels may correspond to the sub-areas included in the graphical display.

At step 820, the server may scrape the Internet for data related to the plurality of sub-areas included in the graphical display. For example, if the graphical display comprises Canada, the server may scrape the Internet for data related to provinces of Canada. In some embodiments, the server may access stored information scraped from the Internet rather than actively scraping the Internet.

At step 830, the server may tag data included in the scraped data as related to one or more sub-areas. For example, the server may apply a searching algorithm to tag any data related to one or more sub-areas. The server may apply the searching algorithm to the data itself or to metadata associated with the data. By way of further example, the server may apply other algorithms to determine if any data is related to one or more sub-areas (e.g., by determining the source of the data).

At step 840, the server may receive a term of interest from a user. For example, the user may send the term of interest to a device associated with the user, which then transmits the term of interest to the server. In some embodiments, the server may execute step 840 before step 810, step 820, or step 830.

At step 850, the server may cause the graphical display to include the term of interest. For example, the server may modify the graphical display to indicate whether the term of interest appears in policymaking data corresponding to each sub-area. In such an example, the server may modify the graphical display to quantify the extent to which the term of interest appears for each sub-area. For example, the server may apply a color-shading scheme such that a sub-area having more policymaking data including the term of interest is shaded more heavily than a sub-area having less policymaking data including the term of interest. Other algorithms quantifying the extent to which the term of interest appears are possible (e.g., measuring the raw number of times the term of interest appears, etc.).

In some embodiments, step 810 and step 850 may be combined. For example, the server may wait to transmit the graphical display until after the graphical display includes the term of interest.

At step 860, the server may enable interaction with the graphical display. For example, the server may enable a user receiving the graphical display on a device associated with the user to interact with the graphical display, e.g., by hovering over a sub-area or clicking a sub-area. The interaction by the user may cause the device associated with the user to send an indicator signal to the server.

At step 870, the server may receive a selected sub-area. As explained above, a user may, for example, select a sub-area by hovering, clicking, or the like. The server may receive this selected sub-area, e.g., via a device associated with the user. For example, the indicator signal may indicate that the user has interacted with the graphical display and also indicate which sub-area has been selected by the user via the interaction.

At step 880, the server may transmit scraped data associated with the selected sub-area. For example, the user may click or hover over a sub-area and thereafter receive scraped data associated with that sub-area. In this example, the user may click or hover over a sub-area and receive a list of pending bills or regulatory rules or court cases within the sub-area and related to the term of interest. The server may transmit other scraped data associated with the selected sub-area (e.g., the raw number of times the term of interest appears in pending bills, regulatory rules, or court cases within the selected sub-area, etc.). The graphical display may also include text, for example, indicating the number of pieces of legislation, number of regulatory rules, or number of court cases associated with the selected sub-area.

By way of a further example, the server may transmit policymaking data associated with the selected sub-area and which contains the term of interest. In some embodiments, the policymaking data may be associated with multiple government bodies. For example, at least one of the government bodies may comprise a legislature, and the policymaking data may correspond to legislation. Similarly, at least one of the government bodies may comprise a commission, and the policymaking data may correspond to one or more regulations. By way of further example, at least one of the government bodies may comprise a court, and the policymaking data may correspond to one or more court decisions.

In some embodiments, policymaking data may comprise at least one of a bill number, a designation for the sub-area, a session, a title, a description, a status, or at least one prediction relating to a likelihood of passage of the policymaking data. For example, the system may transmit one or more bill numbers, titles, descriptions, and/or statuses associated with pending policies associated with the selected sub-area. Similarly, the system may transmit a designation for the sub-area (e.g., a name) or a session (e.g., the 2016-2017 legislative session, the November 2017 sitting, the 112th Congress, etc.) associated with the selected sub-area. By way of further example, the system may transmit one or more predictions associated with the sub-area. The transmitted policymaking data may be displayed on the graphical display or near the graphical display (e.g., in a list next to the graphical display).

Systems and methods consistent with the present disclosure may also allow for user interaction with the disclosed graphical displays. For example, a user may receive information related to one or more sub-areas via interaction with the graphical display.

Figure 9:
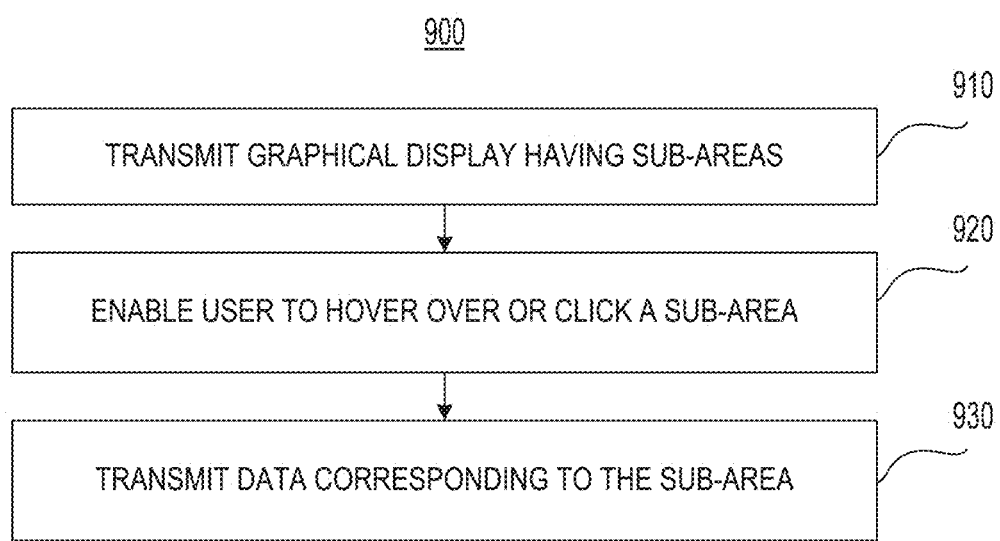
FIG. 9 is a flowchart of an example of a method of incorporating interactive geographic sub-areas into the method of FIG. 6.

FIG. 9 is a flowchart of a method 900 of incorporating interactive geographic sub-areas into method 600 of FIG. 6. Method 900 may, for example, be executed by one or more processors of a server (e.g., central server 105 of FIG. 1) or any other appropriate hardware and/or software. Further, when executing method 900, the one or more processors may execute instructions stored in one or more of the modules discussed above.

At step 910, the server may transmit a graphical display having sub-areas to one or more devices. For example, the server may transmit the graphical display to a device associated with a user (e.g., a cell phone, a tablet, or other personal computing device). In some embodiments, the graphical display may represent one or more regions corresponding to a government level having a plurality of sub-levels. The sublevels may correspond to the sub-areas included in the graphical display.

In some embodiments, the graphical display may include tagged data related to one or more sub-areas. For example, the graphical display may include scraped data tagged as relating to one or more sub-areas.

In some embodiments, the graphical display may include a term of interest received from a device associated with the user. For example, the graphical display may indicate whether the term of interest appears in policymaking data corresponding to each sub-area. In such an example, the graphical display may include information that quantifies the extent to which the term of interest appears for each sub-area. For example, the graphical display may include a color-shading scheme such that a sub-area having more policymaking data including the term of interest is shaded more heavily than a sub-area having less policymaking data including the term of interest. Other schema quantifying the extent to which the term of interest appears are possible (e.g., measuring the raw number of times the term of interest appears, etc.). The graphical display may also include text, for example, indicating the number of pieces of legislation, number of regulatory rules, or number of court cases associated with the selected sub-area.

At step 920, the server may enable interaction with the graphical display. For example, the server may enable a user receiving the graphical display on a device associated with the user to interact with the graphical display, e.g., by hovering over a sub-area or clicking a sub-area.

At step 930, the server may transmit scraped data associated with a selected sub-area. For example, the user may click or hover over a sub-area and thereafter receive scraped data associated with that sub-area. In this example, the user may click or hover over a sub-area and receive a list of pending bills or regulatory rules or court cases within the sub-area and related to the term of interest. The server may transmit other scraped data associated with the selected sub-area, e.g., the raw number of times the term of interest appears in pending bills, regulatory rules, or court cases within the selected sub-area, etc.

By way of further example, the server may transmit policymaking data associated with the selected sub-area, as described above with reference to method 800.

Methods 800 and 900 may include additional steps. For example, methods 800 and 900 may include receiving a request to filter a presentation to a specific legislative session. The request may be received from a device associated with a user. In response to the request to filter, the server may, after receiving the selection of the sub-area, display only scraped information relating to the specific legislative session.

Figure 10:
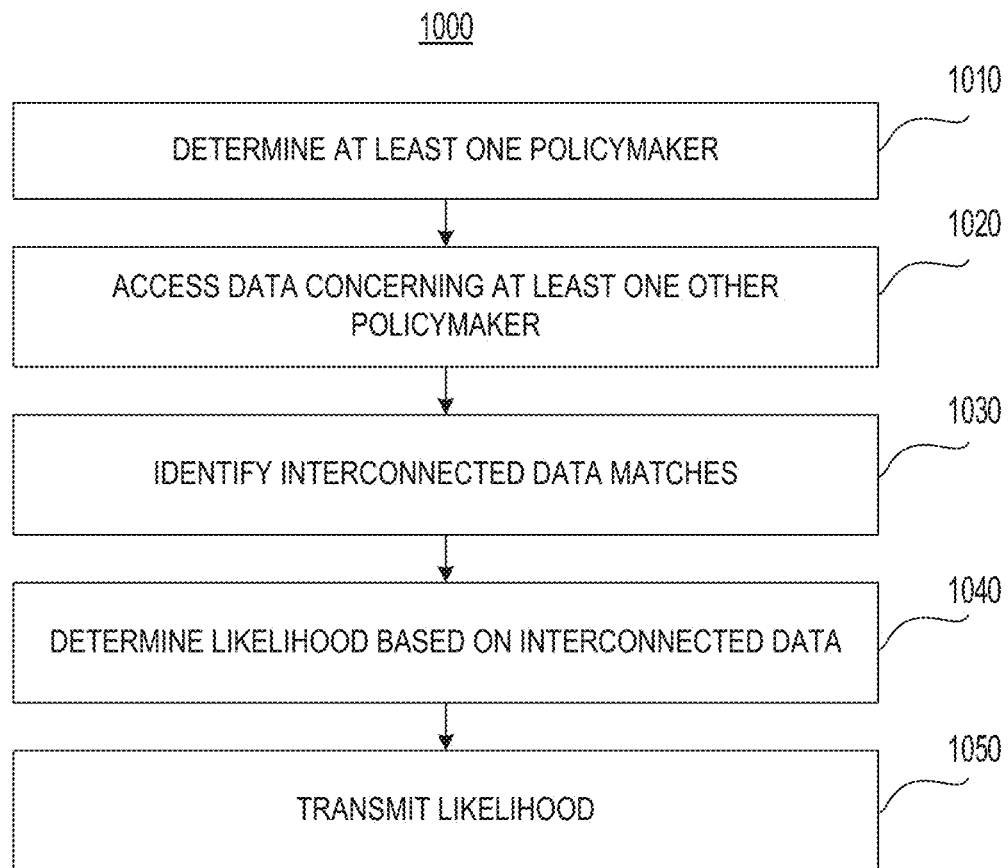
FIG. 10 is a flowchart of an example of a method of incorporating interconnected data between policymakers into the method of FIG. 6.

FIG. 10 is a flowchart of a method 1000 of incorporating interconnected data between policymakers into method 600 of FIG. 6. Method 1000 may, for example, be executed by one or more processors of a server (e.g., central server 105 of FIG. 1) or any other appropriate hardware and/or software. Further, when executing method 1000, the one or more processors may execute instructions stored in one or more of the modules discussed above.

With respect to a single policymaker, systems consistent with the present disclosure may perform one or more analyses on the policymaker. For example, a disclosed system may calculate an ideology rating for the policymaker. The system may use a uni-dimensional or multi-dimensional space to map the ideological leanings of the policymaker. For example, with a uni-dimensional space, a policymaker may be scored as more "conservative" or more "liberal"; with a multi-dimensional space, a policymaker may be scored as more "conservative" or more "liberal" on one issue (e.g., healthcare) and scored separately as more "conservative" or more "liberal" on other issues (e.g., immigration).

The ideological ends may vary as appropriate to the political culture in which the policymaker exists (e.g., "tory" versus "labour" rather than "conservative" versus "liberal") and may include more than two ends as appropriate (e.g., "conservative," "labour," and "liberal democrat"). An ideology may also include other belief structures, such as "religious" versus "non-religious," or a combination of a plurality of belief structures.

An ideological rating may be based on a plurality of factors, e.g., a policymaker's voting history, a policymaker's history of cosponsorship, a policymaker's comments or statement on their website or a news story or the like, financial contributions received by the policymaker, etc. As with modeling, a ranking algorithm may be trained using a training set coupled with machine learning.

In addition to ideology rankings, systems and methods consistent with the present disclosure may generate an interconnectedness model. For example, in such a model, a plurality of policymakers may be represented as a network with each node representing a policymaker. In certain aspects, the edges of the network may be binary—that is, representing a connection or lack thereof. In other aspects, the edges may be weighted, for example, with a higher weight indicating a closer relationship between nodes. Weights may be calculated using a plurality of factors, such as the number of times two policymakers have voted together, sponsored together, received donations from similar organizations, attended the same school or schools, and the like.

In addition to ideology rankings, systems and methods consistent with the present disclosure may generate an effectiveness score for one or more policymakers. For example, an effectiveness score may represent how likely a policy sponsored by that policymaker is likely to pass committee, pass a vote, be enacted, or the like. An effectiveness score may be calculated based on overall activity, based on one or more limited time periods, based on one or more particular policy areas (e.g., healthcare, tax, etc.), or the like.

Similar to effectiveness, systems consistent with the present disclosure may generate a gravitas score for one or more policymakers. For example, a gravitas score may represent how likely that policymaker is to sway or influence other policymakers. A gravitas score may be calculated based on the years the policymaker has served, the ranks the policymaker holds (e.g., in committees or organizations), or the like. A gravitas score may further be calculated based on an interconnectedness network, for example, with a policymaker's gravitas score based on the number of connections and the closeness of those connections within the network.

At step 1010 of method 1000, the server may determine at least one policymaker. For example, the server may receive the determination from a user via a device associated with the user. In other embodiments, the server may generate the determination using one or more algorithms. For example, the server may determine the at least one policymaker based on which policymakers occupy one or more leadership positions (e.g., speaker, whip, chairperson, chief judge, etc.) within the policymaking body. By way of further example, the server may determine the at least one policymaker based on an effectiveness score, a gravitas score, or the like.

At step 1020, the server may access data related to at least one other policymaker. In some embodiments, the server may access the data via scraping or other aggregation techniques. In other embodiments, the server may access the data from stored data in a database. The server may also use a combination of aggregation and stored data to access data related to at least one other policymaker.

For example, the server may access and identify information about a plurality of policymakers slated to vote on a pending bill, or making a determination on a pending rule, action, or case. In addition, the information may include voting records and party affiliation for the policymakers.

At step 1030, the server may identify interconnected matches (or "interconnected data matches") between the at least one policymaker and the at least one other policymaker. For example, as described above, the server may generate an interconnectedness network using the at least one policymaker and the at least one other policymaker.

By way of further example, the server may determine trends in similar voting patterns between the at least one policymaker and the at least one other policymaker. In this example, the system may determine how often the at least one policymaker and the at least one other policymaker voted together on the same policy; based on this frequency, the system may predict whether the at least one policymaker and the at least one other policymaker tend to vote together or not. This prediction may comprise a global prediction or may be limited to one or more types of policy (e.g., bill, joint resolution, and the like) to one or more areas of policy (e.g., taxes, healthcare, and the like), or to other categorizations.

By way of a further example, the server may determine influence indicators that connect policymakers. For example, the server may determine an influence score that quantifies one policymaker's influence over at least one other policymaker. As an example, the server may determine a high influence score for a Chief Justice and thus predict that he or she is likely to influence certain judges to vote in particular ways.

At step 1040, the server may determine a likelihood based on the interconnected matches. For example, the server may determine the likelihood of an outcome based on predicted positions of one or more policymakers as adjusted to account for the interconnectedness network.

By way of further example, the server may determine a likelihood based on predicting how each of a plurality of policymakers is likely to vote or make the determination. For example, the server may determine how each policymaker is likely to vote or make the determination based on interconnected match data, e.g., trends in similar voting patterns, influence indicators, and the like. As an example, the system may determine a likelihood of a bill in the UK Parliament being enacted by determining that Prime Minister David Cameron has a strong influence on most members of the Conservative Party and that Leader of the Opposition Ed Miliband has a mild influence on most members of the Labour Party and, based on these determinations, generating likelihoods on how each MP within the Parliament is likely to vote or make the determination.

At step 1050, the server may transmit the determined likelihood to a user. For example, the server may transmit the likelihood to a device associated with a user, e.g., a cell phone, a tablet, or other personal computing device.

FIG. 11 is a depiction of possible inputs into a system 1100. System 1100 may comprise, for example, a variation of central server 105 of FIG. 1. Moreover, system 1100 may include memory 500 of FIG. 5. As depicted in FIG. 11, system 1100 may include prediction system 1105. In some embodiments, prediction system 1105 may comprise a variation of central server 105 of FIG. 1, exemplary system 700 of FIG. 7, or the like. Prediction system 1105 may further include memory 500 of FIG. 5.

As further depicted in FIG. 11, scraped data 1101 and proprietary data 1103 may be input into prediction system 1105. Scraped data 1101 may comprise data related to one or more policymakers, data related to one or more policies, data related to one or more published news stories, data scraped from one or more social networks, or the like. Proprietary data 1103 may comprise information related to one or more private meetings, data related to one or more subscription news stories, or the like.

As depicted in FIG. 11, prediction system 1105 may generate a prediction 1107 and a likelihood 1109 from scraped data 1101 and proprietary data 1103. For example, system 1105 may apply one or more models, as discussed above, using scraped data 1101 and proprietary data 1103 as inputs. In some embodiments, system 1105 may parse and/or extract one or more features from some or all of scraped data 1101 and/or proprietary data 1103 before applying the data and/or features as inputs. Moreover, as discussed above, in some embodiments, proprietary data 1103 may include scarped data and/or may include non-scraped data.

In addition to the hardware and software discussed above, systems and methods of the present disclosure may be implemented, at least in part, using one or more graphical user interfaces (GUIs). For example, a user may submit queries and/or non-scraped proprietary information via one or more GUIs. By way of further example, interaction with one or more graphical displays may be facilitated via one or more GUIs. Accordingly, steps of methods 600 of FIG. 6, 800 of FIG. 8, or 900 of FIG. 9 may be facilitated via the use of one or more GUIs.

Figure 12A:
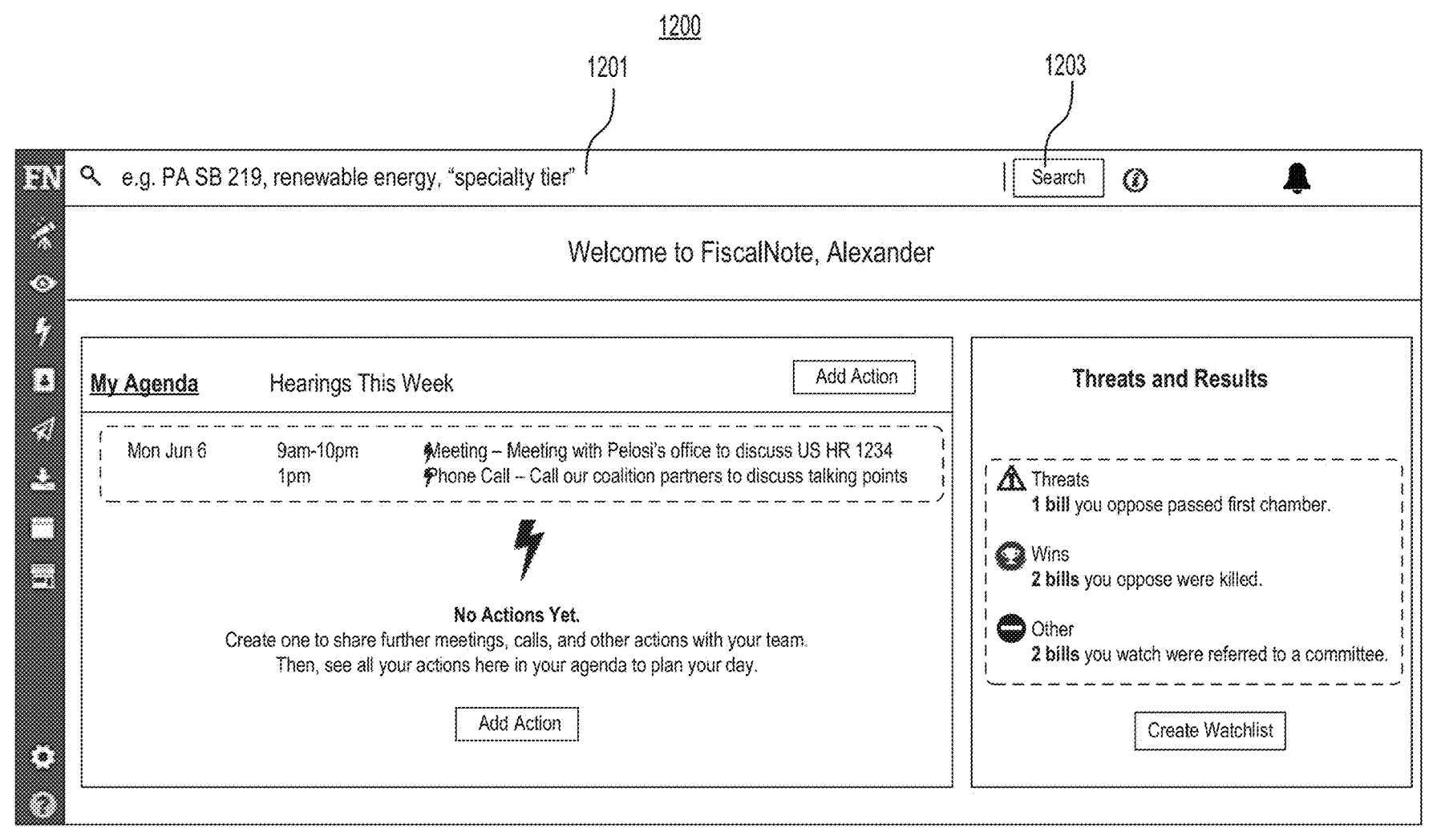

FIG. 12A is a screenshot of a GUI 1200 for receiving input from a user. As depicted in FIG. 12A, GUI 1200 may include a text box 1201 configured to allow a user to type input. As further depicted in FIG. 12A, GUI 1200 may include a button 1203 configured to transmit the input typed into text box 1201 to a remote system (not shown). For example, the remote system may comprise system 500 of FIG. 5, system 700 of FIG. 7, or the like.

Figure 12B:
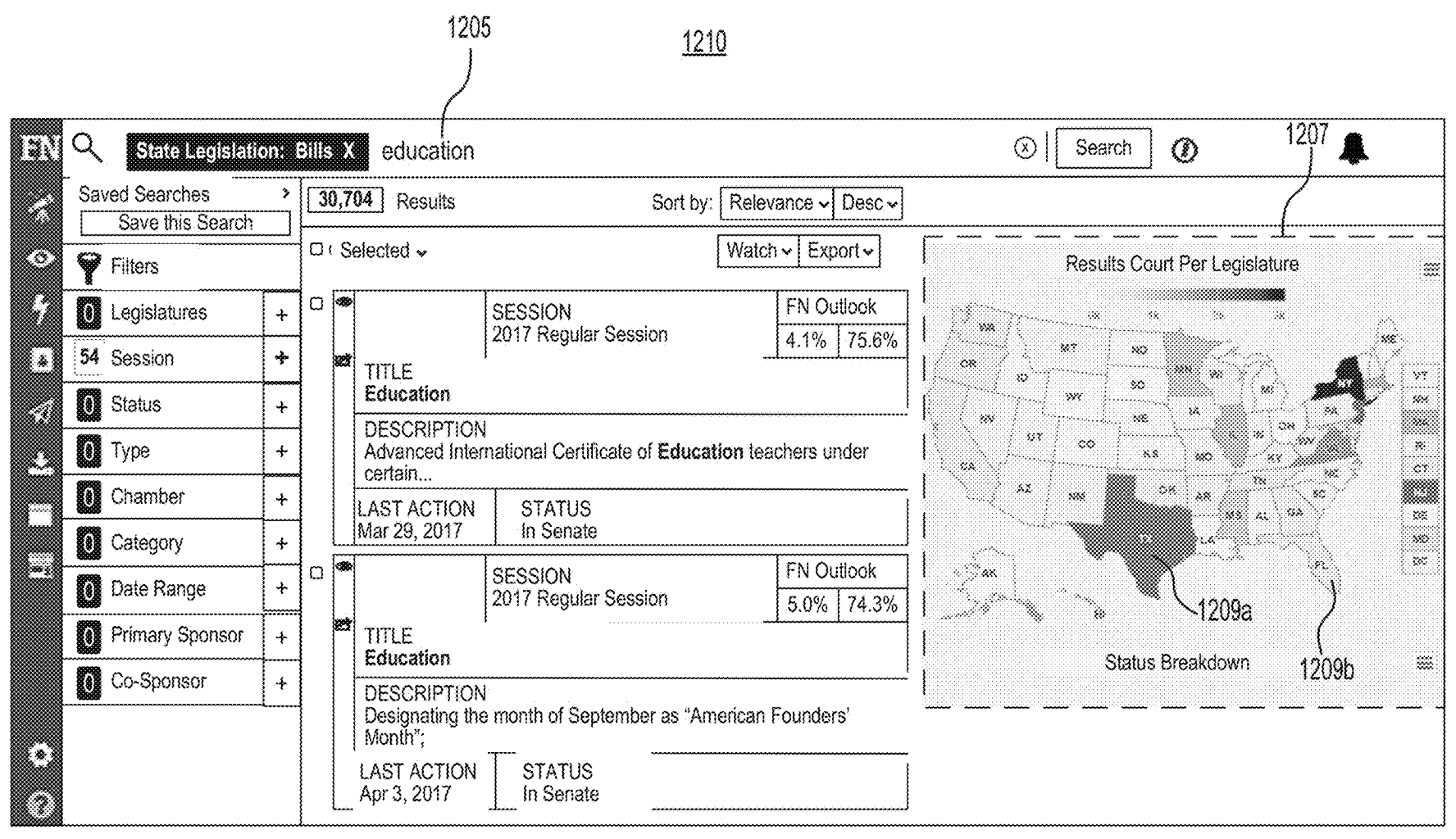

FIG. 12B is a screenshot of a GUI 1210 for causing a geographical display including sub-areas to include a term of interest. As depicted in FIG. 12B, GUI 1210 may include a term of interest 1205 that is mapped onto a geographical display 1207 including sub-areas, e.g., sub-areas 1209*a* and 1209*b*. In the example of FIG. 12B, the number of legislative bills related to the term of interest is mapped onto each relevant sub-area. Other variables related to the term of interest (e.g., the number of pending regulatory rules related to the term of interest, the number of pending court cases related to the term of interest, the number of pending policies related to the term of interest with a likelihood of enactment above a threshold, etc.) may be mapped onto each relevant sub-area.

Figure 12C:
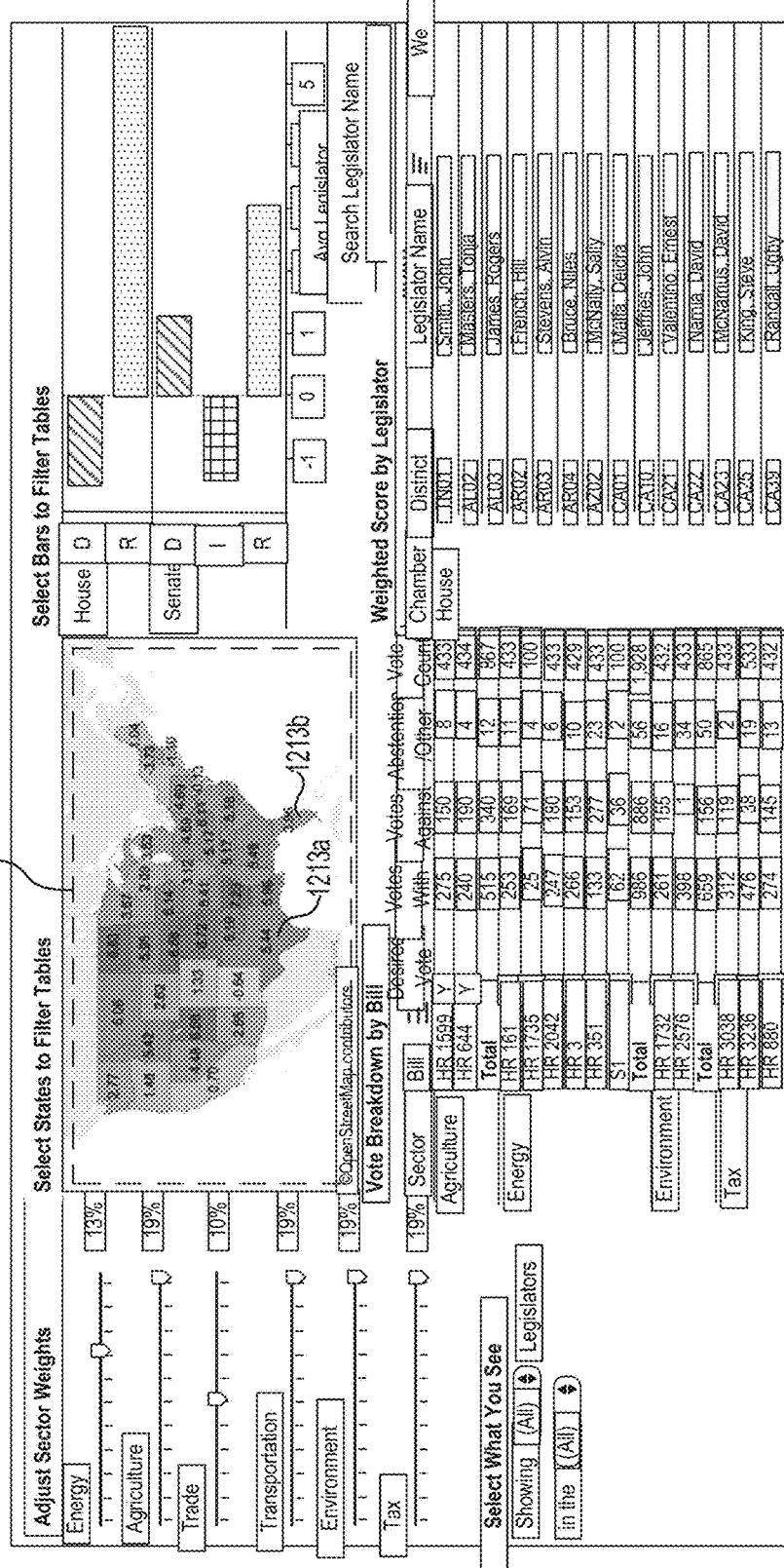
FIG. 12C is a screenshot of an example of a graphical user interface of a geographical display including sub-areas to include information specific to the sub-areas.

FIG. 12C is a screenshot of a GUI 1220 of a geographical display including sub-areas to include information specific to the sub-areas. As depicted in FIG. 12C, GUI 1220 may include a geographical display 1211 having sub-areas, e.g., sub-areas 1213*a* and 1213*b*, with one or more pieces of information specific to the sub-areas depicted in display 1211. In the example of FIG. 12C, a score representing the agreement between a government of the sub-area and one or more opinions input by the user is mapped onto each relevant sub-area. Other variables related to one or more opinions input by the user (e.g., the number of policymakers having an agreement score above a threshold, etc.) may be mapped onto each relevant sub-area.

Figure 12D:
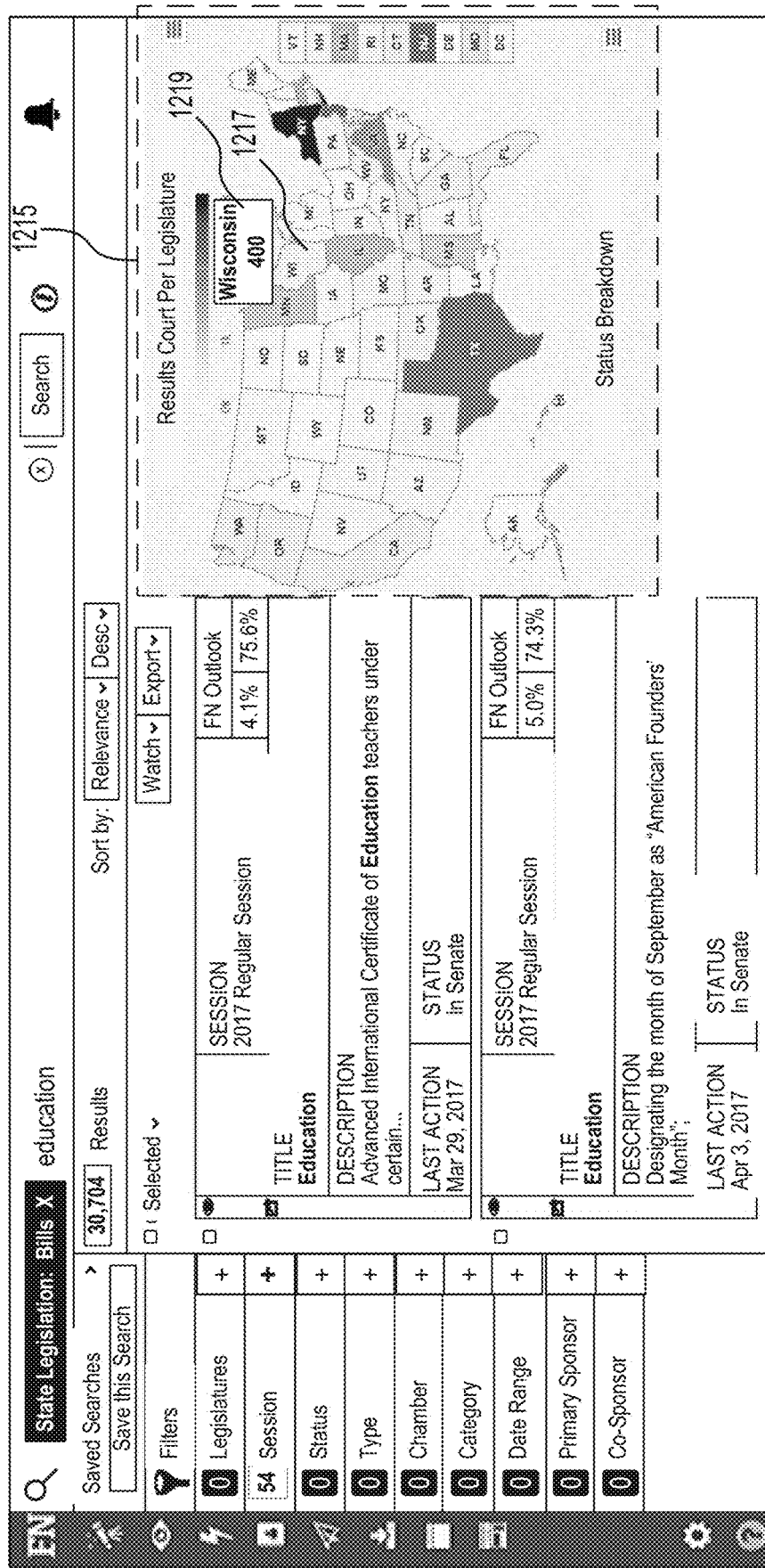
FIG. 12D is a screenshot of an example of a graphical user interface for enabling a user to hover over a geographical display including sub-areas.

FIG. 12D is a screenshot of a GUI 1230 for enabling a user to hover over a geographical display including sub-areas. As depicted in FIG. 12D, GUI 1230 may include a geographical display 1215 having sub-areas, e.g., sub-area 1217. In the example of FIG. 12D, a user has hovered over sub-area 1217. In response to the hovering, GUI 1230 displays information 1219 near sub-area 1217. In the example of FIG. 12D, information 1219 comprises the number of legislative bills within sub-area 1217 related to the term of interest. Information 1219 may comprise any other variable related to sub-area 1217 and the term of interest (e.g., the number of pending regulatory rules within sub-area 1217 related to the term of interest, the number of pending court cases within sub-area 1217 related to the term of interest, the number of pending policies within sub-area 1217 related to the term of interest with a likelihood of enactment above a threshold, etc.).

Figure 12E:
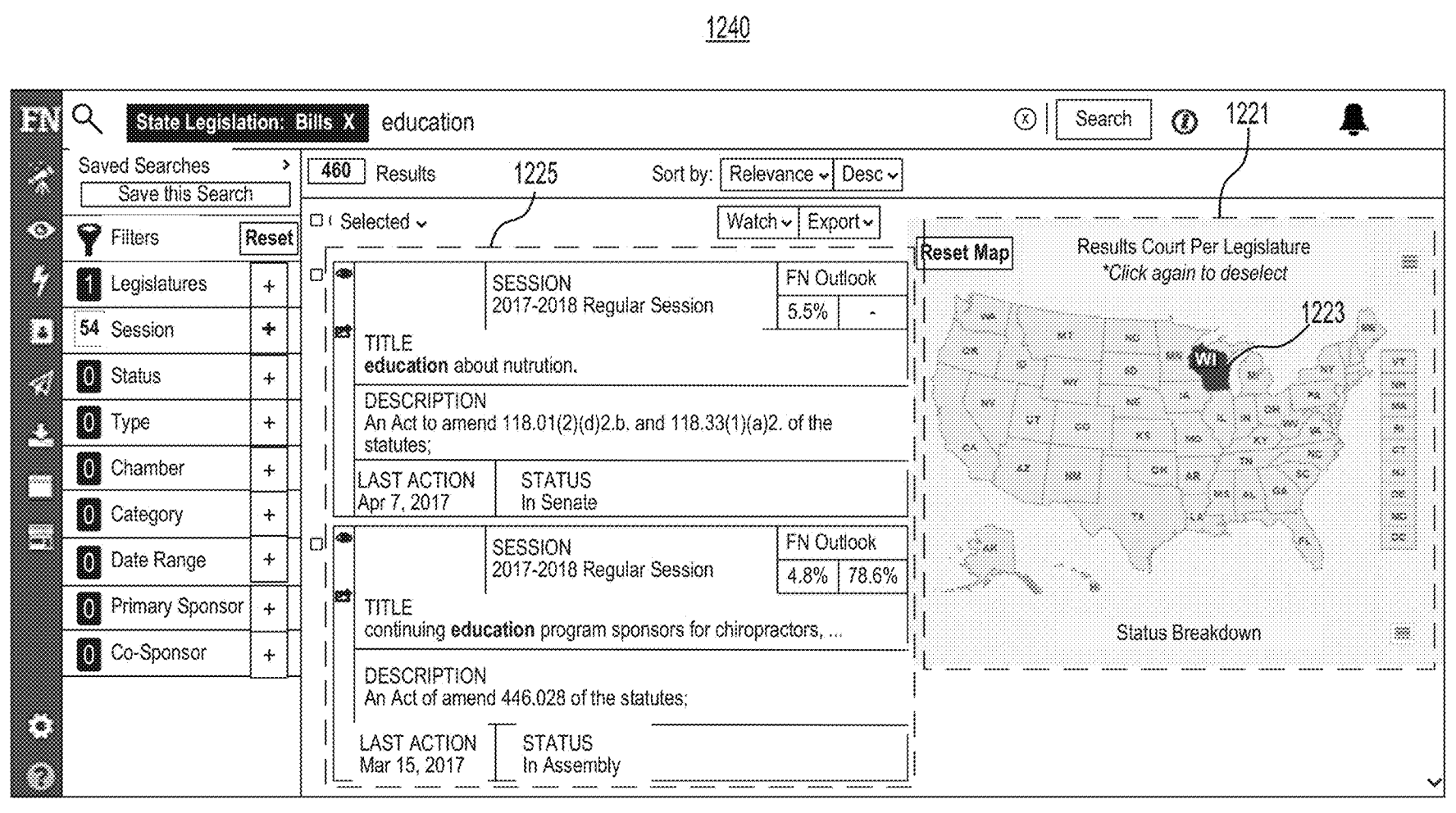

FIG. 12E is a screenshot of a GUI 1240 for enabling a user to click on a geographical display including sub-areas. As depicted in FIG. 12E, GUI 1240 may include a geographical display 1221 having sub-areas, e.g., sub-area 1223. In the example of FIG. 12E, a user has clicked on sub-area 1223. In response to the clicking, GUI 1240 displays results 1225 related to sub-area 1223. In the example of FIG. 12E, results 1225 comprise a list of legislative bills within sub-area 1223 related to the term of interest. Results 1225 may comprise any other list of items related to sub-area 1223 and the term of interest (e.g., a list of pending regulatory rules within sub-area 1223 related to the term of interest, a list of pending court cases within sub-area 1223 related to the term of interest, a list of pending policies within sub-area 1223 related to the term of interest with a likelihood of enactment above a threshold, etc.).

Mapping to Milestones in a Policymaking Process

In parsing aggregated documents related to policymaking, systems and methods consistent with the present disclosure may normalize one or more terms of the documents. In some embodiments, the normalization may be applied to one or more temporal milestones related to policymaking. As used herein, a "temporal milestone" may refer to one or more steps in a sequence of steps through which a policy may progress prior to enactment. For example, with respect to legislation, temporal milestones may include introduction of a bill, a bill passing a committee, a floor vote taken on the bill, and the like. By way of a further example, with respect to regulatory rules, temporal milestones may include introduction of rule, opening of a notice-and-comment period, publishing of a revised rule, and the like. By way of a further example, with respect to court cases, temporal milestones may include motion hearings, decisions on motions, opening statements, closing statements, and the like.

Normalization may accept one or more local temporal milestones (or "local terms") and replace them with global temporal milestones (or "normalized terms"). As used herein, the term "local temporal milestones" refers to temporal milestones as used in one or more localities—that is, in one or more jurisdictions (e.g., a government). In some embodiments, the system may derive global milestones from one or more of the local milestones. In other embodiments, the system may receive a new set of global milestones. Some jurisdictions may not have temporal local milestones that correspond to every global temporal milestone, and some jurisdictions may have temporal local milestones that do not have a corresponding global temporal milestone.

The replacing of local terms with normalized terms may include parsing one or more documents to identify local terms and mapping the identified local terms to normalized terms. Parsing may include using one or more machine-learned algorithms or other computer-implemented rules, e.g., term matching. Parsing may also include outputting one or more potential identifications of local terms and may include one or more confidence scores associated with the potential identifications.

Mapping may include substituting one or more local terms with normalized terms. The mapping may include one-to-one associations, many-to-many associations, one-to-many associations, many-to-one associations, and/or combinations thereof. A mapping may be modified and/or updated using machine learning or other computer-implemented rules such that the mapping is modified during subsequent uses. As with parsing, mapping may include outputting one or more potential normalized terms and may include one or more confidence scores associated with the potential normalized terms. For example, mapping may accept local terms like "enacted," "passed," "succeeded," "enforceable," and the like, and output a normalized term like "enacted." Further, in some embodiments, mapping may involve accessing a data structure such, as for example, a lookup table.

Normalization may further be applied to citations within documents. For example, a local citation used in one or more localities may conform to one or more standardized citation formats (e.g., MLA, CPA, Bluebook) or may conform to a standardized style or tradition established within the locality. Normalization may replace one or more local citations with global citations.

Similarly, normalization may be applied to relational terms between documents. For example, a local relational term used in one or more localities may represent relationships between one or more policymaking documents. For instance, the U.S. federal government publishes the "Federal Register" that contains "Authority Citations" to statutes that are claimed to provide authority for the promulgation of one or more regulatory rules; meanwhile, the Utah state government publishes the "Utah State Bulletin" that contains "Statutory Authorization" citations to statutes that are claimed to provide authority for the promulgation of one or more regulatory rules. Normalization may replace one or more local relational terms (e.g., "Statutory Authorization") with global relational terms (e.g., "Authority Citations").

Normalization may further be applied to actor-based terms within documents. For example, a local relational term used in one or more localities may represent a relationship between a document and an actor. For instance, legislative bills in the U.S. Congress have "sponsors" and "cosponsors"; meanwhile, legislative bills in the Virginia General Assembly have "patrons" and "copatrons." Normalization may replace one or more local actor-based terms (e.g., "patron") with global actor-based terms (e.g., "sponsor").

Normalization may also include storing the local term and/or normalized term in one or more databases. For example, the terms may be stored in one or more databases or one or more lookup tables for use in future normalizations.

Figure 13:
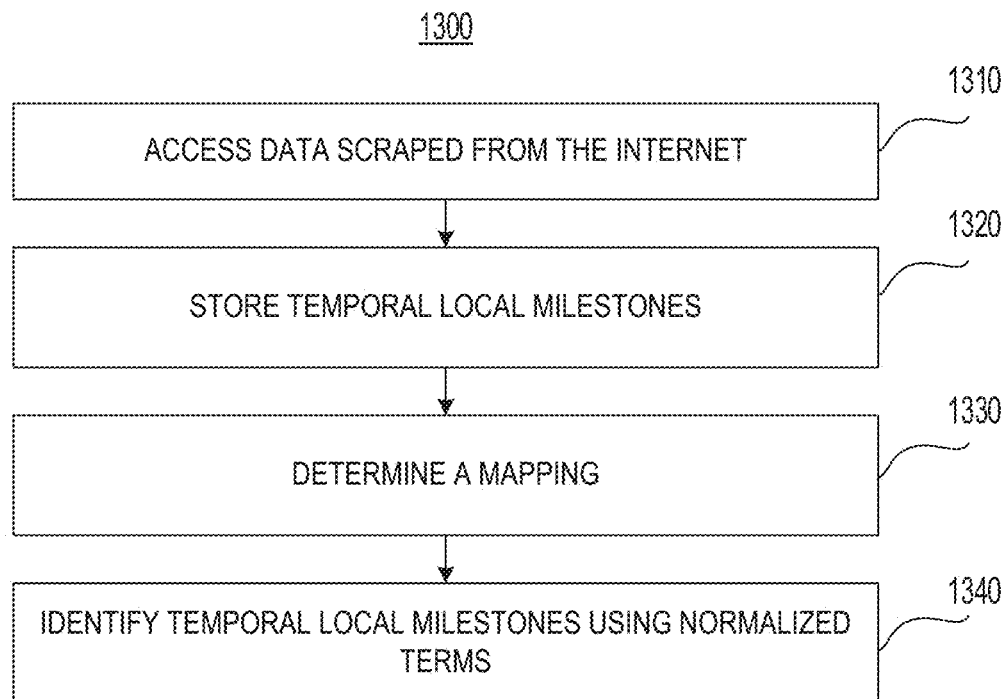
FIG. 13 is a flowchart of an example of a method for normalizing aggregated electronic data.

FIG. 13 is a flowchart of a method 1300 for normalizing aggregated electronic data. Exemplary method 1000 may, for example, be executed by one or more processors of a server (e.g., central server 105 of FIG. 1) or any other appropriate hardware and/or software. Further, when executing method 1300, the one or more processors may execute instructions stored in any one of the modules discussed above.

At step 1310, the server may access scraped data, for example, data scraped from the Internet. In some embodiments, the server may obtain the data using one or more scraping or other aggregation techniques, as discussed above. In certain aspects, the server may also store the accessed scraped data, for example, in policymaker database 501.

In other embodiments, the server may access the data stored in a database. For example, the server may access policymaker database 501 to access the scraped data. The server may also use a combination of obtaining and accessing. By way of further example, accessing the data may include parsing fields of documents associated with differing government bodies. For example, the documents may be legislative (related to a legislature), regulatory (related to a commission), or judicial (related to one or more courts).

In some embodiments, the scraped data may have been gathered from a plurality of local databases for a plurality of temporal local milestones. For example, each local database may store localized terms for characterizing the temporal local milestones. By way of a further example, the server may access scraped data related to at least two locales such that at least a first localized term for at least a first temporal milestone in a first local database associated with a first locale differs from at least a second localized term for a similar second temporal milestone in a second localized database associated with a second locale. For example, the first locale and the second local may both comprise state governments. By way of a further example, the first locale may comprise a federal government, and the second locale may comprise a state government.

At step 1320, the server may identify and store one or more local temporal milestones in the data. For example, the server may use one or more machine-learned algorithms or other computer-implemented rules, e.g., term matching, to identify the local temporal milestones. By way of a further example, the server may identify the term "sent to committee" as a local temporal milestone using a predefined list of local temporal milestones and/or machine learning algorithms.

In some embodiments, the server may store the identified milestone with a corresponding confidence score representing the robustness of the identification. For example, the server may identify the term "sent to committee" as a local temporal milestone with 92% confidence. The confidence score could further be represented using decimals, integers, or any other appropriate scale.

In some embodiments, the local temporal milestones (also termed "localized terms") may refer to events in a legislative history, events in a regulatory history, or events in a court case.

At step 1330, the server may determine a mapping. For example, the mapping may include may include one-to-one associations between local milestones and global milestones, many-to-many associations, one-to-many associations, many-to-one associations, and combinations thereof. In some embodiments, the mapping may be created/modified and/or updated using machine learning such that the mapping is modified during subsequent uses. In some embodiments, the mapping may be stored in policymaker database 501. In other embodiments, the mapping may be stored in a separate database or lookup table.

At step 1340, the server may identify one or more global temporal milestones corresponding to the local milestones using the mapping. As in step 1320, the server may also generate a corresponding confidence score representing the robustness of the identification. For example, the server may identified "assigned to committee" as a global temporal milestone corresponding to the identified local temporal milestone of "sent to committee." By way of a further example, the server may also output the match with a confidence score of 84%. The confidence score could further be represented using decimals, integers, or any other appropriate scale.

In some embodiments, identifying one or more global temporal milestones may include displaying a timeline associated with the locale containing each associated temporal local milestone using the normalized term for each milestone, even when the normalized term is not officially recognized in the locale. In embodiments including at least two locales, the displayed timeline may be associated with the first or second locale and contain each associated temporal local milestone using the normalized term for each milestone, even when the normalized term in not officially recognized in the first or second locale. Moreover, in embodiments including at least two locales, the displayed timeline associated with the first locale and the displayed timeline associated with second locale may be normalized in a common format despite differences between the locals. For example, a timeline for a legislative bill in Utah may be in the same format as a timeline for a legislative bill in the U.S. Congress.

Figure 14A:
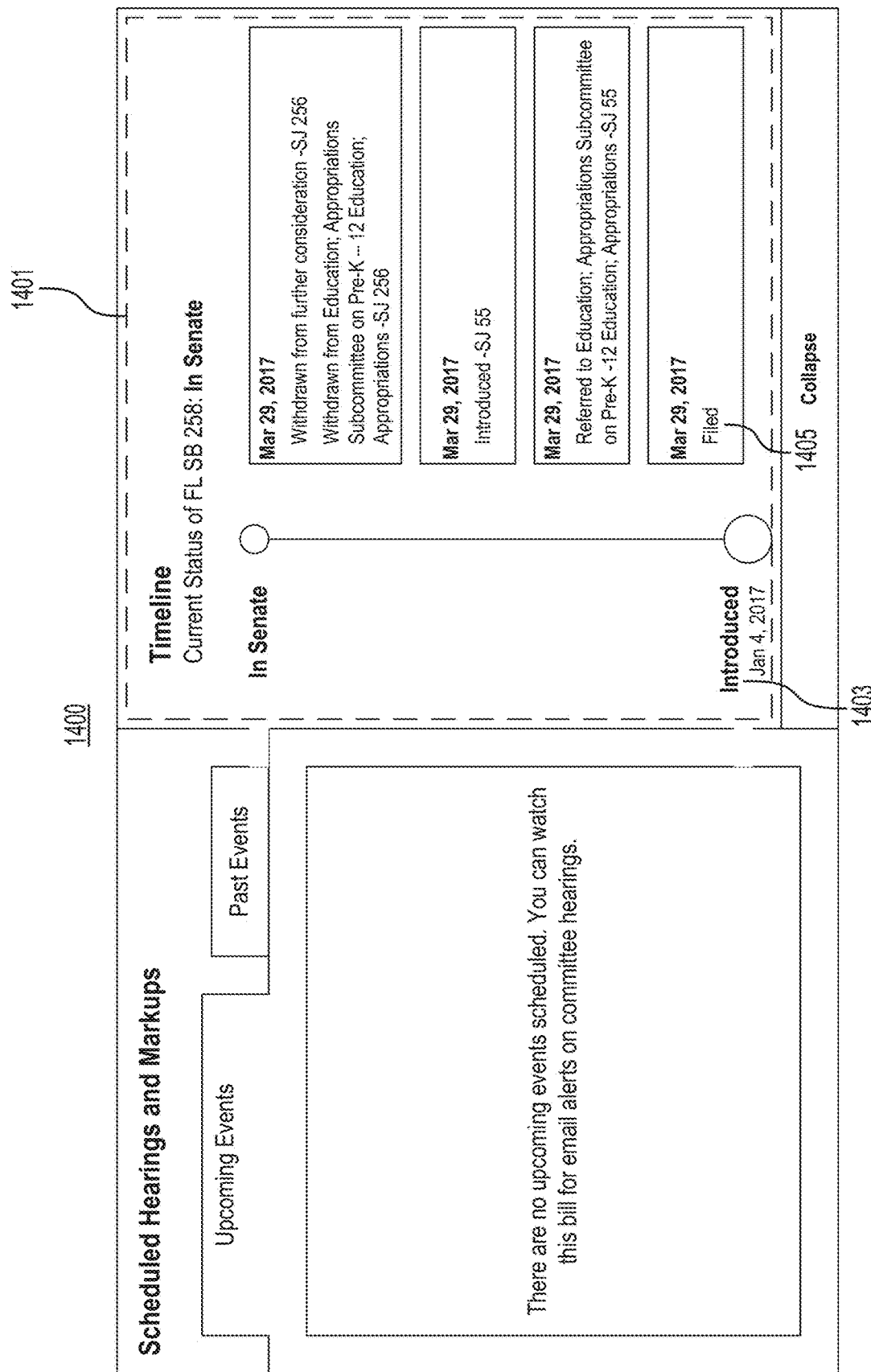
FIG. 14A is a screenshot of an example of a graphical user interface for displaying one or more normalized terms in a timeline.

FIG. 14A is a screenshot of a GUI 1400 for displaying one or more normalized terms in a timeline. As depicted in FIG. 14A, GUI 1400 may include a timeline 1401. As further depicted in FIG. 14A, timeline 1401 may include one or more normalized terms, e.g., normalized term 1403, and one or more local terms, e.g., local term 1405.

FIG. 14B is a second screenshot of a GUI 1410 for displaying one or more normalized terms in a timeline. Similarly to FIG. 14A, as depicted in FIG. 14B, GUI 1410 may include a timeline 1407. As further depicted in FIG. 14B, timeline 1407 may include one or more normalized terms, e.g., normalized term 1409, and one or more local terms, e.g., local term 1411.

Steering an Agenda Based on User Collaboration

In some embodiments, the disclosed systems and methods may involve collaborative prediction for altering predictive outcomes of dynamic processes. For example, users may collaborate across a network in order to steer legislative agendas or proposed legislation. Collaboration may enable a legislative agenda to be advanced by permitting colleagues to work together to take actions that alter a predicted outcome. This collaboration may occur on a common system that enables collaborators to view a legislative bill, discuss the legislative bill, and take actions that increase or decrease the likelihood of the bill's passage or likelihood of any intermediate stages.

While the present disclosure provides examples of collaborative systems and methods for altering predictive outcomes of dynamic processes, aspects of the disclosure in their broadest sense, are not limited to steering legislative agendas or proposed legislation. Rather, it is contemplated that the foregoing principles may be applied to altering predictive outcomes for other specific dynamic processes as well. For example, the term "specific dynamic process" includes any legislative, regulatory, administrative, judicial, or other related proceedings or processes for policymakers. The term "legislative agenda" includes any ideas or set of policymaking that are desired to be made more or less likely.

In some embodiments, user collaboration may enable a regulatory agenda to be advanced on a common system that enables one or more users to view a regulatory proposal, discuss the regulatory proposal, and take actions that increase the likelihood of the regulatory proposal's passage. The term "regulatory agenda" includes any of a set of predetermined regulatory ideals or regulation that users may aim to advance. In other embodiments, user collaboration may enable an administrative agenda to be advanced on a common system that enables administrators to view an administrative proposal, discuss the administrative proposal, and take actions that increase the likelihood of a desired administrative outcome, for example the administrative proposal's modification, or the administrative proposals passage. In still other embodiments, user collaboration may enable a judicial agenda to be advanced on a common system that enables judges to view a proposed judicial decision, discuss the proposed judicial decision, and take actions that increase the likelihood of the judicial decision. In still other embodiments, user collaboration may enable a judicial agenda to be advanced on a common system that enables lawyers or individuals seeking legal counsel to view a proposed judicial decision, discuss the proposed judicial decision, and/or take actions that increase the likelihood of the desired judicial decision.

The term "outcome" may include a likelihood that legislation is introduced, assigned to certain legislative committees, recommended out of a certain legislative committee, taken up for consideration on a legislative floor, passes a floor vote, or is ultimately passed and enacted. While the present disclosure provides examples of collaborative systems and methods for altering predictive outcomes of dynamic processes, aspects of the disclosure in their broadest sense, are also not limited to any type of predictive outcome. For example, a set of possible outcomes may include various stages of legislative, regulatory, administrative, judicial, and other related proceedings or processes are contemplated.

As discussed earlier, system 100 may comprise a network 101, a plurality of sources, e.g., source 103a, 103b, and 103c, a central server 105, and user(s) 107. System 100 may allow for information to be scraped from the internet. In some embodiments, system 100 may also include devices 300, 400 for receiving user input from user(s) 107 collaborating in order to alter predictive outcomes for dynamic processes.

Figure 15:
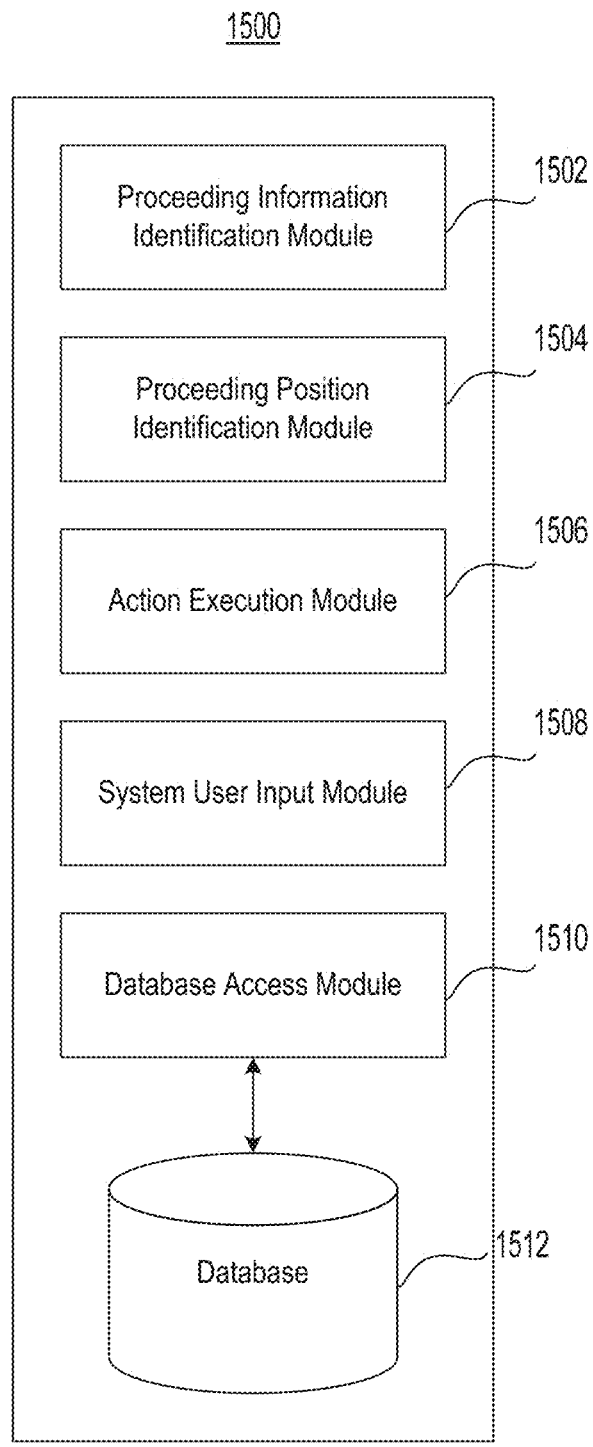
FIG. 15 is a diagrammatic illustration of an example of a memory storing modules and data for altering predictive outcomes of dynamic processes.

FIG. 15 is a diagrammatic illustration of a memory 1500 storing modules and data for altering predictive outcomes of dynamic processes in accordance with the present disclosure. Memory 1500 may include an application or software program providing instructions for collaboration between multiple user(s) 107 according to a communication-based dynamic workflow. The term "communication-based dynamic workflow" includes any set of instructions or rules that facilitate operational steps according to communication between user(s) 107. In some embodiments, memory 1500 may be included in, for example, central server 105, discussed above. Further, in other embodiments, the components of memory 1500 may be distributed over more than one location (e.g., stored in a plurality of servers in communication with, for example, network 101).

Memory 1500 may include a proceeding information identification module 1502, a proceeding position identification module 1504, an action execution module 1506, a system user input module 1508, a database access module 1510, and a database 1512. In some embodiments, system user input module 1508 may receive user input or a request from user(s) 107 interacting with a graphical user interface (GUI) on devices 300, 400. Proceeding information identification module 1502 may then communicate with system user input module 1508 to identify the nature of the user input or request.

Proceeding information identification module 1502 may then communicate with action execution module 1506 to take action and execute instructions to gather information related to the user input or request. For example, action execution module 1506 may instruct database access module 1510 to gather information from database 1512. In still other embodiments, proceeding position identification module 1504 may analyze the information procured from the database 1512 in order to provide a tendency or likelihood of a favorable outcome. Action execution module 1506 may then display this result to user(s) on GUIs displayed on devices 300, 400. Other types of communication-based dynamic workflows between user(s) are also contemplated.

In further embodiments, and in response to one or more results displayed to the user, user(s) 107 may provide feedback to system user input module 1508 related to their experience with part or all of the system 100. The term "feedback" may include communication related to data, analytics on data, mappings, predicted outcomes and their likelihoods, and any other user or system generated feedback. For example, feedback may reflect relevance of information or prediction to the user(s), in general or based on a specific query, user priority of the information, user position on the information, correctness, and timeliness.

In other embodiments, feedback may be provided prior to, at the time of, or after the item data is acquired or a prediction is generated. For example, user(s) 107 may create and update a profile at any time during their engagement with system 100. The term "profile" may include a set of user preferences, and a preference may be interpreted as feedback. For example, a preference may indicate the type of data the user is interested in. This indication may be in the form of specific terms that occur in documents, broad or specific subject areas which are produced by system 100 via analysis to categorize the document, local or global milestones, and policymakers associated with the data, such as legislators or agencies, and document types.

In some embodiments, a preference may indicate the likelihoods of predicted outcomes which the user is interested in. For example, the user may only want to be notified on any predicted outcomes with a very low likelihood. A preference may also have or more sub-preferences, or may constitute a combination of one or more preferences. For example, a user 107 may define his or her own preference to indicate the threshold at which a predicted outcome likelihood becomes "very low." A user 107 may further have more than one definition of such a likelihood. In some aspects, a different threshold may be set to indicate "very low likelihood" for each different piece of analysis, such as predicted passage of a bill having a different threshold than promulgation of a rule.

In other embodiments, a preference may indicate the relationship a first user holds to a second user. For example, this may include the type of feedback, models, or other user generated data the first user restricts, or shares.

In some embodiments, both the first and second user may be able to jointly provide feedback, including on existing models, and create new models, or any sub-parts. In this example, system 100 may hold a single version of the feedback for both users, or hold individual copies of feedback for each user that is then combined to form the combined feedback. In other embodiments, the user may distinguish which feedback was provided by which user, or feedback may be anonymized such that user is unable to distinguish where the feedback came from.

In some embodiments, generated models successively updated by a first user may have versions, each version representing a single piece of feedback, or multiple pieces of feedback. Each version of the model may be stored and accessed separately. Similarly, feedback provided by the second user on the same set of outcomes may be versioned. In other embodiments, if the first and second user do not share a permission group, and both provide feedback on the same data for the same outcome, their respective feedback may be processed separately and a first users system may be unaffected by second users feedback, and the second users system may be unaffected by first users feedback.

In some embodiments, if a first user selects to share feedback, models, out other data with second user, second user may see the initial predicted outcome, a version of the predicted outcome, or first user predicted outcome and the associated likelihoods. In other embodiments, a preference may also indicate the frequency at which the user should be notified of updates to the data, including new or updated data, second user feedback, or new or updated predicted outcomes or likelihoods. For example, a first user may provide feedback on the feedback of a second user.

In some embodiments, a preference may also indicate the position the user will take on a given issue. An issue may be a system predefined subject area categorization, a user updated system model, or a user specified issue area, represented as a set of terms, linguistic patterns, labels, or a user initiated categorization model. A position may be an indication of the user's opinion on the issue, such as the issues priority, relevance, importance, or if the user is in support or opposition of the issue. These preferences may be set prior to the acquisition or generation of a target piece of data or analysis, and may be applied to the target at the time it is acquired, or at any point later, such as on user request.

In other embodiments, feedback may include proprietary data, as discussed above. For example, feedback may also include feedback on sub-parts of the data or analysis. As a further example, users may provide feedback on the predicted outcome of a given model, such as their agreement with the predicted outcome of a given legislator voting favorability for a bill. They may also provide feedback on the thresholds used in the model scoring function, such as that a probability of a sponsor voting yes with less than 70% probability means they will vote no.

In other embodiments, users may provide feedback on one or more parameters used by the model, such as the features used and weighting of those features. Users may also provide feedback on an individual feature or weight, or a grouping of features or weights together, where the grouping may be determined by the user or the system.

For example, a user may indicate that the feature representing the sponsor effectiveness for a specific sponsor of a legislative bill should be removed or that the features representing the sponsor effectiveness for all sponsors should be removed, or may select a specific sub-group of sponsors for whom the feature should be removed, or that the sponsor effectiveness features should be removed their importance as computed by the model is lower than some threshold. Moreover, the user may indicate that any of those features or groupings may be weighted lower by the model.

In some embodiments, a user may indicate that some training instances such as documents be given higher or lower importance for computation of model parameters. For example, a user may indicate for subject area categorization of documents into the "financial" category, documents containing the term "angel fund." Therefore, a feature vector generated from those documents may be weighted lower than documents containing the term "toxic assets." The feedback on weighting may be relative, such as a first feature weighted lower than a second feature, or absolute, such as when a feature should receive a specific weight set by the user. The feedback on weighting may completely replace system generated weighting, or may alter it, such as by adding or subtracting some amount. In other embodiments, relative and absolute weighting may be represented as real numbers. For example, a first feature may have a weight of 5.3. The first feature may be represented in percentages, and the first feature may be 50% of the second feature. A first feature may also have a coding scheme comprised of high, medium, and low levels.

In some embodiments, feedback and collaboration may change the calculation of an existing system defined feature. For example, user feedback may indicate that the legislator effectiveness score should not take into account non-substantive legislation. In some embodiments, user feedback may create new features for a model. For example, a user may create an additional feature for the argument recognition model for the outcome of recognizing if a policy documents presents the argument of lacking time. The feature may be a term, such as "this policy does not provide enough." The feature may be associated with a desired outcome by the user, such that when observed by the system in a policy it is associated with the outcome of lacking time. If such a feature and the associated outcome conflicts with any set of features derived by the model, or the predicted outcome, the user may have a preference of how the conflict should be resolved. Alternatively, the user created feature may be left to the system to decide the correlation. The features associated weights may be specified by the user or computed by the system. The user created feature may be a term, linguistic pattern, user-defined coding system, etc.

In other embodiments, feedback on the model, such as the predicted output, or sub-parts of the model, such as weighting or parameters, may result in the model being recomputed. Any feedback, including modified features, weights, or new features may be computed by the system on all data, only for a subset of data or models, including, for example, proprietary data, as indicated by the default profile settings or user profile settings.

In some embodiments, the re-computation may include removal of an entire training instance, such as when the user indicates that part or all of the system data was incorrect, removal of features from a training instance, changing of weights applied to features of a training instance, introducing new training instances, such as from proprietary data provided by the user, introducing new features into a training instances, such as from new features created by the user.

In other embodiments, the model may not be recomputed based on feedback. For instance, after feedback indicating that a feature or group of features should be removed, a previously generated model may be applied, while removing those features indicated by the user from the scoring function, thus removing their effect on the output, without re-computation of the model in a model training phase.

In some embodiments, feedback on a model predicted output or likelihood may affect other predicted outputs of the model according to memory 1500. For example, feedback indicating one legislator will vote yes on a given bill, may result in the updating of the predicted outcome and likelihoods of the other legislators. In some embodiments, this update may occur for the predicted votes on the specific data instance, i.e., bill, on which the feedback was provided. In other embodiments, this update may also affect the predicted outcome (e.g., voting behavior) of the user updated legislator on other bills, not directly given feedback by the user, and other legislators on other bills.

In other embodiments, feedback indicating that a first comment submitted for a regulation is opposing the regulation, may update the analysis of a second comment, either on the same regulation or others. For instance, analysis of the second comment may have indicated that the commenter agrees with the position of the first comment. If automated or manual analysis of the first comment indicated the comment is supporting the regulation, user feedback indicating the comment is in fact opposing the regulation, will update the position of the second comment to opposition.

In some embodiments, feedback on a model predicted output or likelihood may affect other models or module 1500, that produce a different predicted outcome. For example, user collaboration or feedback on a given bill's likelihood of enactment may affect the predicted outcome and likelihood of the model predicting when a rule on the subject will be promulgated. As a further example, user collaboration or feedback on a given bill's likelihood of enactment may affect the predicted outcome and likelihood of the model predicting the stance taken by a comment on a regulation.

In other embodiments, feedback on one model may or may not affect other models. Users may have the option to enable or restrict their feedback on one model from being used by other instances of the same model, or another model. Furthermore, users may have the option to enable or restrict their feedback from being used as feedback for other users models, whether in their organization or outside of it.

In some embodiments, another type of user feedback may instantiate the creation of an additional model. The additional model may be intended to compute one or a set of the same outcomes as existing models generated by the system, or may be intended to compute a new outcome that was previously unavailable by the system. The model may be generated by the system, or uploaded by the user. For example, user feedback may specify that the user wants to create a new model that computes how likely a bill is to be enacted. They may upload such a model into the system. Uploading a model may include transfer of data, associated files, etc. either through the network, into a computer, etc. in a specified format understood by the system. The user may instantiate the generation of a model for a new outcome. In one embodiment, the user may provide feedback to the system by labeling the impact a bill will have on their organization. The user labeled data may constitute training data for the creation of a model, as described above. The system may generate one or more models with some or all of the users' data as one or more inputs. Instead of using the raw user labeled data, the system may extract one or more features from the data, as discussed above, to use as inputs for the model. The system may generate and update these models periodically, e.g., on a schedule, or at the direction of the user. In other embodiments, a user may provide feedback to the system by labeling a user-defined subject area, such that documents deemed to be within that subject area are relevant to the users definition of that issue.

In some embodiments, for either an existing or new outcome, the system may select or allow the selection of a set of data, select or allow for the selection of a set features to be extracted, select or allow for the selection of a or a set of models to be generated, and select or allow for the selection of associated outcomes, e.g. enactment, impact, issue relevance, and initiate a model generation phase through the system. For example, if a user-defined wanted to create subject area model for "background checks for teen drivers," a user may select existing documents they deem relevant to the issue, select the set, or types of feature they want to extract, for example, phrases occurring in the document, select the type of model they want to have, for example a combination of a logistic regression and neural network, and have the system generate the model.

In other embodiments, the new model may be updated with additional feedback as any existing system model. Users may create new predicted outcomes from existing system models, or user generated models, or some combination thereof. Additionally, user generated models may be used by the system or the user as sub-parts of other models. User feedback, including on the models, sub-parts thereof, or creation of new models, may result in one or more models for each outcome. The user feedback may be used to generate a new model in a user specific model generation phase, or used to update the existing model, or a combination thereof, where a model may be a combination of the model generated from or update with user feedback, and a model generated by the system. For example, there may be multiple models that predict when a regulation will be promulgated, for example one from the system, one from a user providing feedback to the system model, and one from the user creating their own. Accordingly, the system may be able to provide users with tailored and more relevant information based on the users' requests and feedbacks. The system may also combine system acquired and generated data and proprietary data and may update the analytics and predictions to reflect the combination.

Figure 16A:
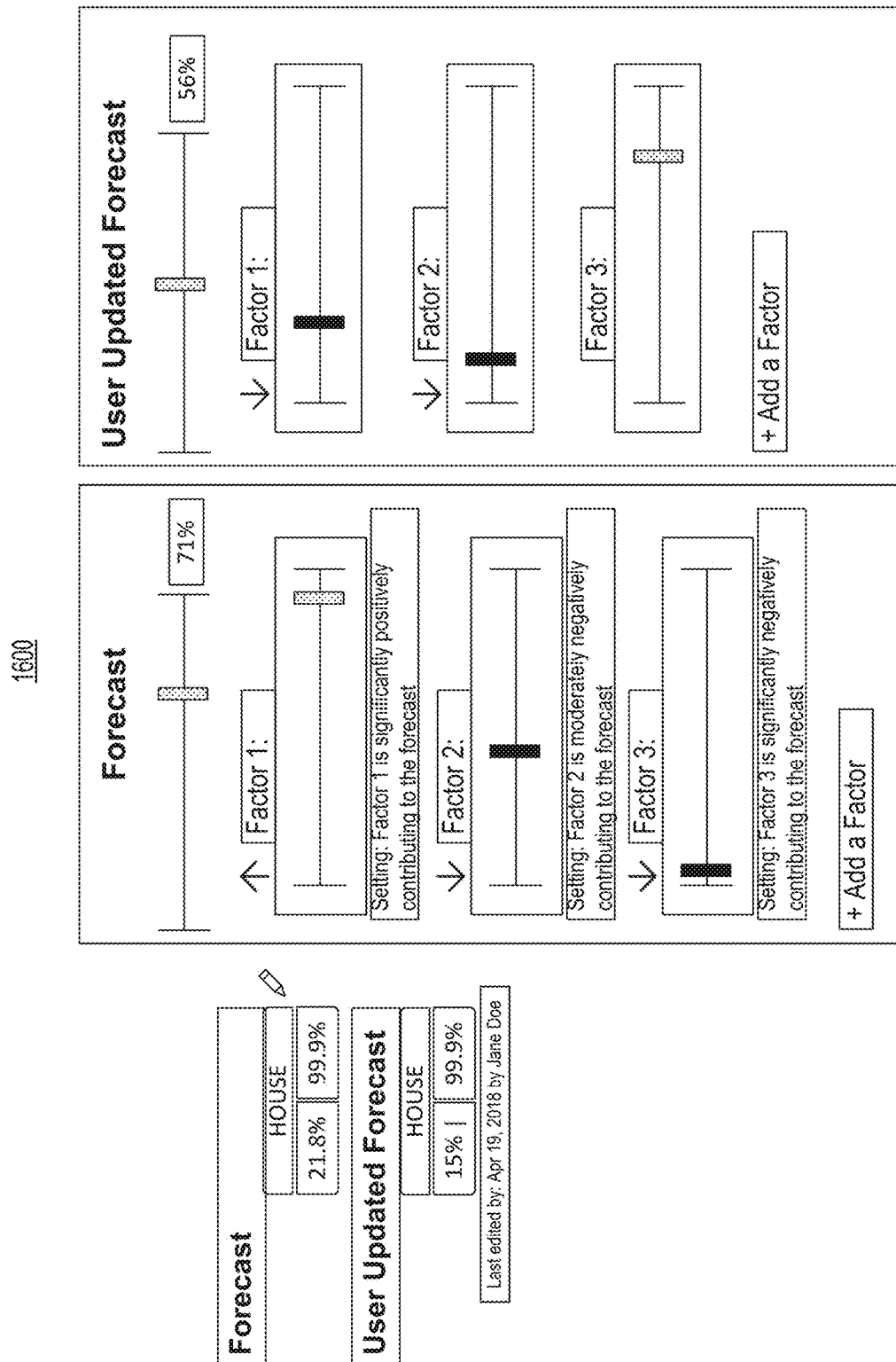
FIG. 16A is a diagrammatic illustration of an example of a graphical user interface used for user collaboration and feedback.

FIG. 16A is a diagrammatic illustration of an exemplary graphical user interface (GUI) 1600 for user collaboration and feedback consistent with the disclosure. GUI 1600 may be displayed as part of a screen executed by a software application on, for example, device 300 or device 400. The screen may take the form of web browser or web page consistent with the present disclosure. Exemplary GUI 1600 may include a system predicted outcome and likelihood and a user predicted outcome and likelihood based upon factors (e.g. features) that may be integrated with system 100 or defined by a user(s) 107. Exemplary GUI 1600 may include "Factor 1," "Factor 2," and "Factor 3," and may allow to "Add a Factor." GUI 1600 may further indicate an amount each factor is contributing to a predicted outcome and likelihood, whether system or used based. In particular, a quantitative output may be displayed indicating a likelihood of passage in percentage terms. For example, a system predicted outcome and likelihood may indicate a "71%" likelihood of passage as compared to a user predicted outcome and likelihood of "56%" likelihood of passage according to specified feedback and user set factors. The feedback factors may update a model, as discussed above, in order to change a predicted outcome and likelihood.

In some embodiments, feedback may be applied to data in the system automatically or manually. For example, a stored user preference may be to increase the likelihood of passage for any bill introduced by a specific senator to 90%. Another preference could be to weight a specific factor higher or lower than another specific factor for a given predicted outcome. For example, a preference may be to weight the occurrence of the term "tax liability" higher than the committee assignment of a bill in the predicted outcome of favorable recommendation out of the committee. This feedback may be applied automatically when the system acquires any bill sponsored by specific senator, or at some user defined time. User feedback or collaboration (including preferences) may be provided explicitly or implicitly. Explicit feedback may come in the form of user providing feedback that directly affects a specific model. Examples of direct feedback may be marking a document irrelevant for a specific subject-area categorization, which may update the subject-area categorization model to down weight any features associated with the irrelevant document; marking a document as opposing the rule, which may update the stance detection model to include that comment as part of the training set for opposing comments.

In other embodiments, implicit feedback may come from any interaction the user has with the system, whether or not it is intended to update existing or create new analysis. Implicit feedback may include uploading a draft document or sharing a document with another user on the system or publically, which may be used to update existing or create new models for subject-area relevancy categorization, where the terms inside the uploaded or shared document may be deemed relevant to the user.

In some embodiments, a profile may also be established by the system for a user, treating the user settings as predicted outcomes with an associated model. For example, the system may generate a model with the predicted outcome of whether the user will take a support or opposition opinion on an issue. The system may use data derived from a user's explicit and implicit feedback to establish this profile. The system may also use data derived from a second users feedback, in the users organization, or from other users, if the second users permission setting allow. In other embodiments, users may have the option to enable or restrict their feedback from being used as data for the establishment of other system generated user profiles, or other models. Once user feedback is in the system, it may be saved and be accessible for later use, either by the system, or other users. Feedback may be removed from the system.

In some embodiments, feedback may include user feedback on the system generated profile. For example, if the system generated profile contains a system generated model for predicting a user's support on an issue, and it predicts incorrectly, the user feedback on the system generated profile may include correcting the outcome. Feedback may be generated and represented in a number of forms such as clicking or selecting an option to indicate a correction to data or an analytic, input via a text entry, wherein the feedback will be parsed by the system, verbal feedback input through a microphone, wherein the feedback will be parsed by the system, or through an API, or other interface, etc. The profile may be represented and generated by a number of means. Users may create and update preferences via a GUI, and users' profiles may be set to default settings by the system, or preset based. Both the initial system prediction, and the updated predicted outcome based on user feedback may be presented to the user. Feedback may be stored by the system in one or more databases and files. The databases may be segregated from other databases containing non-proprietary data. User generated models or models incorporating any user feedback may be stored or run on the same machines as system derived models or may be stored or run in their own environment.

Figure 16B:
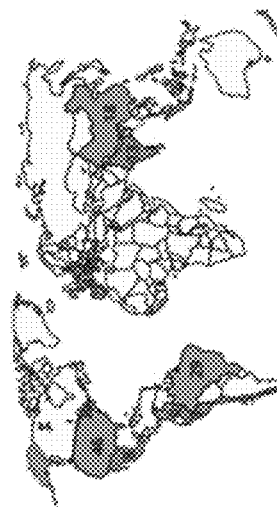
FIG. 16B is a diagrammatic illustration of an example of a graphical user interface used for user collaboration and feedback.

FIG. 16B is a diagrammatic illustration of a GUI 1610 for user collaboration and feedback consistent with the present disclosure. GUI 1610 may be displayed as part of a screen executed by a software application on, for example, device 300 or device 400. The screen may take the form of web browser or web page consistent with the present disclosure.

As shown, GUI 1610 may include "My Dashboard" with "Recent Discussions" and "Recent Actions" undertaken for projects or groups, respectively. "Recent Discussions" may serve as a wall posting allowing for comments made by a user to be viewed by all users contributing to the project. Date and times of postings may be included. For example, where the dashboard for "Chile Legislation Bills" is selected, user "Crystal Yan" may comment "Did anyone else see the new article in the WSJ" and "@Frankie James" may comment "I added to the news clips section." Such exemplary communication allows for collaboration between users and serves as a notification that this task has already been completed so as to avoid unnecessary duplication. Similarly, posting of "Recent Actions" including meetings, fly-ins, committee hearings, and email facilitates user collaboration. This is a significant technical improvement over manual forms of collaboration which are unwieldy when trying to collaborate over a particular bill.

Figure 16C:
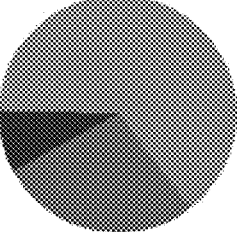
FIG. 16C is a diagrammatic illustration of an example of a graphical user interface used for user collaboration.

FIG. 16C is a diagrammatic illustration of a GUI 1620 for user collaboration. GUI 1620 may be displayed as part of a screen executed by a software application on, for example, device 300 or device 400. The screen may take the form of web browser or web page consistent with the present disclosure. As shown, GUI 1620 may include a display of "Documents," "News," and "Projects" for user collaboration. The "Documents" section may include a link to editable documents for other users. The "News" section may include links to relevant news articles. The "Projects" section may include a graphical chart indicating the status of projects and whether they are on schedule or behind schedule. GUI 1620 may further facilitate user collaboration and feedback consistent with the disclosure.

FIG. 16D is a diagrammatic illustration of a GUI 1630 for user collaboration. GUI 1630 may be displayed as part of a screen executed by a software application on, for example, device 300 or device 400. The screen may take the form of web browser or web page consistent with the present disclosure. As shown, GUI 1630 may include a dashboard list of "Projects" that one or more users are collaborating on. "Projects" may correspond or correlate exactly to issue agendas, issues, or particular bills. The dashboard may include the "Project Name," "Lead," "Labels," "Impact," "Status," and "Last Action." The dashboard list may be hyperlinked and open to other dashboards with additional information. The dashboard may allow for coordination between users and may be updated electronically to provide real-time status of relevant information. GUI 1630 may further facilitate user collaboration and feedback consistent with the disclosure.

Figure 16E:
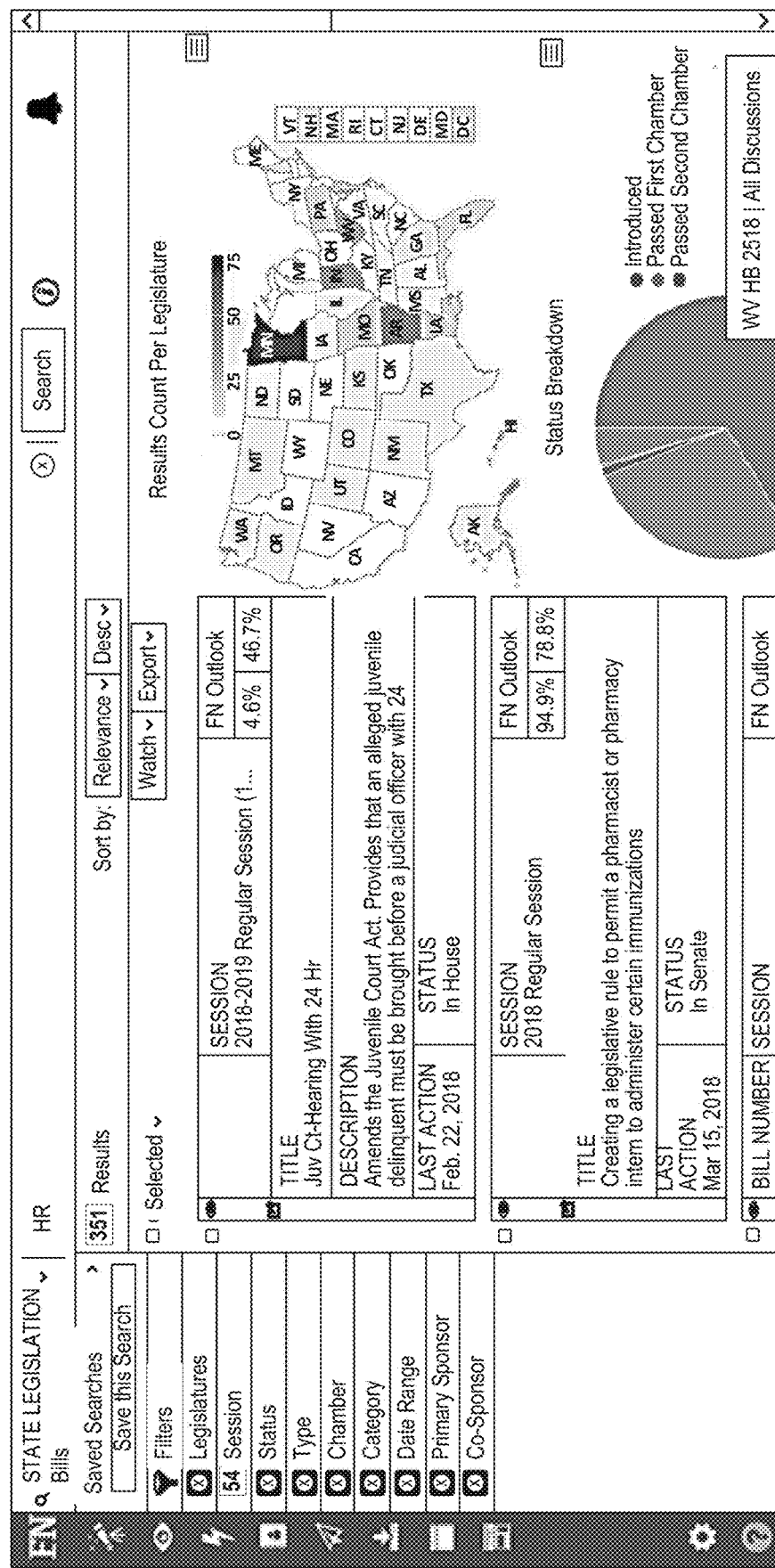
FIG. 16E is a diagrammatic illustration of an example of a graphical user interface used for searching and selecting a legislative bill.

FIG. 16E is a diagrammatic illustration of a GUI 1640 for searching and selecting a legislative bill. GUI 1640 may be displayed as part of a screen executed by a software application on, for example, device 300 or device 400. The screen may take the form of web browser or web page consistent with the present disclosure. As shown, GUI 1640 may include searching according to "Federal" or "State Legislation" and in conjunction with selection of search "Filters" such as "Legislatures," "Session," "Status," "Type," "Chamber," "Category," "Date Range," "Primary Sponsor," and "Co-Sponsor." Exemplary GUI 1640 may also include searching according to user entry of a textual input search string. The textual input search string may include any combination of alphanumeric characters or Boolean identifiers. A combined search including both use of a textual input search string and "Filters" is contemplated. A search may be executed by clicking on a "Search" button. A search may be saved by clicking on "Save this Search."

Server 105 may extract data from database 1512 according to an interaction between a system user input module 1508 and a database access module 1510. Parsing of data based on one or more categories is also contemplated. The data may be displayed as search results in dashboard form. The search results may also be displayed in graphical or form. The "Results" may be sorted by "Relevance" and "Date," and a selection of "Watch" and "Export" may allow for the user to monitor or transmit a selected bill to another user for collaboration on the bill. A "Bill Number," "Session," "Title," "Description," "Last Action," "Status" and "Outlook" may be displayed for each bill returned as a search result. The "Outlook" may include the predicted outcome and likelihood of passage of a bill. A "Results Count Per Legislature" may be displayed in map form. A "Status Breakdown" indicating when a bill was "Introduced," "Passed First Chamber," and "Passed Second Chamber" may also be displayed in graphical or pie-chart form for display to a user. Other user-adjustable data feature settings and variable graphical displays may be contemplated.

In some embodiments, user(s) 107 may desire to collaborate with other users in order to advance particular legislation, and the user may enter textual search string "HR" and "351" "Results" are returned. "Bill Number IL HB 678" and "Bill Number WV HB 2518" are displayed at the top of the search results list. Each "Bill Number" may operate as a link to allow for user selection in order to view more details and information related to the selected bill. In some embodiments, clicking of the "Bill Number" instructs server 107 to instruct module 1500 to transition from exemplary GUI 1640 to a related exemplary GUI to view additional details pertaining to the selected bill for desired collaboration.

FIG. 16F is a diagrammatic illustration of a GUI 1650 displaying a dashboard indicating a likelihood of one or more outcomes related to the selected legislative bill. GUI 1650 may be displayed as part of a screen executed by a software application on, for example, device 300 or device 400. The screen may take the form of web browser or web page consistent with the present disclosure. GUI 1650 may include display of "Basic Information" including "Title," "Categories," and "Bill Summary." "Basic Information" may include "Chamber and Session Information" such as "Session Dates," "Session," and "Chamber," and may further include "Sponsors and Cosponsors" such as "Primary Sponsors," "Co-Sponsors," and a "Breakdown" according to political party, such as "Republican" or "Democrat."

GUI 1650 may include display of "Documents and Similar Bills" including "Bill Versions" and "Amendments." GUI 1650 may include an "Outlook" indicating a likelihood of passage based on a calculation. The calculation may include "the strength of the bill sponsor," "the language in the bill," and "the network of the co-sponsor." In some embodiments, determining the calculation may include applying model and/or machine learning, as discussed above. For example, in some embodiments, determining the calculation may include representing the data as a feature vector, as discussed above. Based on the calculation, a textual result such as "much more likely" or "much less likely" may be displayed in accordance with a comparison of the likelihood of passage of similar bills in the same jurisdiction. "Analytics" may include, for example, a "House Pre-Floor Score," "House Floor Score," "Senate Pre-Floor Score," "Senate Floor Score." Scores may be tabulated and displayed in percentage terms. A "Timeline" indicating a "Current Status" of a bill such as "In Senate" may also be displayed to a user. The user may select "Share" to share this with another user or may take other "Actions" in order to collaborate on this bill and notify other user(s) 107.

Figure 16G:
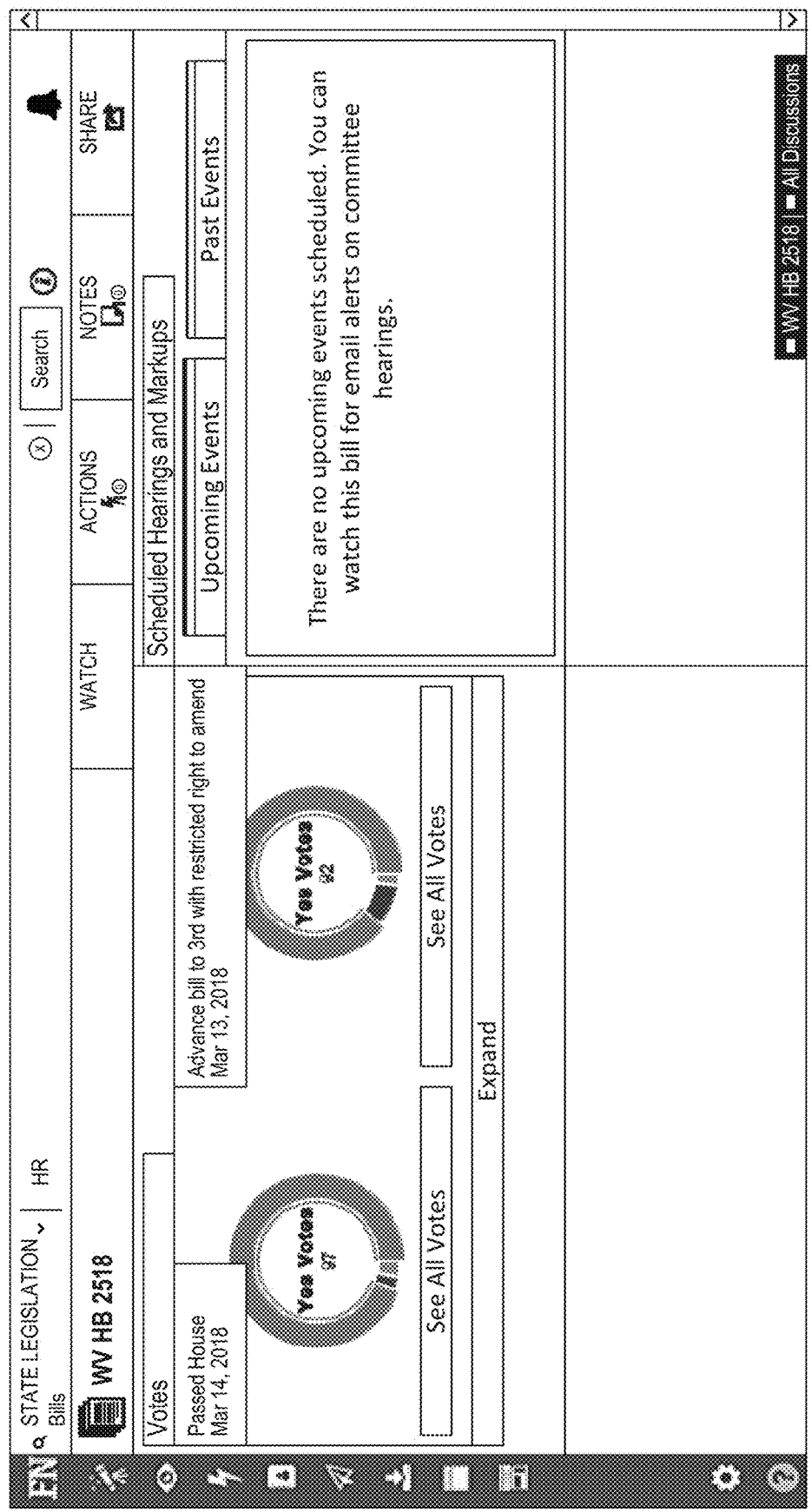
FIG. 16G is a diagrammatic illustration of an example of a graphical user interface used for displaying a dashboard indicating tallied votes and a likelihood that the bill will pass into law.

FIG. 16G is a diagrammatic illustration of a GUI 1660 displaying a dashboard indicating tallied votes and a likelihood that the bill will pass into law. GUI 1660 may be displayed as part of a screen executed by a software application on, for example, device 300 or device 400. The screen may take the form of web browser or web page consistent with the present disclosure. GUI 1660 may include display of "Votes" for multiple predictive outcomes including a number of votes that "Passed House" and a number of votes to "Advance" bill. "Yes" and "No" votes may displayed in both quantitative textual and graphical form. A user may click the button "See All Votes" to see each individual vote cast according to each legislator. GUI 1660 may further include display of a "Scheduled Hearings and Markups" including "Upcoming Events" and "Past Events" may be displayed.

Figure 16H:
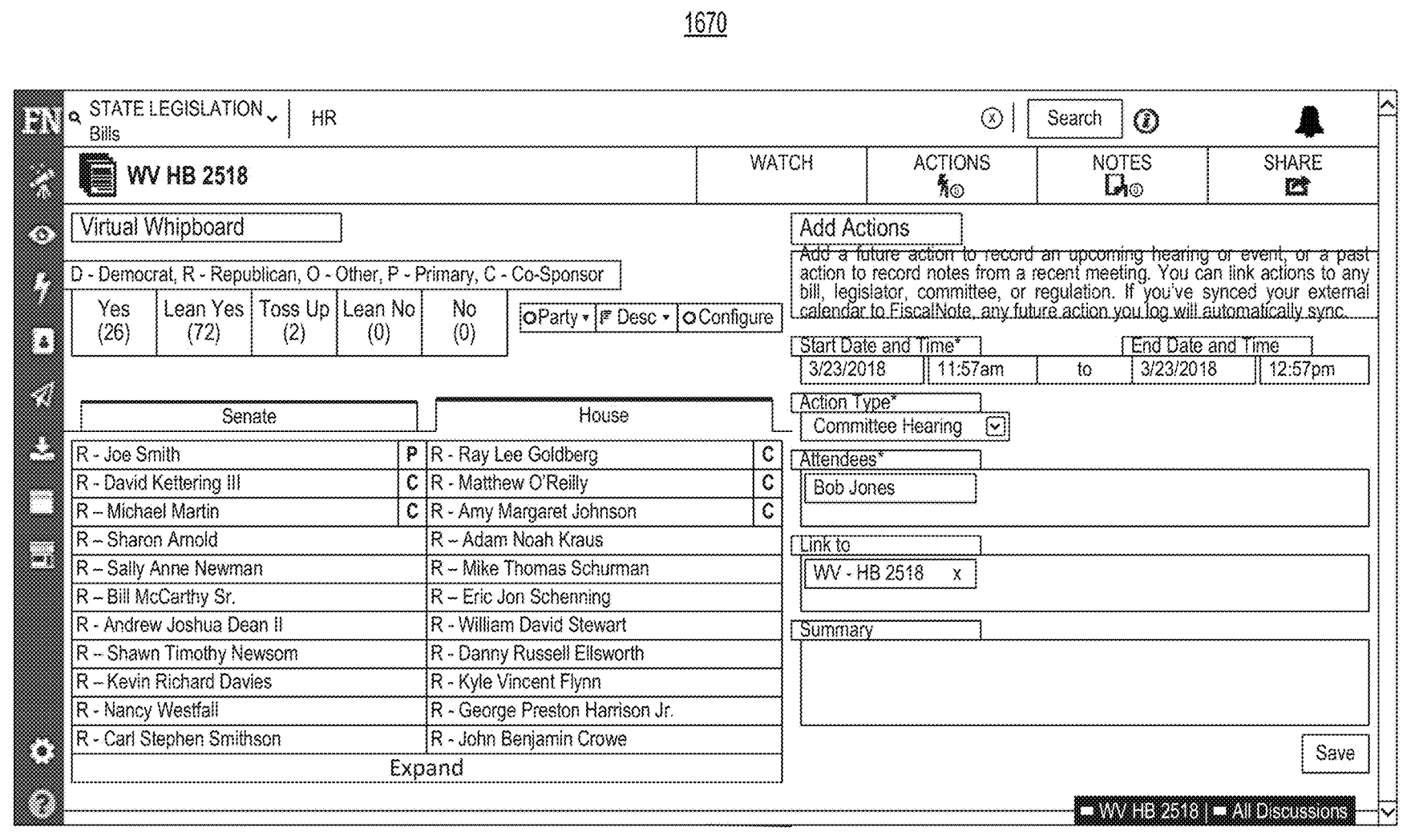

FIG. 16H is a diagrammatic illustration of a GUI 1670 displaying an example of a virtual whipboard. GUI 1670 may include information indicating a number of persons plan to vote "Yes," "Lean Yes," "Toss Up," "Lean No," and "No." A user may click "Expand" in order to allow for display of the relevant members of the "House" and "Senate." GUI 1670 may allow a user to "Add Actions" to record an upcoming legislative hearing or event. The "Action" may allow for entry of a "Start Date and Time," "Action Type," "Attendees," a "Link to" the bill, and a "Summary." The user may click a "Save" button in order to save an "Action." Other input fields may be contemplated. Further details regarding the use of a virtual whipboard are described below.

Figure 16I:
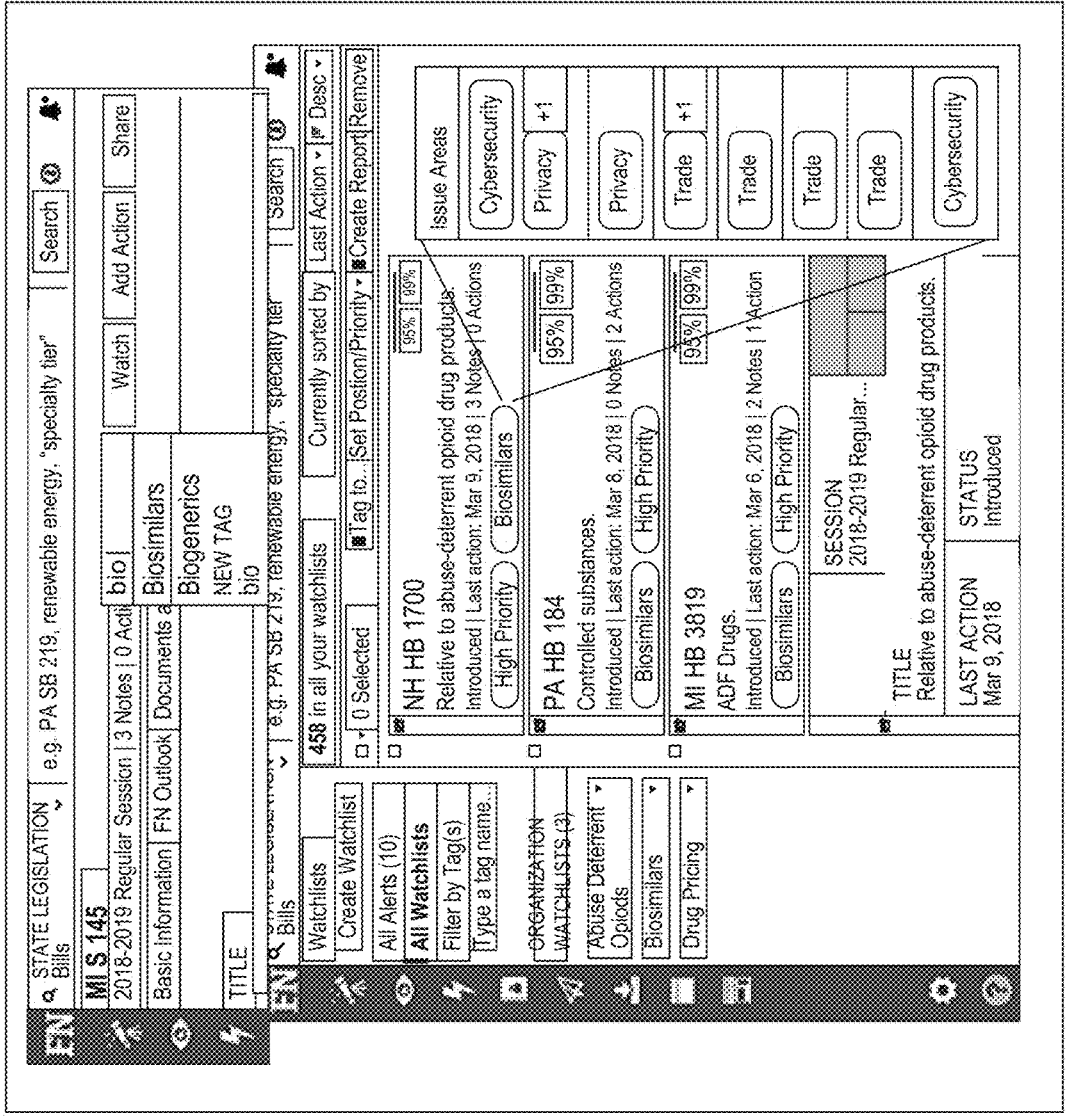
FIG. 16I is a diagrammatic illustration of an example of a graphical user interface used for illustrating a tagging capability.

FIG. 16I is a diagrammatic illustration of a GUI 1680 illustrating a tagging capability. A user may create a custom tag (e.g., subject area) related to agenda issues or people by entering a textual tag string such as "Biosimilars." The term "Agenda issues" may include topics of importance related to a policymaking agenda that a legislator or regulator is attempting to enact. For example, a user may specify areas or "Issue Areas" corresponding to a tag including "Cybersecurity," "Privacy," or "Trade." These may serve as agenda issues that are critically important to a legislator in order to obtain a "Yes" vote on a bill. In some embodiments, an agenda issue may relate to one or more government bodies. A tag may serve as an alert and a user may "Filter by a tag name" by typing a tag name in an input field or text box. A priority level such as "High Priority" or "Low Priority" may also be appended with a tag. A custom report may be created by a user selecting "Create Report" in order to create a report confined only to tagged bills. Tagging provides an intuitive way to organize and find relevant legislative data for collaboration and dissemination to other users. Other tagging feature settings and alerts may be contemplated.

Figure 17:
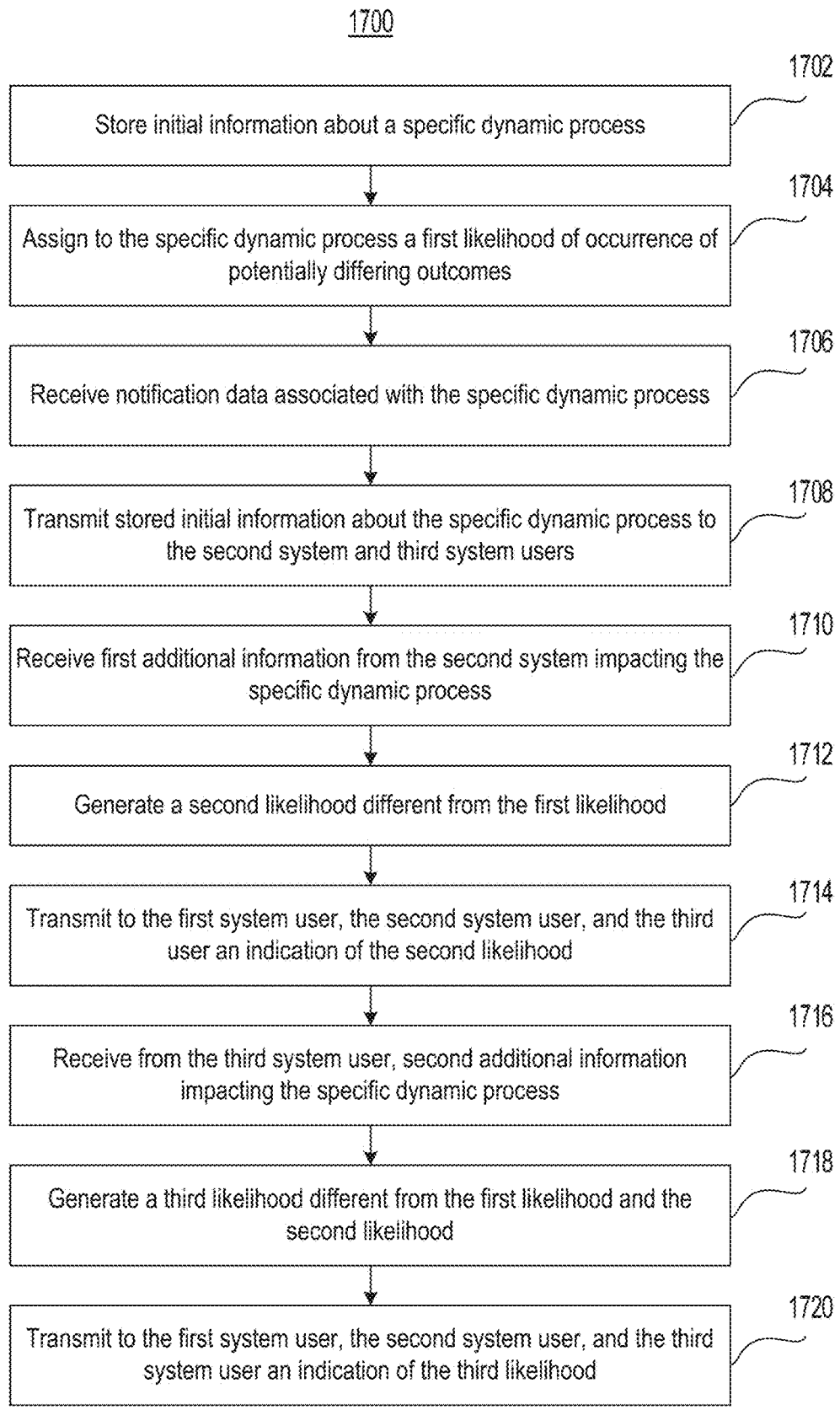
FIG. 17 is a flow chart illustrating an example of a process performed by the exemplary system in FIG. 1, in accordance with the disclosed embodiments.

FIG. 17 illustrates a flow chart representing a collaboration prediction method 1700 consistent with disclosed embodiments. Steps of method 1700 may be performed by one or more processors of a server (e.g., central server 105), which may receive data from user(s) 107 regarding the specific dynamic process and assign or generate likelihood of occurrence of a potentially differing outcome (e.g. the server may execute proceeding position identification module 1504 and action execution module 1506). The term "potentially differing outcome" includes a result that differs from a predetermined course due to altering from user collaboration. Each user may have a different role in an outcome. The term "role in an outcome" includes the each user's level of involvement or set of collaborative actions implemented in order to affect the result.

At step 1702, the server may store initial information about a specific dynamic process. For example, a specific dynamic process may be a legislative proceeding such as an upcoming vote on a "legislative bill" and may be stored in database 1512. The term "legislative proceeding" includes any upcoming vote or stage required to enact or debate a proposed law. In the exemplary embodiment in FIG. 16F, legislative bill "WV HB 2518" illustrates storage of information related to the bill including its "Title," "Bill Title," "Categories," and "Bill Summary." "Basic Information" may include "Chamber and Session Information" such as "Session Dates," "Session," and "Chamber," and may further include "Sponsors and Cosponsors" such as "Primary Sponsors," "Co-Sponsors," and a "Breakdown" according to political party, such as "Republican" or "Democrat." "Documents and Similar Bills" including "Bill Versions" and "Amendments" may be stored. Names and other data pertaining to legislators may also be stored. This data may also be modified by user input for updating in a database. Data may also be stored for regulatory, administrative, or judicial proceedings. Stored data may include historical data and/or metadata. Data storage means may include Teradata, SAS, or other data storage means such as, for example, including Hadoop Data Lake. Other storage means for data sources are contemplated.

At step 1704, the server may assign to the specific dynamic process a first likelihood of occurrence of potentially differing outcomes. A "Position Identification Module" 1504 may determine a likelihood that a legislator may vote for a bill or a likelihood that a bill will pass. The assignment of the first likelihood may be based on a calculation. For example, GUI 1640 may include an "Outlook" indicating a likelihood of passage based on a calculation. The calculation may include "the strength of the bill sponsor," "the language in the bill," and "the network of the co-sponsor." Based on the calculation, a textual result or "assignment" such as "much more likely" or "much less likely" may be displayed in accordance with a comparison of the likelihood of passage of similar bills in the same jurisdiction. In some embodiments, determining the calculation may include applying a model and/or machine learning, as discussed above. For example, in some embodiments, determining the calculation may include representing the data as a feature vector, as discussed above.

In some aspects, the server may assign a first likelihood based on scraped data. For example, the server may apply one or more models with some or all of the scraped data as one or more inputs. Instead of using raw scraped data, the server may extract one or more features from the data, as discussed above, to use as inputs for the model.

In some aspects, the data sets may include legislators in a legislative body associated with a legislative proceeding. In some embodiments, the specific dynamic process may include at least one of a legislative proceeding, a regulatory proceeding, or a judicial proceeding.

At step 1706, the server may receive notification data associated with the specific dynamic process. The term "notification data" includes at least one of a tag, message, or an alert. In one embodiment, a user may create a custom tag related to issues or people by entering a textual tag string. For example, a first user may become aware of the dynamic process, and indicate to the system other users that should be alerted to the dynamic process by entering an identifier (e.g. user name, online moniker) for those users in relation to the dynamic process. As a further example, the user may specify areas or topics corresponding to the tag including "Issue Areas" such as "Cybersecurity," "Privacy," or "Trade." A tag may serve as an "Alert", for example when a user may set their profile settings to be alerted to any dynamic process that is tagged by the system, or another user, as related to "Trade". A user may also "Filter by a tag name" by typing a tag name in an input field or text box. The dynamic process the alert may be related to may be a legislative proceeding such as bill "WV HB 2518" and may indicate that the user may be required to take an action, such as attend a hearing. As a further example, the dynamic process the alert is related to may be a regulatory proceeding and may indicate that a comment needs to be drafted. In some embodiments, notification data can be generated by the user on the system at the time of, or after the dynamic process through a GUI. In other embodiments, notification data may be generated by the system based on system or user preferences established prior to the dynamic process. For example, user(s) 107 may create and update a profile at any time during their engagement with system 100. A first system user may specify in their profile that an alert to a second and third system user should always be generated from a dynamic process that meets certain specified criteria (e.g. a regulatory process initiated by FDA about GMO labeling in Montana).

At step 1708, the server may transmit stored initial information about the specific dynamic process to the second system and third system users based on the received alert. This transmitting may include sending a message, creating a report, sending an alert, or exporting policy information to another user. At step 1710, method 1700 may include receiving first additional information responsive to the at least some of the stored initial information about the specific dynamic process and impacting the specific dynamic process. The first additional information may include user feedback, as described above, proprietary data, as described above, metadata such as the name of the sender of the data, or time the data was sent. Other types of additional information are contemplated.

At step 1712, the server may generate a second likelihood different from the first likelihood. A "Position Identification Module" 1504 may determine a second likelihood that a legislator may vote for a bill or a likelihood that a bill will pass. The generation of a second likelihood may also be based on a calculation. For example, GUI 1640 may include an "Outlook" indicating a likelihood of passage based on a calculation. The calculation may include "the strength of the bill sponsor," "the language in the bill," and "the network of the co-sponsor." Based on the calculation, for example, the second likelihood may change to "much less likely" from "much more likely" based on first additional information and initial information indicating an increase in a number of "No" votes. In some embodiments, determining the calculation may include applying a model and/or machine learning, as discussed above. For example, in some embodiments, determining the calculation may include representing the data as a feature vector, as discussed above. As a further example, the second likelihood of a case being appealed as part of a judicial process may become 68% likely, as opposed to the first likelihood of 13% likely, after first additional information from the second system user indicates the appeal rate for the given court.

At step 1714, the server may transmit to the first system user, the second system user, and the third user an indication of the second likelihood. This transmitting may include sending a message, creating a report, sending an alert, or exporting policy information to another user. The transmission may also occur as a numerical or graphical display available to another user viewing a web browser representative of an updated GUI consistent with the embodiments in accordance with the present disclosure.

At step 1716, the server may receive from the third system user, second additional information impacting the specific dynamic process. The second additional information for a legislative process may include tabulation of new votes, and or other metadata associated such as a change in sponsor or co-sponsor of the bill. Other types of additional information in accordance with the disclosure are contemplated.

At step 1718, the server may generate a third likelihood different from the first likelihood and the second likelihood. A "Position Identification Module" 1504 may determine a third likelihood that a legislator may vote for a bill or a likelihood that a bill will pass. The generation of a third likelihood may also be based on a calculation. For example, exemplary GUI 1640 may include an "Outlook" indicating a likelihood of passage based on a calculation. The calculation may include "the strength of the bill sponsor," "the language in the bill," and "the network of the co-sponsor." Based on the calculation, the second likelihood may change to "less likely" from "much less likely" based on information indicating an increase in a number of "No" votes was not as large an increase as previously predicted. Therefore, while it appears the bill will still not pass in comparison to other bills, there is less certitude of this outcome. In some embodiments, determining the calculation may include applying a model and/or machine learning, as discussed above. For example, in some embodiments, determining the calculation may include representing the data as a feature vector, as discussed above.

At step 1720, the server may transmit to the first system user, the second system user, and the third system user an indication of the third likelihood of an occurrence of at least one of the potentially differing outcomes. This transmitting may include sending a message, creating a report, sending an alert, or exporting bill information to another user. The transmission may also occur as a numerical or graphical display available to another user viewing a web browser representative of an updated GUI consistent with the embodiments in accordance with the present disclosure.

Predicting Policymaker Maker Behavior Based on Unrelated Historical Data

In some embodiments, the disclosed systems and methods may involve data pattern analysis for determining patterns in aggregated electronic data. The aggregated electronic data may have been obtained from at least one Internet server. For example, the disclosed systems and methods may analyze the aggregated electronic data to determine patterns and predict how legislators are likely to act in relation to a particular legislative bill. The prediction may include any information including a specific predicted outcome of the particular votes that each legislator will cast.

In other embodiments, information that is not necessarily directly related to the subject matter or substance of the pending bill may be analyzed in order to make a prediction. For example, an influence of a legislator may be determined based on analysis of unrelated information in order to make a prediction as to how one or more legislators may vote on a prospective legislative bill. The terms "unrelated information" and "unrelated data" include any information that is not related to the substance of the legislative bill.

For example, a particular legislator's seniority, prior campaign endorsements, and upcoming election opponent may be "unrelated" to a legislative bill aimed at correcting an existing health care policy. However, this unrelated data may determine the influence of a legislator in order to predict how one or more legislators may vote on a prospective legislative bill. In still other embodiments, an influence of a legislator on other legislators may be derived from the legislator's prior track record, school records, financial situation, or other unrelated historical data.

Aspects of the disclosure in their broadest sense, are not limited to predicting legislator behavior data based on unrelated data to determine a future outcome of a particular legislative bill. Rather, the foregoing principles may also be applied to data pattern analysis for determining policymaker patterns, including to predict regulator, administrator, judge, or other related official behavior based on unrelated data in order to determine corresponding outcomes.

For example, in some embodiments, data pattern analysis may include determining patterns and making a prediction about how regulators or policymakers are likely to prescribe rules in relation to a particular regulatory or policy proposal. In other embodiments, data pattern analysis may include determining patterns and making a prediction about how administrators are likely to administer codes in relation to an administrative proposal. In still other embodiments, data pattern analysis may include determining patterns and making a prediction about how judges are likely to rule or vote in relation to a judicial proceeding or opinion.

In some embodiments, information that is not necessarily directly related to the subject matter or substance of a regulatory, policy, administrative, or judicial proceeding may be analyzed in order to make a prediction. For example, an influence of a regulator may be determined based on unrelated information in order to make a prediction as to how one or more regulators may decide on prospective regulation. An influence of a regulator may be derived from the regulator's prior track record, affinity with the current executive, associations with private organizations, relationship to other regulators, and from other unrelated historical data.

In other embodiments, an influence of an administrator may be determined based on unrelated information in order to make a prediction as to how one or more administrators may decide on a prospective administrative proposal. An influence of an administrator may be derived from the administrator's prior track record and from unrelated historical data. In still other embodiments, an influence of a judge may be determined in order to make a prediction as to how one or more judges may vote on a prospective judicial ruling. An influence of a judge may be derived from the judge's prior track record, citations patterns, writing style, previous legal career, and from unrelated historical data. It is contemplated that other types of data and data analysis based on unrelated information are available to determine influence and the outcome of any prospective or future event.

As discussed above, system 100 may comprise network 101, plurality of sources, e.g., source 103a, 103b, and 103c, central server 105, and user(s) 107. Consistent with this disclosure, system 100 may include devices 300, 400 for receiving requests to identify prospective future events related to predefined subject matter, and for predicting the outcome of the future events based on patterns in data for portions unrelated to the subject matter.

The term "prospective future event" or "future event" includes any of anticipated activities that may occur in the near or distant future. For example, the future event may include both final and intermediate stages of a disposition, such as bringing a vote to a legislative floor, or enacting a legislative bill. Other future events are contemplated. The term "predefined subject matter" includes any of predetermined topics or categories that may constitute the substance of a legislative bill or proceeding. For example, the topic of income taxes may be set as a predefined subject matter that occupies the substance of a bill proposing an income tax cut or tax increase. Further, in some embodiments, predefined subject matter may include information including portions unrelated to the subject matter of the at least one prospective future event. The term "portions unrelated to the subject matter" includes any information that is not related to the substance of the legislative bill.

Figure 18:
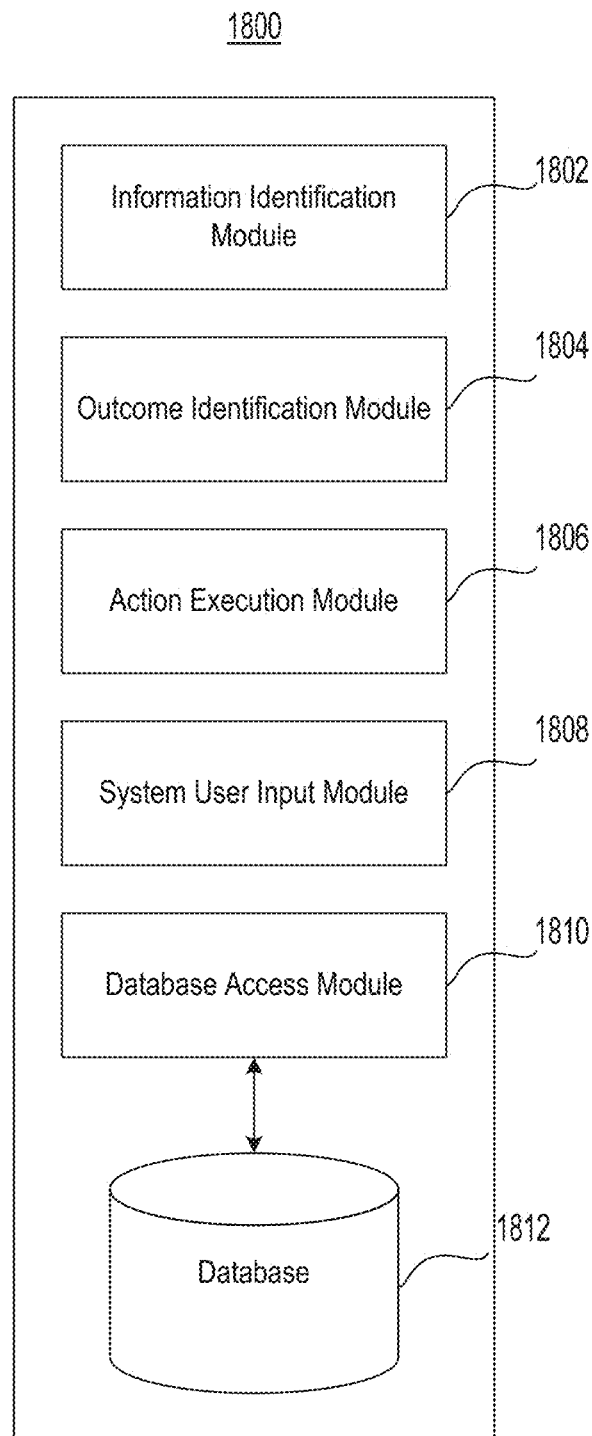
FIG. 18 is a diagrammatic illustration of an example of a memory storing modules and data for performing internet-based data pattern analysis, in accordance with the disclosed embodiments.

FIG. 18 is a diagrammatic illustration of a memory 1800 storing modules and data for performing internet-based data pattern analysis. In particular, as shown, memory 1800 may include an information identification module 1802, an outcome identification module 1804, an action execution module 1806, a system user input module 1808, a database access module 1810, and a database 1812. In some embodiments, memory 1800 may be included in, for example, central server 105, discussed above. Further, in other embodiments, the components of memory 1800 may be distributed over more than one location (e.g., stored in a plurality of servers in communication with, for example, network 101).

In some embodiments, system user input module 1808 may receive a request (e.g., from a user device) to identify a prospective future event related to predefined subject matter. The request and the predefined subject matter may be communicated by user input. Action execution module 1806 may then communicate with database access module 1810 to search database 1812 for information scraped from Internet sources 103a, 103b, and 103c that is both related and unrelated to predefined subject matter. This information may identify individuals or policymakers with a role in the outcome of the future event.

In some embodiments, information identification module 1802 may determine whether or not the data is related to the predefined subject matter of the prospective future event. In other embodiments, outcome identification module 1804 may determine an influence factor for each of the identified individuals based on patterns in data unrelated to the predefined subject matter. The term "influence factor" includes the extent or magnitude to which a policymaker will affect the outcome of other policymakers. In still other embodiments, outcome module 1804 may predict the outcome of a future event based on patterns analyzed of data unrelated to the predefined subject matter. Action execution module 1806 may then display the outcome of a future event to one or more user(s) 107 operating devices 300, 400.

The following discussion pertains to examples of GUIs that may display data to a user of system 100. The GUIs may be displayed on a screen associated with a user device, such as device 300 or device 400, discussed above.

Figure 19A:
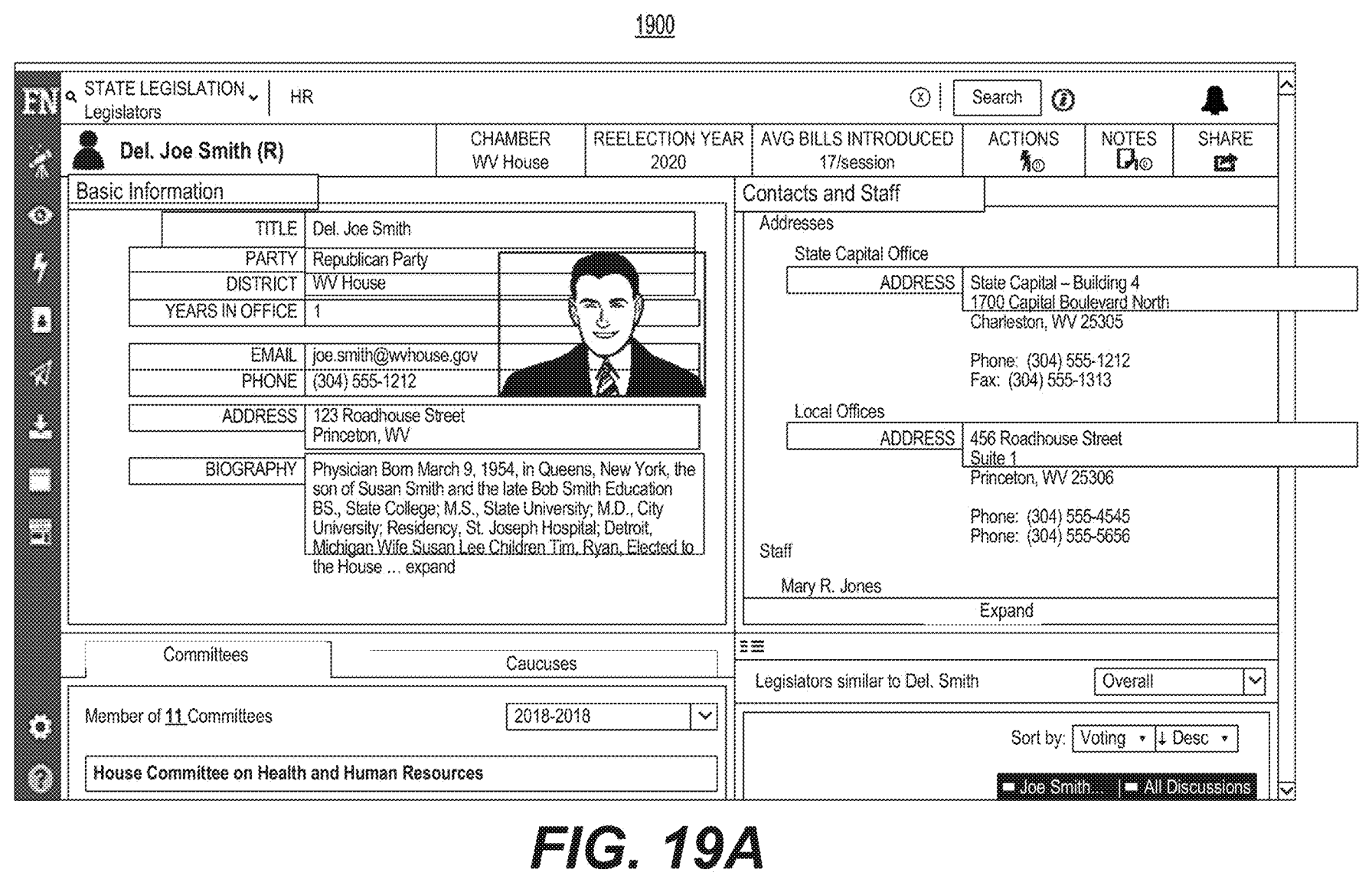

FIG. 19A is a diagrammatic illustration of a GUI 1900 for viewing unrelated legislator or other public official data. As shown, GUI 1900 may include "Basic Information" such as a "Title," "Party," "District," "Email," "Phone," "Address," and "Biography" unrelated to a subject matter of the bill. "Contacts and Staff" may include a listing of multiple office addresses and names of staff members that work for the legislator. This information may be significantly unrelated to predefined subject matter of a bill but may affect its outcome. For example, the influence of staff members may but unrelated but may provide significant influence to a bill's passage. GUI 1900 may further include a toolbar to list the "Chamber," "Reelection Year," and "Average Bills Introduced" for each legislator. Other unrelated information relating to an identity, identities, or track record of officials, but not directly related to a policy or legislative proceeding is hereby contemplated.

FIG. 19B is a diagrammatic illustration of a GUI 1910 for viewing additional unrelated legislator or other public official data. As shown, GUI 1910 may include data related to particular committees, subcommittees, or caucuses. A user may select a "Committees" tab or a "Caucuses" tab in order to view more information about the legislator's participation. For example, legislator "Del. Joe Smith (R)" is a member of 11 committees including the "House Committee on Health and Human Resources," "Joint Committee on Health," "Joint Interim Legislative Oversight Commission on Health and Human Resources Accountability," and "House Select Committee on Prevention and Treatment of Substance Abuse." For each committee, Del. Joe Smith occupies the "Position: Chair." The term "position" includes an occupied status, but may also include a particular stance or inclination of a legislator.

GUI 1910 may further include a list of legislators that are similar to Del. Smith. The list may include the "Name," "Chamber," "District," and "Voting," and "Co-sponsorship" listed in percentage or frequency terms. This foregoing information may or may not be related to the predefined subject matter of a bill. For example, committee membership on the "Joint Committee on Health" may act as unrelated information relative to a bill related to tax policy. However, it may inform an influence factor if certain legislators are members of both the "Joint Committee on Health" and other committees related to tax policy.

Figure 19C:
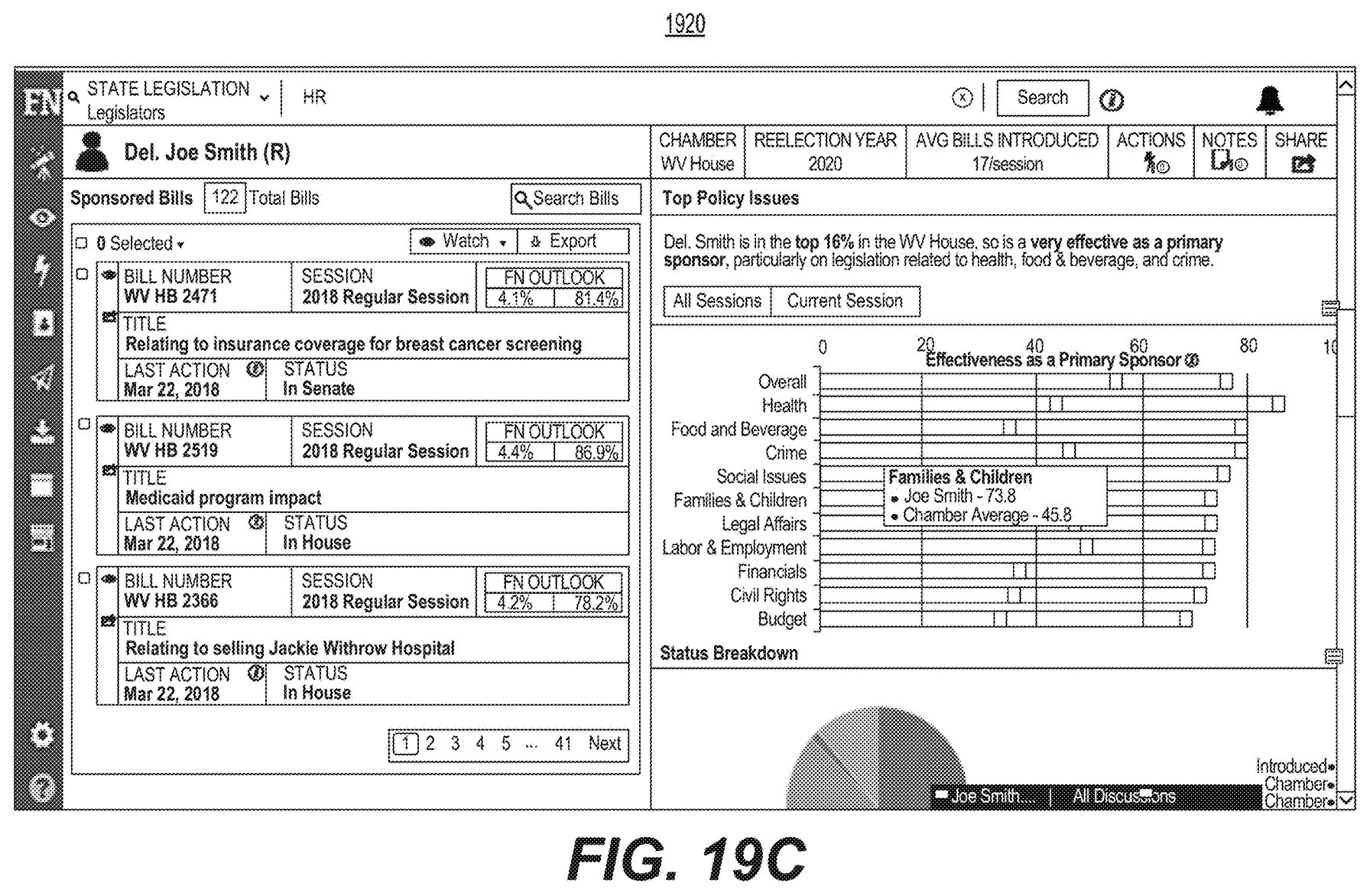

FIG. 19C is a diagrammatic illustration of a GUI 1920 for viewing additional unrelated legislator or other public official data. GUI 1920 may include a number and list of "Sponsored Bills." These lists include bills that are sponsored by the legislator. GUI 1920 may further include a graphical display of "Top Policy Issues" for the legislator. For example, an "Effectiveness as a Primary Sponsor" metric may be calculated and displayed in graphical form and may be categorized by policy type. For example, Del. Joe Smith has a score of 70 out of 100 relating to "Civil Rights" effectiveness and a score of 80 out of 100 relating to "Food and Beverage" effectiveness when a primary sponsor of a related bill. Therefore, Del. Smith more effective sponsoring bill's relating to "Food and Beverage" than to relating to "Civil Rights."

Effectiveness may also be compared to a "Chamber Average." For example, relating to "Families and Children," Del. Joe Smith has a score of 73.8 compared to the "Chamber Average." of 45.8. Accordingly, Del. Joe Smith is more effective than the average legislator in his chamber as serving as a primary sponsor of "Families and Children" legislation. Aggregated data relating to effectiveness may also be determined. For example, "Del. Smith is in the top 16% of the WV House" and is "very effective as a primary sponsor." Therefore, Del. Joe Smith has a high "influence factor" since Joe is effective in influencing others to pass legislation.

Figure 19D:
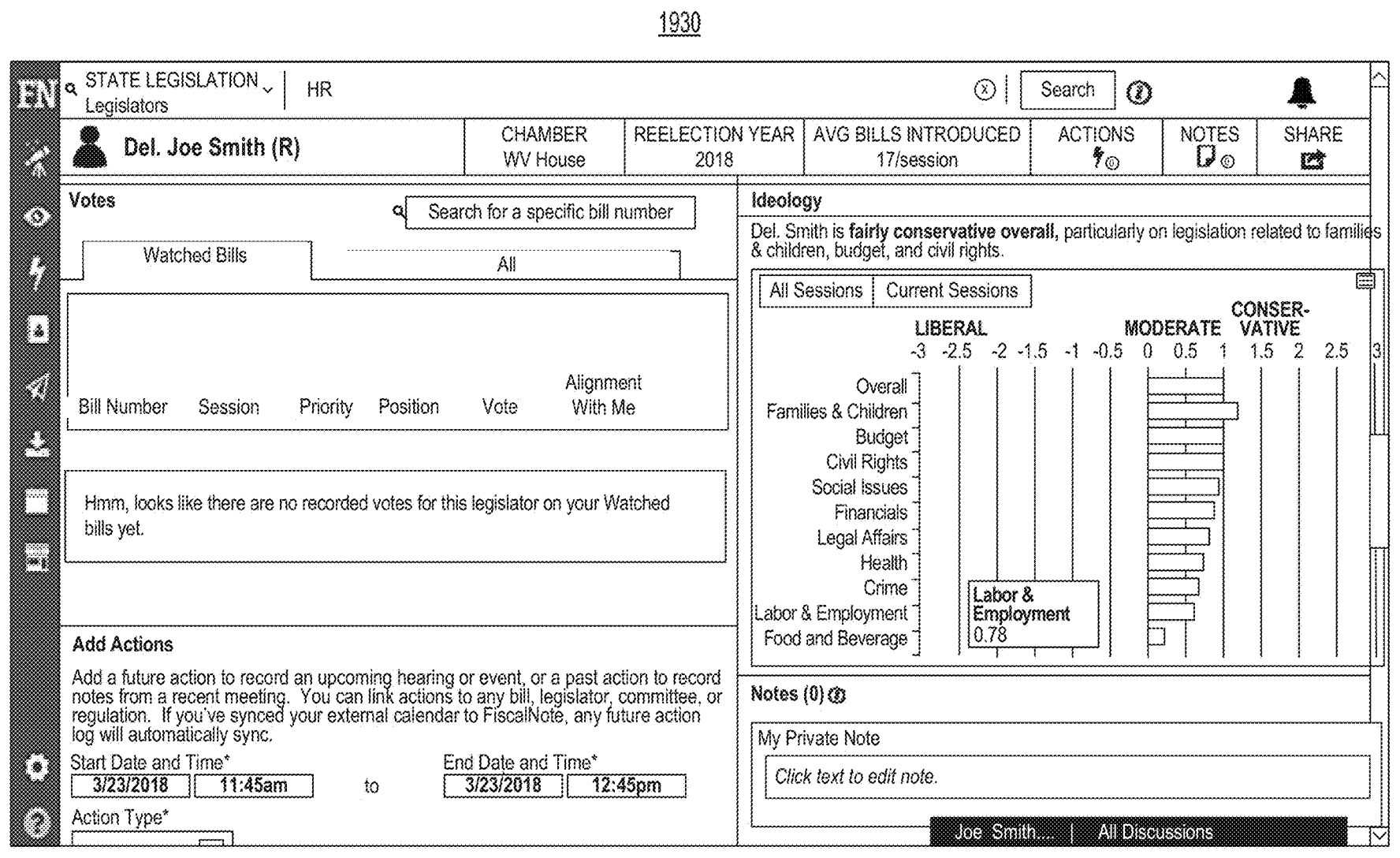

FIG. 19D is a diagrammatic illustration of a GUI 1930 for viewing additional unrelated legislator or other public official data. GUI 1930 may include "Watched Bills," allowing for a user to "Add Actions," and a graphic display or assessment of a legislator's "Ideology." The ideology may be graphically and quantitatively displayed based on legislation type for "All Sessions" or only based on "Current Sessions." A "legislator" may be ranked or categorized as "Liberal," "Moderate," or "Conservative." For example, Del. Smith is ranked aggregately as "fairly conservative overall." This information may relate to the voting record and may inform future voting predictions for the legislator depending on the nature of the predefined subject matter.

FIG. 19E is a diagrammatic illustration of a further example of a GUI 1940 for viewing an outcome based on unrelated data. GUI 1940 may be displayed as part of a screen executed by a software application on, for example, device 300 or device 400. The screen may take the form of a web browser or web page consistent with the present disclosure. Exemplary GUI 1940 may include a predicted outcome, including for example, "Compared to other bills in California, this bill is less likely to pass." This predicted outcome may be calculated based upon unrelated data such as "the strength of the bill sponsor" and "the network of the cosponsors." The predicted outcome may also be based on related data such as "the language in the bill." Based upon a combination of unrelated and related data, a "Recommended Action" may be presented to a user. For example, the recommendation may include "finding additional senior cosponsors on the referred committee to increase the likelihood of passage." Other predictions may be presented as part of exemplary GUI 1940 in accordance with the predicted outcome based upon unrelated data.

Figure 20:
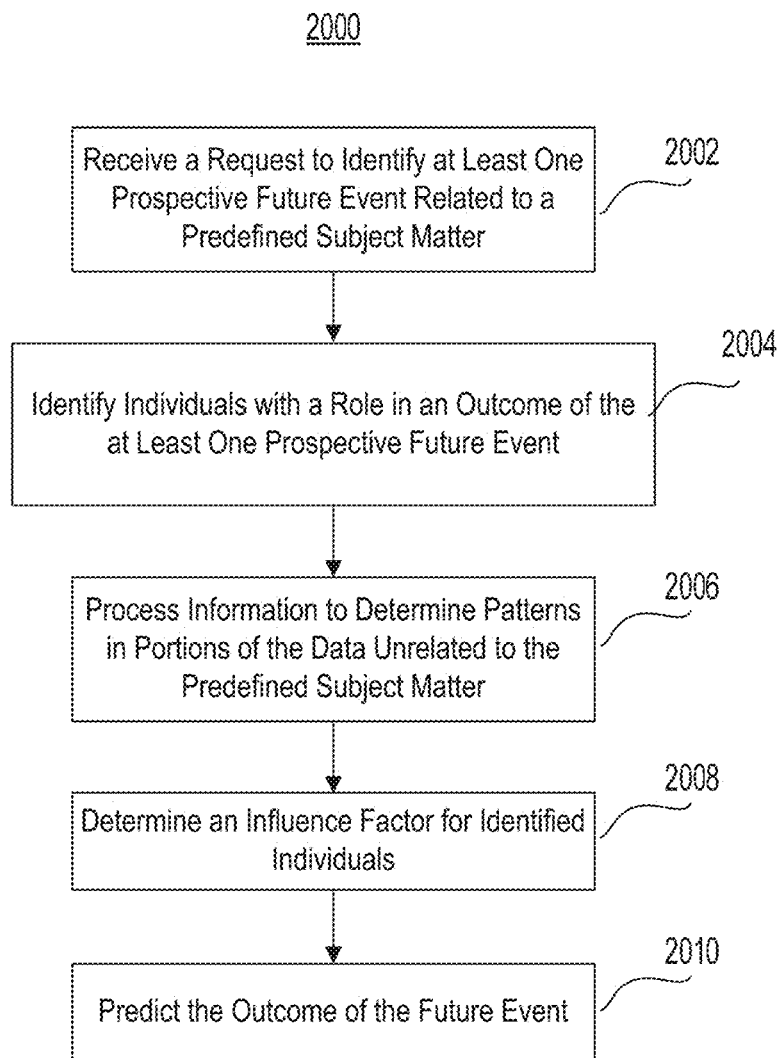
FIG. 20 is a flow chart illustrating an example of a process performed by the system in FIG. 1.

FIG. 20 illustrates an example flow chart representing an internet-based data pattern analysis method 2000 consistent with disclosed embodiments. Steps of method 2000 may be performed by one or more processors of a server (e.g., central server 105), which may receive data from user(s) 107 requesting to identify at least one prospective future event related to a predefined subject matter.

At step 2002, the server may receive a request to identify at least one prospective future event related to a predefined subject matter. The request may be based on user input entered into GUI 1910 (e.g., being display on a display screen or display of a user device) and may be sent from central server 105 or from users 107. The at least one prospective future event may include at least one policymaking proceeding. The term "policymaking proceeding" may include any activity where the merits of a policy are determined. For example, a policymaking proceeding may include at least one of a legislative vote or regulatory vote for rulemaking. For example, a specific bill in a West Virginia state legislature relating to the predefined subject matter of families and children may be scheduled for an upcoming vote. Accordingly, a user 107 may request to identify this vote.

In some embodiments, a prospective future event may include at least one policymaking proceeding. For example, system 100 may include information that identifies individuals with a role in an outcome of the at least one prospective future event to include identities of officials slated to participate in the policymaking proceeding. In other embodiments, system 100 may include information that identifies individuals with a role in an outcome of at least one prospective future event by including policy position data of policymakers. The term "policy position data" includes information that indicates a particular stance of a policymaker as it relates to a public policy.

In some embodiments, system 100 may include a prospective future event that includes at least one legislative proceeding. System 100 may include the information that identifies individuals with a role in an outcome of at least one prospective future event to include identities of legislators slated to cast a vote in the legislative proceeding. In other embodiments, system 100 may include information that identifies individuals with a role in an outcome of the at least one prospective future event to include voting record data of policymakers.

At step 2004, the server may access and ingest data scraped from the Internet to identify information that identifies individuals with a role in an outcome of the at least one prospective future event related to a predefined subject matter. The data may constitute the identities of officials slated to participate in the policymaking proceeding and policy position data of policymakers. The data may further include voting record data of policymakers scraped by extracting or parsing HTML content or other textual content as discussed in earlier sections. The data may be ingested and aggregated for display to one or more users 107. This data may be related or unrelated to the predefined subject matter and may be displayed as part of the GUIs shown in FIGS. 19A-19E. For example, the scraping may include scraping data from a West Virginia legislative website or from a Wiki source.

At step 2006, the server may process the information to determine patterns in portions of the data unrelated to the predefined subject matter. As discussed above, the processing may include operations according to instructions from central server 105, and in accordance with module 1800 as described here in. Information identification module 1802 may determine whether or not the data is related to the predefined subject matter of the prospective future event, and outcome identification module 1804 may determine whether patterns exist in portions of the data unrelated to the predefined subject matter. Processing information may further include processing about the prior successes and failures of the identified policymakers in achieving prior unrelated outcomes in accordance with the disclosure.

At step 2008, the server may determine an influence factor for each of the identified individuals. The influence factor may be calculated by outcome identification module 1804 based on a determined effectiveness of a legislator. Calculation may occur according to one or more preferred models and based on application of analysis as discussed in prior sections. For example, an "Effectiveness as a Primary Sponsor" metric may be calculated and displayed in graphical form and may be categorized by policy type to indicate the amount of influence a policymaker has when acting as a primary sponsor of a bill. Other factors such as ideology, past voting records, and participation in committees, subcommittees, and caucuses may determine influence. Such influence may also serve as a metric to indicate ability to pursue a further higher elective office or to fundraise or raise money. Other types of influence, influence factors, and thresholds based on unrelated data to a predefined subject matter are contemplated.

At step 2010, the server may predict a future event outcome and likelihood according to outcome identification module 1804 and based on patterns analyzed in data unrelated to the predefined subject matter. Algorithms or models may be used in accordance with the disclosure may determine the extent to which unrelated data may affect an outcome of a future proceeding such as a legislative vote.

For example, system 100 may include information including portions unrelated to the subject matter of the at least one prospective future event such as at least one of a campaign contribution, campaign endorsement, and upcoming election. Other types of unrelated subject matter as well as establishing a threshold between unrelated and related data relative to predefined subject matter is contemplated. For example, a threshold value may be preset and data may be quantified to indicate a level of directness relative to the threshold value. In particular, data quantified at a level higher than the threshold value may be categorized as related data, and data quantified at a level lower than the threshold may value may be categorized as unrelated data. Accordingly, a user may modify or alter in real-time what may constitute related or unrelated data based on manipulation of a threshold value between data portions and a prospective future event. In some embodiments, the unrelated data may include proprietary information.

Analyzing Policymaker Alignment with Organizational Posture

In some embodiments, the disclosed systems and methods may involve internet-based agenda data analysis. For example, the disclosed systems and methods may enable one or more organizations to determine how policymakers align with the organizations' legislative, regulatory, or judicial postures. Organizations may weigh issues that are of interest to them, and based on the weighing, a user interface may reveal, in a graphical format, the relative alignment of legislators to the organizations' legislative posture.

Aspects of the disclosure, in their broadest sense, are not limited to an issue-based analysis of legislator alignment with an organizational posture. Rather, it is contemplated that the foregoing principles may be applied to enable one or more organizations to determine how policymakers, including regulators, administrators, judges, and other related officials align with the organization's corresponding postures. The term "organizational posture" includes the particular stance or political position of an organization. The term "organization" includes any collection of individuals operating according to a common purpose, as described above.

For example, in some embodiments, internet-based agenda data analysis may enable determination of legislator alignment with an organization's legislative posture. In other embodiments, internet-based agenda data analysis may enable determination of administrator alignment with an organization's administrative posture. In still other embodiments, internet-based agenda data analysis may enable determination of judicial alignment with an organization's judicial posture. Internet-based agenda data analysis may be performed to determine alignment for any policymaker with any of an organization's related postures.

As discussed above, system 100 may comprise network 101, plurality of sources, e.g., source 103a, 103b, and 103c, central server 105, and user(s) 107. Consistent with the disclosure, system 100 may include devices 300, 400 for receiving user input from user(s) 107 and for displaying the alignment position of multiple policymakers relative to an organizational or user posture. The term "alignment position" includes a measure of how policymakers are oriented relative to an organizational or user posture. In some embodiments, the alignment position of a policymaker may be based on one or more positions of a plurality of organizations or at least two organizations.

Figure 21:
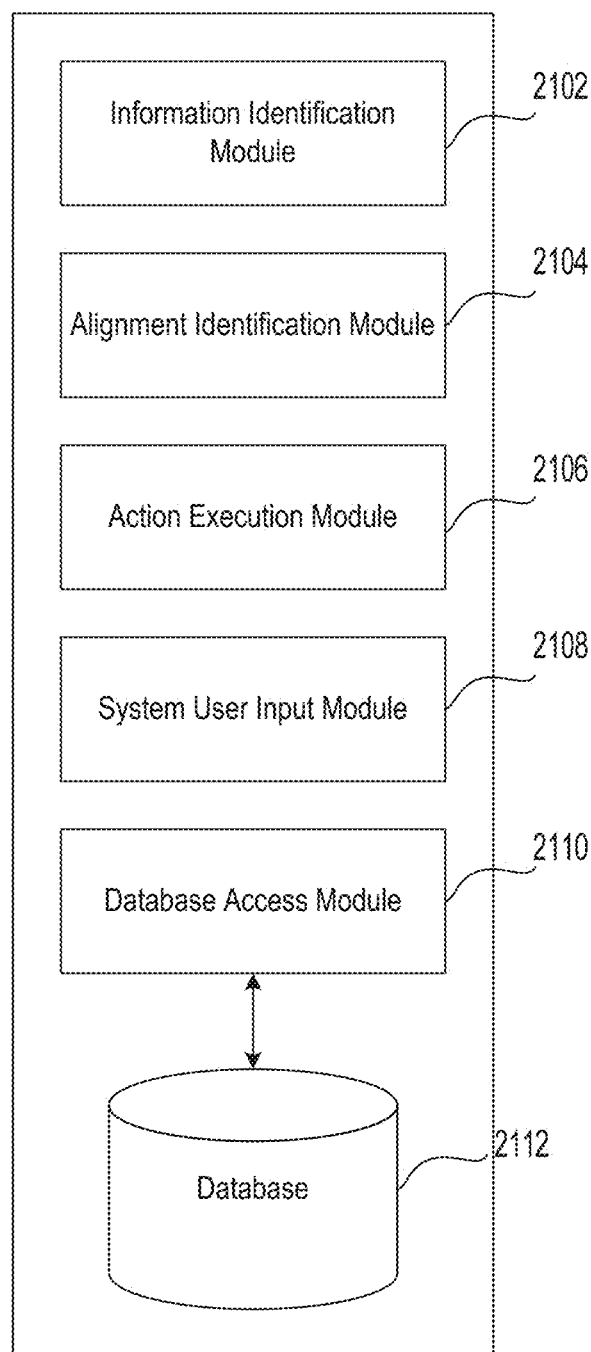
FIG. 21 is a diagrammatic illustration of an example of a memory storing modules and data for performing internet-based agenda data analysis.

FIG. 21 is a diagrammatic illustration of a memory 2100 storing modules and data for performing internet-based agenda data analysis and, in particular, for performing an issue-based analysis of a policymaker alignment with an organizational posture. Memory 2100 may include an information identification module 2102, an alignment identification module 2104, an action execution module 2106, a system user input module 2108, a database access module 2110, and a database 2112. In some embodiments, memory 2100 may be included in, for example, central server 105, discussed above. Further, in other embodiments, the components of memory 2100 may be distributed over more than one location (e.g., stored in a plurality of servers in communication with, for example, network 101).

Based on a selection of user-selectable agendas from a list, system user input module 2108 may receive agenda issues of interest to an organization. Information identification module 2102 may then identify an indication of an organization's position or posture on each selected issue. Memory 2100 may further instruct database access module 2110 to search database 2112 for policymaker data from which an alignment position on each of the agenda issues is determinable. In some aspects, if policymaker data is not available, action execution module 2106 may scrape the Internet in accordance with the disclosure to determine individual policymaker data including one or more alignment positions.

In some embodiments, alignment identification module 2104 may calculate an alignment position data from individual policymaker data. In some aspects, the alignment position data may correspond to relative positions of each of the plurality of policymakers on the plurality of selected issues. In other embodiments, action execution module 2106 may transform the alignment position data into a graphical display that presents the alignment positions of multiple policymakers relative to an organizational or user posture.

In further embodiments, memory 2100 may store instructions for perform internet-based agenda data analysis to identify how actors including policymakers (e.g. legislators, regulators), and other users or organizations align with a user's position. A rating system may be produced which indicates an alignment score for each selected actor, and may be used to rate each actor relative to other actors. In this example, a higher score may indicate a greater alignment between the user and actor. The rating system or any other mechanism of establishing alignment may further be used to suggest policymakers for a user to contact, for the purpose of making a financial contribution, for proposing a bill that will benefit the user and have the highest likelihood of bill introduction and passage, for selecting the jurisdiction for a judicial proceeding, or for coordination with a second user or organization that shares aspects of the first users' or organizations' posture.

In some embodiments alignment identification module 2104 may predict an indication of an organization's position on a selected issue. For example, alignment identification module 2104 may apply one or more models to data related to the organization to determine a prediction of one or more possible positions of an organization and may also determine a likelihood that the organization will in fact have a particular predicted position (e.g., a confidence score expressed, for example, as a percentage).

In other embodiments, identifying a legislator's position or posture on an issue may be determined by examining a legislator's previous history, including voting behavior, sponsoring behavior, statements, received financial contributions, and other information. In still other embodiments, identifying a legislator's position or posture on an issue may be determined by other data. Such data may be proprietary data, including private conversations, in person, phone, or through other technology enabled means: email, IMS, etc. This data may be ingested by the system and may be used to establish the legislator's positions.

In addition to identifying legislator's posture, in still other embodiments, a user of system 100 (i.e. non-policymaker) may have a position or posture on an issue that may be established by the user. For example, this may be established in a user profile, or through an internet-based agenda data analysis system, via automated analysis of the user's feedback. For example, the system may automatically identify bills where the user has indicated support, and where legislators voted in support of the bill. In some aspects, if no vote data is present, a predicted outcome, i.e., the likelihood of the legislator voting in support of the bill, may be entered or used in place of a real legislator vote to identify bills on which both the user (i.e. a non-policymaker) and the legislator may agree.

In some embodiments, if the user has uploaded additional proprietary data indicating legislators' positions, a model may be generated to predict legislator positions using the uploaded data. This user-generated model may be used in addition to, in place of, or in combination with any system models to predict legislators' positions, and to compute agenda issue agreement between the user and a legislator. Furthermore, if the user has not indicated that they support a given bill, a system-generated or user-generated model for predicting the user position may be used in place of the explicit user position on a bill, in conjunction with a real or predicted vote or position, to identify bills on which the user and the legislator agree. In other embodiments, a first user's indicated or system-generated or user-generated predicted positions and a second user's indicated or system-generated or user-generated predicted positions may be used to compute alignment.

In other embodiments, an internet-based agenda data analysis may perform an ideology analysis to identify a legislator's position on an issue. A user may be projected to occupy the same ideology as the legislators according to an ideology analysis or ideology model, and real or predicted user positions. In some aspects, a rating system may be applied to actors that are other users, or non-user organizations. The rating system may connect users that share similar positions, in order to form a coalition with and drive a similar agenda, or to share resources. In other aspects, similar users may choose to establish a permission group that may allow sharing feedback to the system, as described above.

In some embodiments, one or more organizational positions or postures may contribute to rating uniformly, or there may be a system or user specified weighing that weights the contribution of organizational positions differently. A weighing may include weighing single positions or groups of positions. Weighing of groups of positions may include some positions pertaining to particular issues weighted higher than other positions. Other weighing may apply to specific bill, where the alignment of position on that bill may contribute to the overall alignment rating differently than other bills. Other weighing may apply to specific regulation, where the alignment of position on that regulation may contribute to the overall alignment rating differently than other regulations. Other types of weighing are contemplated in accordance with the present disclosure.

In other embodiments, the weighing system may be accessed through a GUI, where a user may select items and their associated weight. The rating may be presented to the user as a list, where a user can select an ordering, and see names and information relating to policymakers, along with associated scores ranking the policymakers.

In some embodiments, a visual graph may be displayed to a user and include alignment coordinates to represent a policymaker's position on one or more agenda issues. In some aspects, this graph may be a multi-dimensional presentation, where one axis constitutes an alignment rating between the user and a legislator, and a second axis constitutes an effectiveness of the legislators, or how much money the user has contributed to the legislator. In other aspects, the graph may include one axis representing user favorability toward one agenda issue and another axis representing user favorability toward a different agenda issue.

In still other aspects, the user may overlay the alignment rating system on a whipboard predicting the likelihood that legislators will vote for a given bill. For example, users may select a group of legislators, as can be defined by the grouping in the whipboard, and direct at communication at those legislators. In further aspects, the first axis may represent the alignment between the first user and other users, and the second axis may represent the geographical distance between users' locations. Other types of graphical display may be contemplated.

Figure 22A:
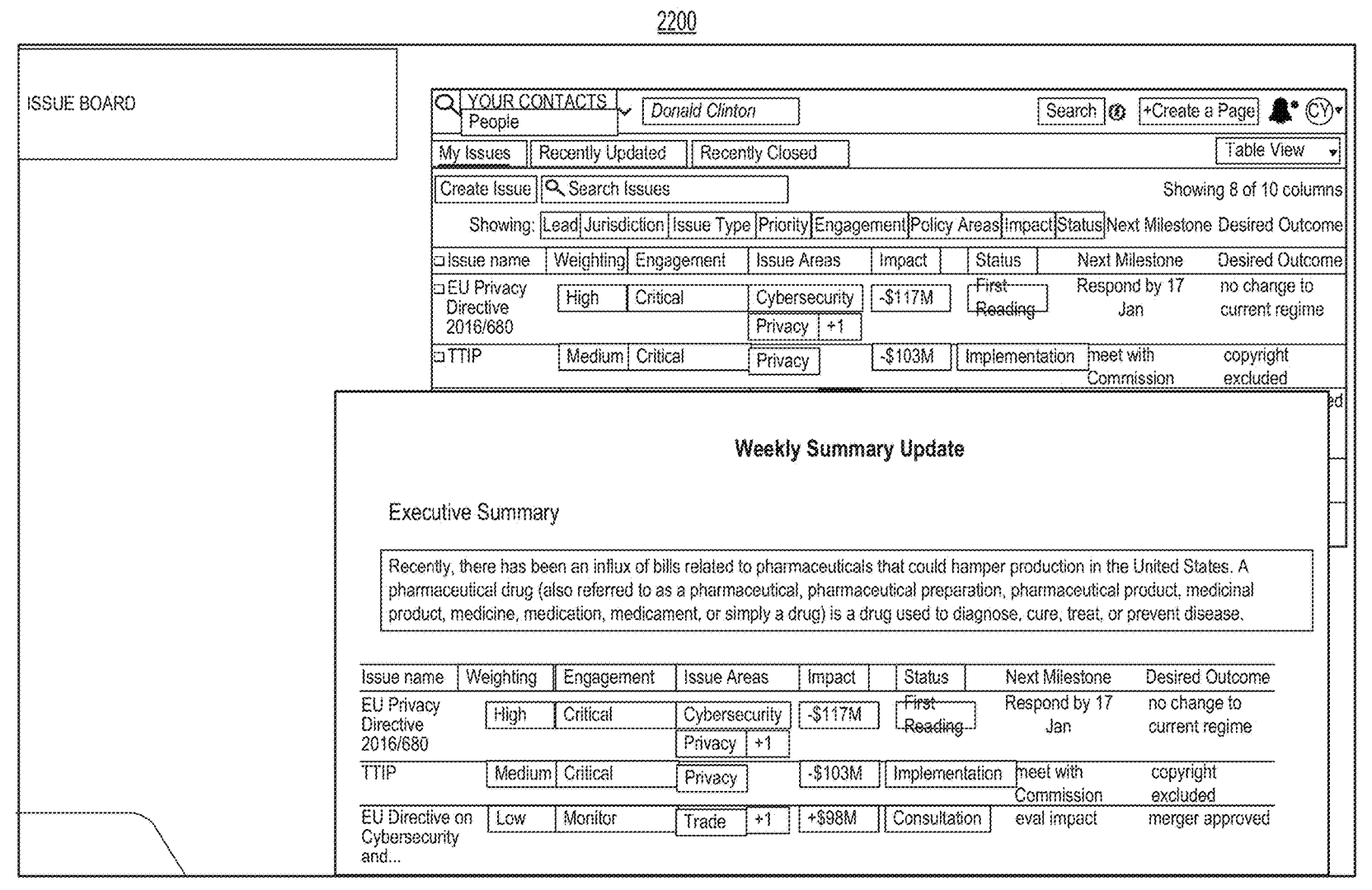

FIG. 22A is diagrammatic illustration of a GUI 2200 presenting a list of user-selectable agenda issues for performing internet-based agenda data analysis. In particular, FIG. 22A illustrates an exemplary GUI presenting a list of user-selectable agenda issues for performing an issue-based analysis of legislature alignment with organizational posture. GUI 2200 may be displayed as part of a screen executed by a software application on, for example, a personal device 300, 400. The screen may take the form of a web browser or web page consistent with the present disclosure.

GUI 2200 may include an "Issue Board" that aggregates essential information around issues in one integrated dashboard. The dashboard may allow for updates in real-time based on input or control to adjust weighting of each user-selected agenda issue. Agenda issues may include legislative agenda issues, regulatory agenda issues, and judicial agenda issues. A legislative agenda issue may be "Renewable Energy," a regulatory agenda issue may be "Net Neutrality," and a judicial agenda issue may be "Countervailing Duties". The "Issue Board" may be segmented based on issues or geography, and may also be customizable. A user may be able to "Create Issue" or "Search Issues," and may be able to filter issues that are displayed. For example, exemplary GUI 2200 may filter or segment agenda issues according to "Lead," "Jurisdiction," "Issue Type," "Priority," "Engagement," "Policy Areas," "Impact," and "Status" in order to limit display to particular agenda issues. In some aspects, only "Issue Areas" relating to "Cybersecurity" and "Privacy" may be displayed. GUI 2200 may further include a "Weekly Summary Update" and "Executive Summary" or a list of user-selectable agenda issues that are presented to a user via a user interface. A "Weighting" and a "Desired Outcome" may be displayed. Agenda issues may be hyperlinked to allow for user selection. Upon selection of agenda issue, one more users may enter an indication of an organization's posture for the selected issue. User(s) 107 may select agenda issues and input organizational position or posture information to determine policymaker alignment relative to the selected agenda issues.

FIG. 22B is diagrammatic illustration of a GUI 2210 presenting a dashboard of alignment of a legislators position on bills with the users. In particular, FIG. 22B illustrates an exemplary GUI 2210 dashboard including headers such as a "Bill Number," "Session," "Priority," "Position," "Vote," and "Alignment with Me." There may be numerous indicators or drop down menus for users to select a "Priority" and "Position." Based on a vote and other data, a calculation based on analysis may take place in accordance with the present disclosure in order to determine whether there is alignment with the user viewing the dashboard. "Alignment with Me" indicates whether a position defined in a particular bill aligns with the user or organization operating the dashboard.

Figure 22C:
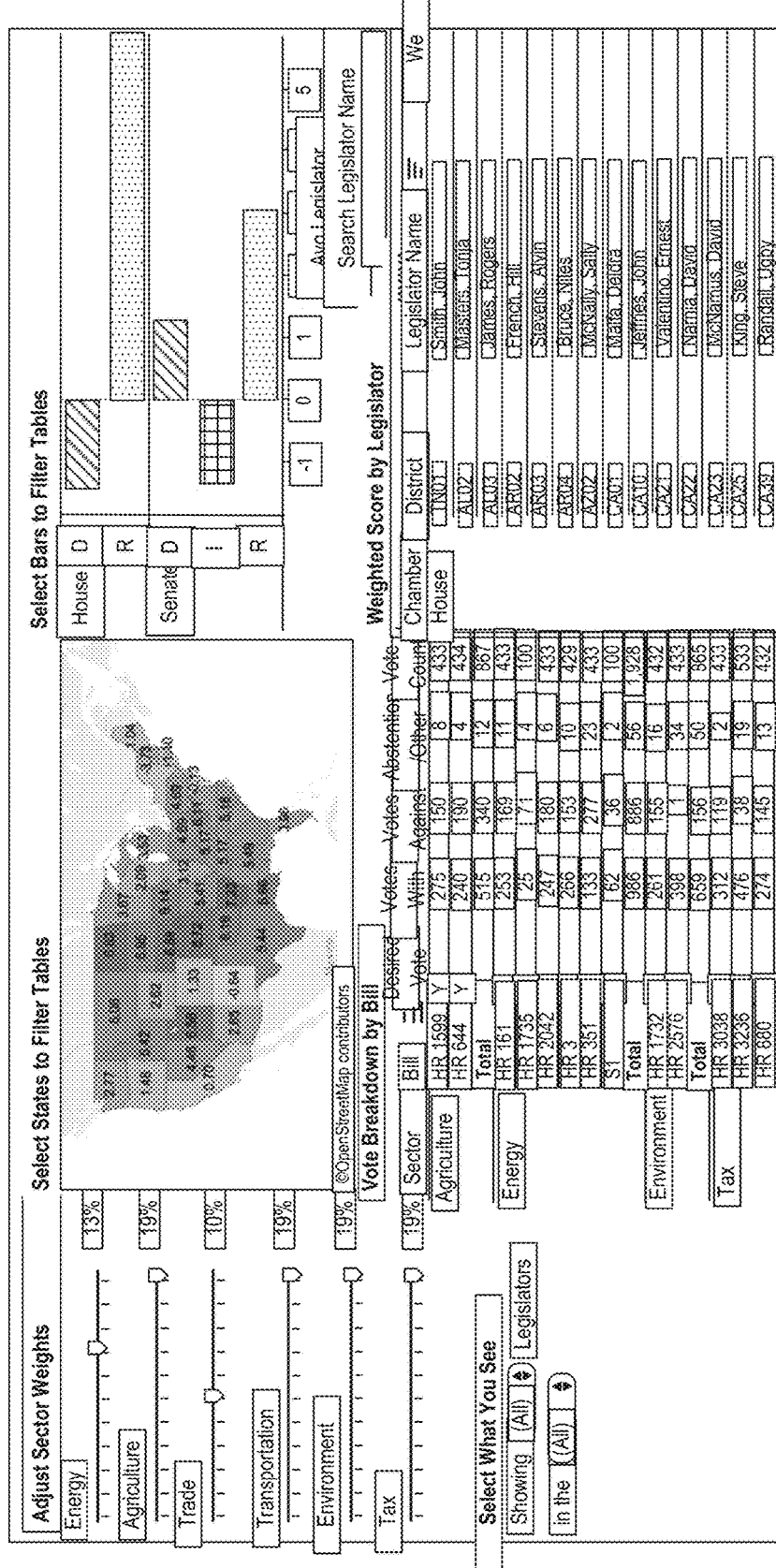
FIG. 22C is diagrammatic illustration of an example of a graphical user interface used for presenting a dashboard where sector weights may be adjusted to provide a weighted score for each legislator.

FIG. 22C is diagrammatic illustration of a GUI 2220 presenting a dashboard where sector weights may be adjusted in order to provide a weighted score for each issue area. For example, GUI 2220 may include sections to "Adjust Section Weights," "Select States to Filter Tables," "Vote Breakdown by Bill," and "Select Bars to Filter Tables." GUI 2220 further may present a "Weighted Score by Legislator." A user may weigh sectors or issues that are deemed most critical to the user by adjusting, clicking, or dragging a toggle. In accordance with the toggling of weight, display of other selections may be altered. In some aspects, a user may select and filter in order to allow for display of only desired information. Desired information may be displayed in graphical, tabular, and numerical form. Other types of display are contemplated. In this example, the user has weighted "Energy" at "13%" and as a result a weighted score for each legislator may be computed by alignment identification module 2104 and displayed.

Figure 22D:
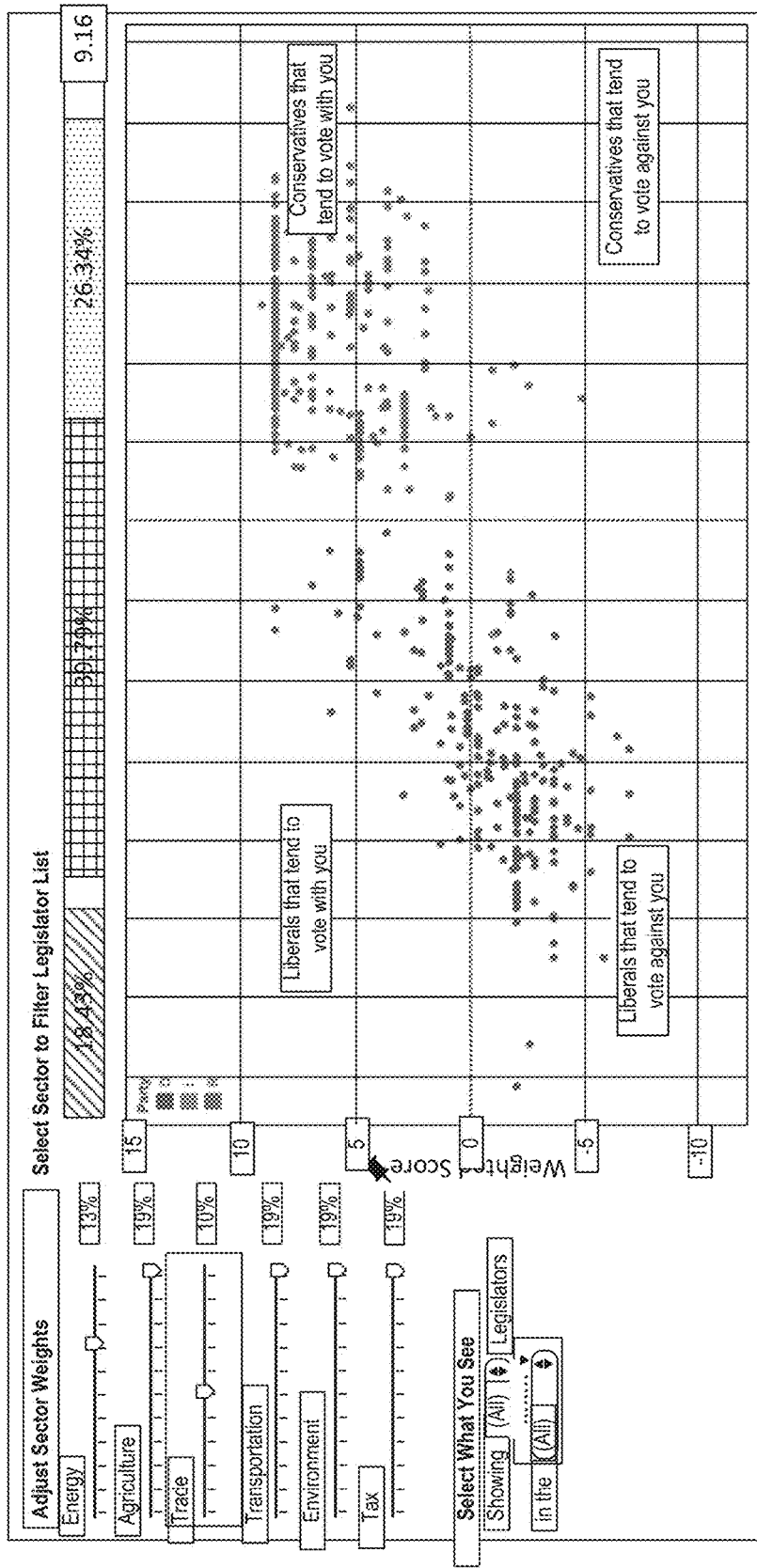
FIG. 22D is a diagrammatic illustration of an example of a graphical user interface used for presenting a graphical display that includes alignment coordinates displayed in graphical form.

FIG. 22D is a diagrammatic illustration of a GUI 2220 presenting a graphical display that includes alignment coordinates displayed in graphical form. Each displayed coordinate may represent a single policymaker's position on a single issue. In some embodiments, after alignment coordinates are displayed in graphical form, a user may adjust relative positions of the coordinates based on subsequent user manipulation of the at least one weighting control. The term "user manipulation" includes any modification by clicking, selecting, or dragging the weighting control in order to change alignment coordinates for a legislator. The term "control" includes any weighting based on user input. In other embodiments, after alignment coordinates are displayed in graphical form, a user may subsequently access updated individual policymaker data, and adjust relative positions of the coordinates based on updated individual policymaker data.

In still other embodiments, each displayed coordinate may be interactive, enabling a user who engages with the coordinate to view policymaker information. GUI 2230 may include the policymaker information that includes an identity of each policymaker. For example, the names of legislators and other legislators are displayed. On one axis, "vote with you" and "vote against you" based on a weighted score is displayed. On the other axis, ideology include liberal and conservative is presented. Liberals legislators are displayed are on the left and more conservative conservatives are on the far right. Accordingly, four quadrants may be displayed including "Liberals that tend to vote with you" in the top left, "Liberals that that tend to vote against you" in the bottom left, "Conservatives that tend to vote with you" in the top right, and "Conservatives that tend to vote against you" in the bottom right. Other alignment coordinates quadrants, axes, and displays are contemplated. Exemplary GUI 2230 allows for display of an alignment of multiple policymakers relative to a weighted organizational posture.

Figure 23A:
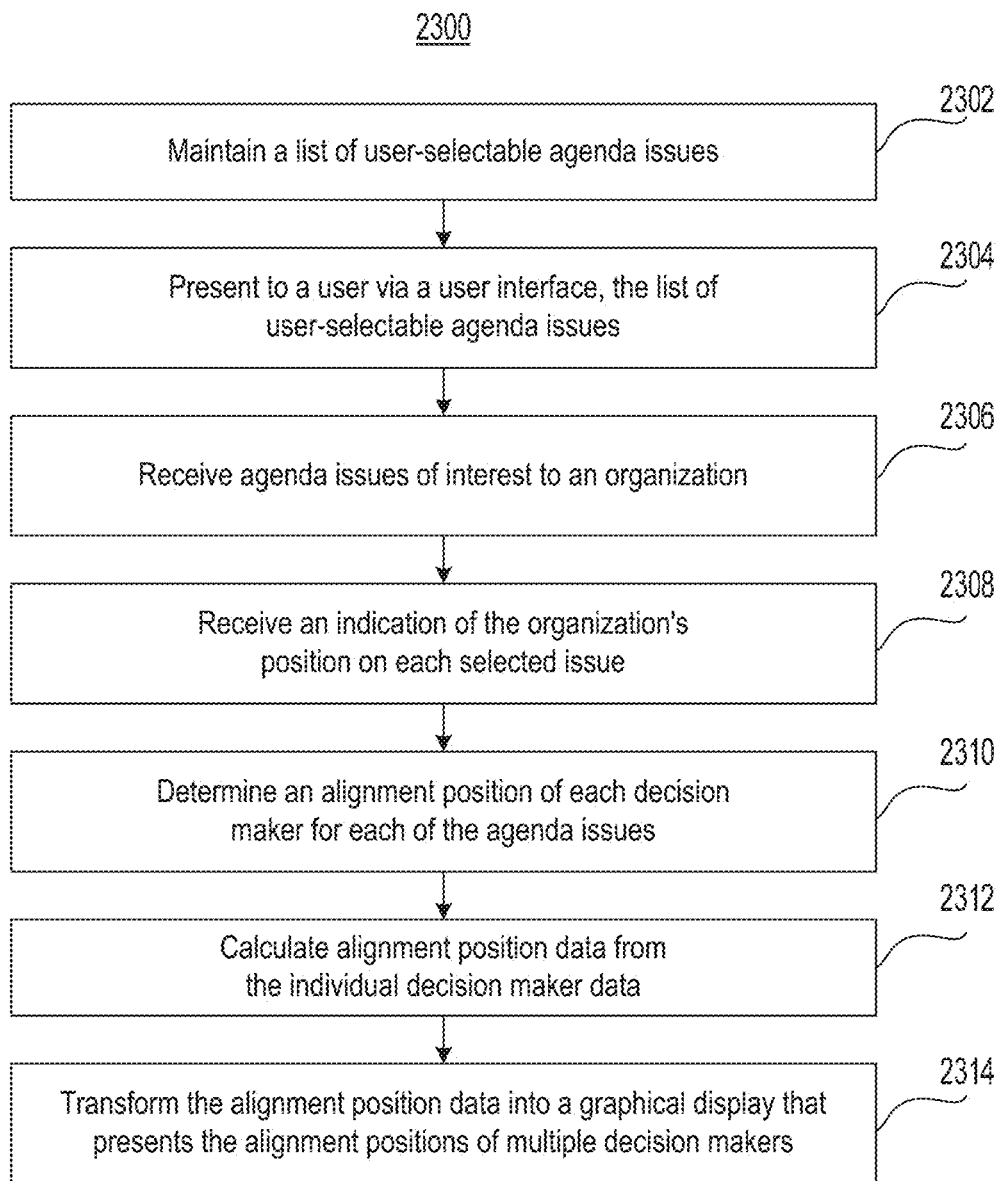
FIG. 23A is a flow chart illustrating an example of a process performed by the system in FIG. 1.

FIG. 23A illustrates an example flow chart representing an internet-based agenda data analysis method 2300 consistent with disclosed embodiments. Steps of method 2300 may be performed by one or more processors of a server (e.g., central server 105), which may receive data from user(s) 107 selecting both agenda issues of interest and an indication of an organization's position, and subsequently present alignment position data to user(s) 107 based on the selection.

At step 2302, the server may maintain a list of user-selectable agenda issues. The list of user-selectable agenda issues may be stored in modular database 2112, one or more storage servers 205a and 205b, and as part of sources 103a, 103b, and 103c comprising one or more local databases. The list of user-selectable agenda issues may be periodically updated, added, and deleted based on user input received at user input module 2108. User-selectable agenda issues may comprise any topic or subject matter as relevant to an organization, and may be specific or broad in scope. For example, as illustrated in FIG. 22A, user-selectable agenda issues may include "EU Privacy Direct 2016/680," "TTIP," "EU Directive on Cybersecurity" and may be related to issue areas such as "Cybersecurity," "Privacy," "Trade," or government bodies, such as New York, China or Brazil. Other agenda user-selectable agenda issues corresponding to other issue areas may be contemplated.

At step 2304, the server may present to a user via a user interface, the list of user-selectable agenda issues. For example, as illustrated in FIG. 22A, the list may be presented as part of an exemplary GUI 2200 constituting an "Issue Board." The "Issue Board" may aggregate all pertinent information relating to the list of user-selectable agenda issues in one consolidated dashboard. The list of user-selectable agenda issues and related information may be presented in tabular form and may include hyperlinks to allow for user selection and modification of agenda issues and related information. In some embodiments, the server may present to the user at least one control to adjust weighting of each user-selected agenda issue, wherein the weighting constitutes an organizational posture reflecting an overall stance of the organization. For example, "Weighting" may include "High," "Medium," and "Low." However, other more precise and quantitative controls to adjust weighing of each user-selected agenda issue may be envisioned.

The term "overall stance" includes the aggregate or summary of final position of an organization as it relates to a particular item.

At step 2306, the server may receive agenda issues of interest to an organization. User-selectable agenda issues may be selected by user(s) 107 and received at user input module 2108. In particular, based on a selection of user-selectable agendas from a list, system user input module 2108 may receive agenda issues of interest to an organization. In some embodiments, at step 2308, the server may receive an indication of the organization's position or posture on each selected issue. Information identification module 2102 may identify an indication of an organization's position or posture on each selected issue.

At step 2310, the server may determine an alignment position of each policymaker for each of the agenda issues. Memory 2100 may further instruct database access module 2110 to search database 2112 for policymaker data from which an alignment position on each of the agenda issues is determinable. In some aspects, if policymaker data is not available, action execution module 2106 may scrape the Internet to determine individual policymaker data including one or more alignment positions.

At step 2312, the server may calculate alignment position data from the individual policymaker data according to models in accordance with the present disclosure. The policymaker information may include an identity of each policymaker. The policymaker information includes at least one of voting history information of each of the legislators and party affiliation of each of the legislators. The policymaker information may also include at least one of regulation information of each of the regulators or government officials and party affiliation of each of the regulators or government officials. The policymaker information may also include at least one of voting history information of each of the each of the judges and nomination information or electorate demographics of each of the judges. Alignment identification module 2104 may calculate an alignment position data from individual policymaker data. In some embodiments, it may further aggregate alignment position of policymakers to compare a first plurality of policymakers to a second plurality of policymakers (e.g. the organizational posture to China's posture and Brazil's posture.) In some aspects, the alignment position data may correspond to relative positions of each of the plurality of policymakers on the plurality of selected issues.

At step 2314, the server may transform the alignment position data into a graphical display that presents the alignment positions of multiple policymakers. Action execution module 2106 may transform the alignment position data into a graphical display that presents the alignment positions of multiple policymakers. After the alignment coordinates are displayed in graphical form, a user may adjust relative positions of the coordinates based on subsequent user manipulation of the at least one weighting control. After the alignment coordinates are displayed in graphical form, a user may subsequently access updated individual policymaker data, and to adjust relative positions of the coordinates based on updated individual policymaker data as illustrated in FIGS. 22C-22D. Display in graphical form may provide useful information to determine legislator alignment with a predefined organizational posture.

Figure 23B:
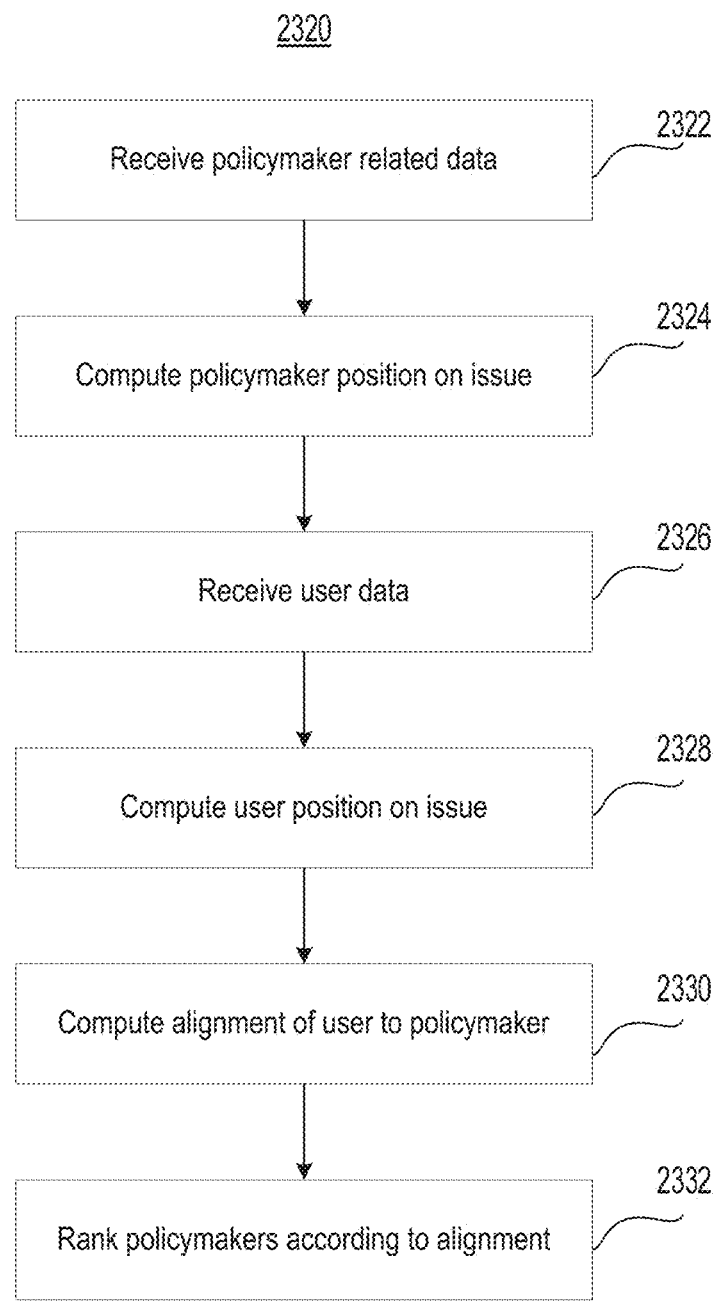
FIG. 23B is a flow chart illustrating an additional example of a process performed by the exemplary system in FIG. 1.

FIG. 23B illustrates an example flow chart representing a second internet-based agenda data analysis method 2300 consistent with disclosed embodiments. Steps of process 2320 may be performed by one or more processors of a server (e.g., central server 105), which may receive data from user(s) 107 selecting both agenda issues of interest and, in some embodiments, an indication of an organization's position, and subsequently present alignment position data to user(s) 107 based on the selection.

At step 2322, the server may receive policymaker data. Policymaker data may be submitted by user(s) 107 and received at user input module 2108. At step 2324, the server may compute a policymaker position on an issue in accordance with the prior method. The computation may derive from the individual policymaker data. The policymaker information may include an identity of each policymaker. The policymaker information may further include at least one of voting history information of each of the legislators and party affiliation of each of the legislators. The policymaker information may also include at least one of regulation information of each of the regulators or government officials and party affiliation of each of the regulators or government officials. Alignment identification module 2104 may calculate an alignment position data from individual policymaker data to determine a policymaker position on an issue in accordance with the disclosure.

At step 2326, the server may receive user proprietary data. User data may be submitted by user(s) 107 and received at user input module 2108. At step 2328, the server may compute a user position on an issue according to models, as discussed in earlier sections. The user information may include an identity of each user. The user information may include at least one of user activity of each of the users. Alignment identification module 2104 may calculate an alignment position data from user data to determine a user's position on an issue. This may be display as shown in FIGS. 22B and 22D.

At step 2330, the server may compute alignment of a user to a policymaker. Alignment identification module 2104 may calculate an alignment of a user to a policymaker. At step 2332, the server may rank policymakers according to alignment. Alignment identification module 2104 may rank policymakers according to alignment. A policymaker with a closest alignment to a user may receive a highest score, and a policymaker with the furthest alignment may receive a lowest score. Ranking may be weighted and displayed as part of a "Weighted Score By Legislator" as shown in FIG. 22C. Other types of ranking and display are contemplated.

Virtual Whipboard

As described in more detail below, the disclosed embodiments may include systems and methods for generating and displaying a virtual whipboard to a system user. For example, in one embodiment, the virtual whipboard may include one or more groupings of legislators slated to vote on a pending legislative bill. The groupings may be based on any desired category, such as legislators likely to place a similar vote (e.g., affirmative, negative, leaning affirmative, leaning negative, etc.) on the pending legislation. An example of a graphical user interface for a virtual whipboard was discussed above in connection with FIG. 16H.

Further, in some embodiments, the virtual whipboard may include an integrated communications interface to enable the user to generate one or more communications targeted at one or more legislators slated to vote on the pending legislation. In some embodiments, the system may allow a user to communicate directly from the virtual whipboard with a selected legislator or group of legislators. This may enable, for example, a user to send a common message to personnel associated with legislators who have an aligned position on a particular bill. In some embodiments, one or more of the foregoing features may enable the system user to contact one or more legislators in a more convenient manner than existing systems allow.

Figure 24:
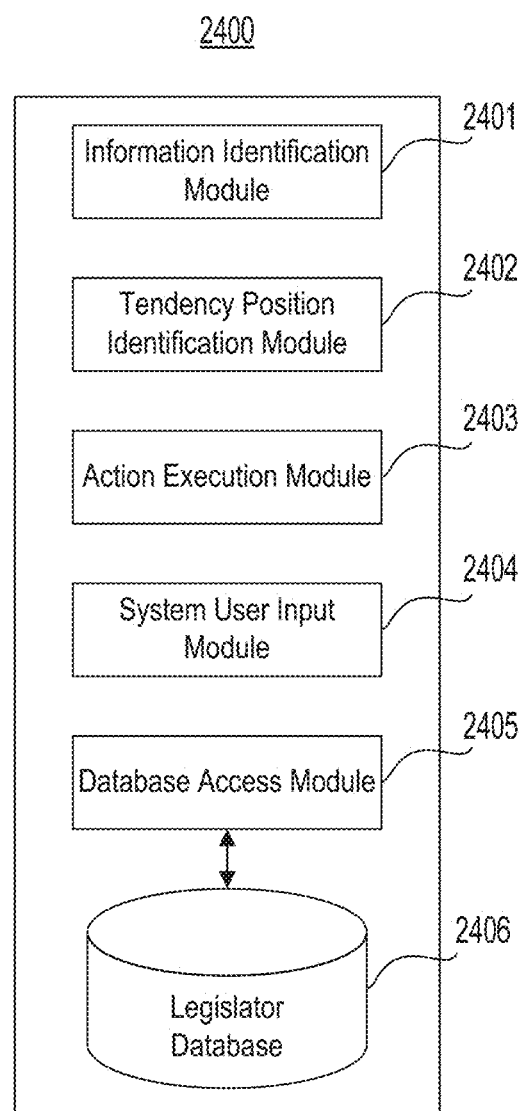
FIG. 24 illustrates an example of a memory containing software modules.

FIG. 24 is a diagram illustrating a memory 2400 storing a plurality of modules. The modules may be executable by one or more processors of a server (e.g., central server 105, discussed) above. Further, in other embodiments, the components of memory 2400 may be distributed over more than one location (e.g., stored in a plurality of servers in communication with, for example, network 101).

As illustrated in FIG. 24, memory 2400 may store software instructions to execute an information identification module 2401, a tendency position identification module 2402, an action execution module 2403, a system user input module 2404, a database access module 2405, and legislator database(s) 2406. Information identification module 2401 may include software instructions for scraping the Internet to identify pending legislative bill(s) and information about legislators slated to vote on those bill(s). Tendency position identification module 2402 may include software instructions for parsing the identified information to determine a tendency position (e.g., whether the legislator will vote for or against a bill) for each legislator. Action execution module 2403 may include software instructions to cause the occurrence of an action (e.g., display of a virtual whipboard) based on the determined tendency positions. System user input module 2404 may include software instructions for receiving a system user selection of a group of legislators selected for a communication interaction (e.g., an email) and/or for receiving a system user selection of one or more legislative function categories (e.g., a person's position or job title). Database access module 2405 may include software instructions executable to interact with legislator database(s) 2406, to store and/or retrieve information.

Information identification module 2401 may include software instructions for scraping the Internet to identify a currently pending legislative bill. For example, the software instructions may direct a processor to access publically available information from online websites associated with government entities, non-profit corporations, private organizations, etc. The scraped information might include policymaking documents, including legislative bills in the form of proposed legislation, regulations, or judicial proceedings from various government bodies, including at the local, state, or federal level. The currently pending legislative bill may include, for example, a regulation proposed by an administrative agency (e.g., a rule promulgated by the United States Patent and Trademark Office), a federal bill proposed by a member of Congress (e.g., a health care bill), an ongoing case in the Fifth Circuit Court of Appeals, or any other type of legislative bill.

The data collection via Internet scraping may occur at any desired time interval. For example, the Internet may be scraped at preset periods (e.g., once per day), at initiated periods (e.g., in response to user input directing such scraping), in real-time (i.e., continuously throughout a given operation), etc., as described above.

Information identification module 2401 may further include software instructions for scraping the Internet to identify information about legislators slated to vote on the identified pending legislative bill. For example, the information about legislators slated to vote on the bill may include, for one or more of the legislators, party affiliation, past voting history on similar or opposing bills, written or auditory public comments (e.g., speeches, opinion pieces in newsletters, etc.), features of the represented legislative district (e.g., which industries supply jobs in the legislator's district), or any other available information about characteristics, prior actions or tendencies, or proclivities of the legislator.

Tendency position identification module 2402 may include software instructions for parsing or modeling the collected information to determine a tendency position for each legislator. The tendency position may be an indicator of a likelihood that the legislator tends toward one position and/or away from an opposite position with respect to the legislative bill. For example, the tendency position may be a percentage likelihood that the legislator will vote for a proposition set forth in the bill. For further example, the tendency position may be a percentage likelihood that the legislator will not vote for the opposite of a proposition set forth in the bill. As such, the tendency position may reflect a prediction of how each legislator is likely to vote on a pending bill. Further, the tendency position may be expressed in terms of percentages, absolute numbers, fractions, or any other suitable numerical or qualitative indicator of a likelihood that legislator will cast a vote in a given direction on the bill.

In some embodiments, the tendency position for a given legislator may be determined based on any combination of available information. For example, the tendency position may be determined based on one or more campaign contributions. For instance, if an organization (e.g., Planned Parenthood) that is a proponent of a given bill (e.g., funding for women's health needs) contributed a large sum of money to the legislator's election campaign, the tendency position for the legislator may favor a "yes" vote on the pending bill.

In one embodiment, the tendency position may be determined based on one or more prior votes of the legislator. For example, if the legislator has voted with a pro-gun inclination in the past, then the legislator may tend toward other gun owner rights bills. In other embodiments, the tendency position may be based on any additional factors that provide insight into how a legislator is likely to vote on a pending bill, including but not limited to party affiliation, public statements of the legislator or his/her staff, etc. In other embodiments, the tendency position may be the outcome of a model, as described above, whose input consists of one or more factors described above.

Action execution module 2403 may be configured to perform a specific action in response to the identified information. For example, action execution module 2303 may transmit a virtual whipboard for display to a system user. The virtual whipboard may group legislators into a plurality of groups based on the tendency positions determined by the tendency position identification module 2402. As used herein, the term "virtual whipboard" refers to a virtual representation of the likelihood that one or more legislators are likely to vote for or against a given bill. For example, in some embodiments, the outcomes and likelihoods of each legislator voting for a specific bill on the floor may be electronically presented in a table (i.e., a whipboard) in which legislators are grouped together in several buckets representative of the likelihood of their voting. For instance, all legislators likely to vote "yes" (e.g., yea) on a bill may form a first group, all legislators likely to vote "no" (e.g., nay) on a given bill may form a second group, and all legislators that are a "toss up" as to the bill may form a third group.

System user input module 2404 may include software instructions for receiving a system user selection of one or more of the plurality of groups displayed on the virtual whipboard. The system user may select one or more groups for a communication interaction based on the determined tendency position of the group. As used herein, the term "communication interaction" refers to any way or manner of exchanging information or connecting with one or more other individuals or entities. For example, the communication interaction may be emailing, calling on the phone, broadcasting a message directly to the legislator, or to a set of individuals requesting that they communicate with the legislator, sending a text message, etc.

In some embodiments, the virtual whipboard may be manipulated by the system user, for example, to filter by various attributes of legislators, such as party affiliation, voting likelihood, length of service, etc. As a further example, proprietary data may be used by the user of the system to filter legislators. Once manipulated in this manner, the user may provide the system user input module 2404 with a selection of one or more of the groups based on the tendency position of the group. For example, the user may select the "toss up" group for targeting with communications intended to sway members of the group toward a "yes" vote. The system user may provide his/her selection via any variety of suitable means, depending on implementation-specific considerations. For example, the system user may interact with a user interface displaying the virtual whipboard (e.g., by pressing a "select" button with his/her finger, or using a selector, such as a mouse, to select the desired group). For further example, the system user may select the desired group by accessing a dropdown menu in standalone software integrated with the virtual whipboard. In other embodiments, the user may provide a voice command that is recorded and/or translated into an action (e.g., determining a group selection indication) by the action execution module 2403. Indeed, the system user may provide his/her selection via any suitable interface.

Database access module 2405 may access legislator database 2406 to retrieve legislative communication addresses of legislative personnel scraped from the Internet and divided into a plurality of legislative function categories. The legislative communications addresses may be any type of address at which a person can be reached. For example, the legislative communication addresses may be email addresses, physical home addresses, physical business addresses, phone numbers, website URL's including contact forms, social media accounts, etc. A legislative function category may be a person's position or job title. For example, the legislative function category may be chief of staff, deputy chief of staff, legislative assistant, congressional aide, legislative correspondent, legislator, etc.

System user input module 2404 may receive from the system user a selection of which legislative function categories are desired for the communication interaction. For example, the system user may want to sway a given legislator to vote "yes" on a bill. However, since it is unlikely the legislator will respond to a communication directly, the system user may target a member of the legislator's staff, such as the legislator's chief of staff. Once the user has selected the legislative function categories and groups of legislators to target, action execution module 2403 exports the communication addresses of the legislative personnel associated with the user's selections to a communication platform. For example, the email addresses of the staff members of each of the legislators in the "toss up" group may be exported to the system user's email account to enable the system user to send an email to the staff members without the need to manually input each of the addresses for each of the staff members. However, it should be noted that exporting to the communication platform may include any suitable form of exporting the addresses from the legislator database, such as interfacing with a module within the system, or interfacing with a standalone email system of the system user.

Legislator database 2406 may be configured to store any type of legislator information of use to modules 2401-2405, depending on implementation-specific considerations. For example, in embodiments in which the system user desires to target the legislators personally, legislator database 2406 may store publicly available information about a given legislator. In other embodiments, legislator database 2406 may store information associated with the system user's prior selections for prior legislative bills (e.g., if the system user typically selects "toss up" groups). Indeed, legislator database 2406 may be configured to store any information associated with the functions of modules 2401-2405.

Figure 25A:
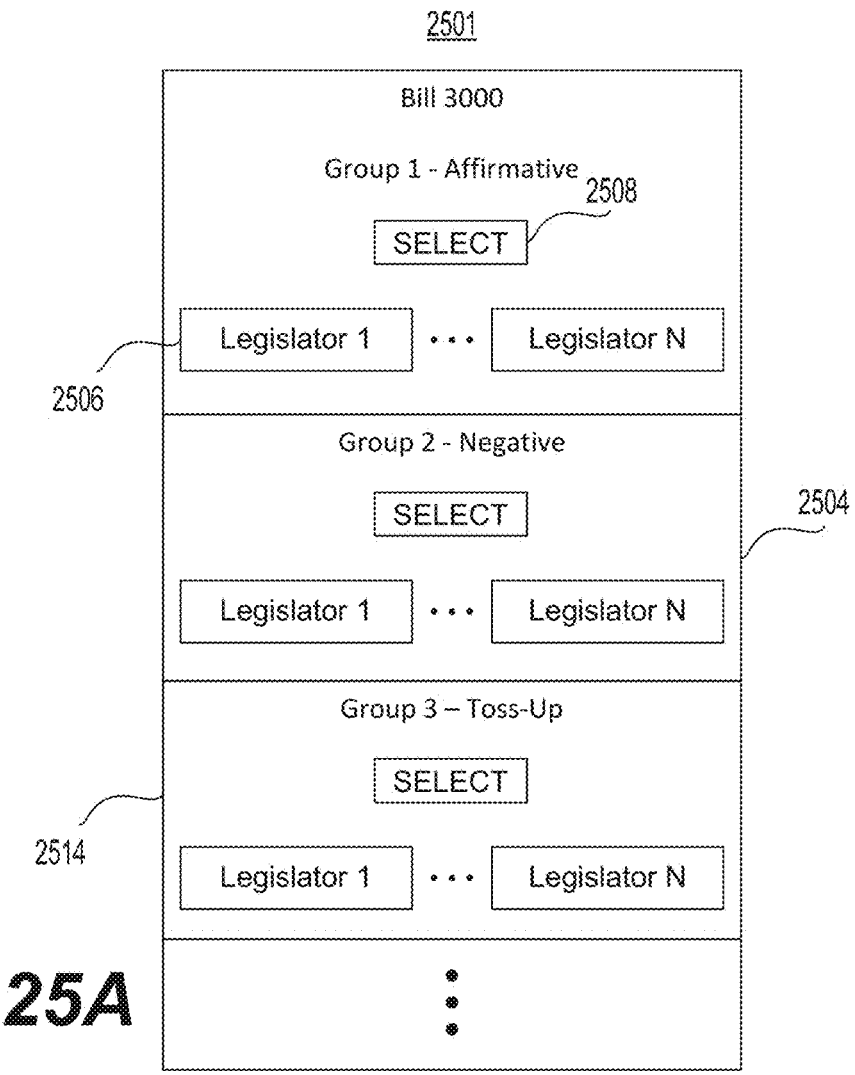
FIG. 25A illustrates an example of a virtual whipboard.
Figure 25B:
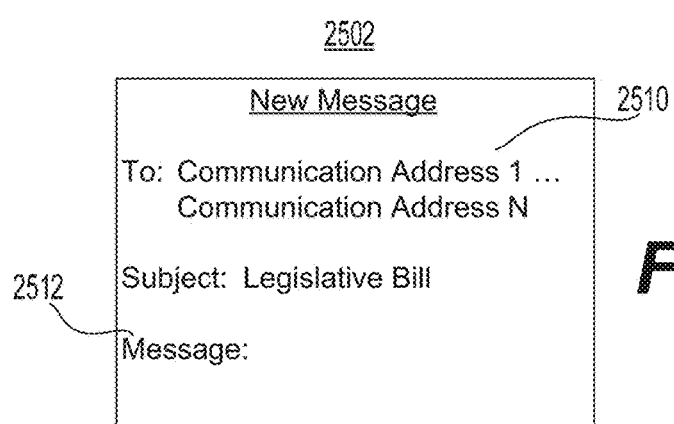
FIG. 25B illustrates an example of a communication that may be generated via use of the virtual whipboard of FIG. 25A.

FIG. 25A illustrates an example of a virtual whipboard 2501, and FIG. 25B illustrates a communication 2502 that can be generated via use of the virtual whipboard 2501 by the system user. As illustrated, the virtual whipboard 2501 may display a first panel 2503 for a first group of legislators, a second panel 2504 for a second group of legislators, a third panel 2514 for a third group of legislators, and additional panels 2505 for any additional groups of legislators. On each panel, a graphical indication 2506 for each legislator assigned to a given group may be displayed. The graphical indication 2506 may be any indication that allows the system user to identify the legislator. For example, the graphical indication may be the legislator's name, picture, state, initials, chief of staff, etc. Further, each of panels 2503, 2504, 2514, and 2505 may include a select button 2508 that enables the system user to select that group for inclusion in the communication interaction.

As shown in FIG. 25B, communication 2502 is an email message including communication addresses 2510 corresponding to the selected group(s) of legislators and legislative function categories. In some embodiments, system user input module 2404 may further enable the system user to provide a common message for export to the legislative personnel associated with the selected group(s) of legislators. For example, the virtual whipboard 2501 may provide an option for the system user to draft a message. The message may then be exported and displayed in the message field 2512 of communication.

It should be noted that the illustrated virtual whipboard 2501 and communication 2502 are merely examples subject to a variety of implementation-specific variations. For example, the quantity of groups displayed may vary. In one embodiment, three groups corresponding to yes, no, and toss-up likelihoods of voting on the bill may be provided. In another embodiment, at least five categories of groups may be provided, including, for example, affirmative, leaning affirmative, neutral, leaning negative, and negative. Still further, in other embodiments, additional degrees of likelihood of voting for or against the bill may be provided.

Further, in some embodiments, the virtual whipboard 2501 may display one or more sorting options to the system user. For example, the virtual whipboard 2501 may enable the user to sort the legislators by party affiliation, represented district or state, or any other identifying characteristic. Still further, the virtual whipboard 2501 may enable the system user to message the legislative personnel associated with the selected group of legislators and legislative function categories directly from a messaging interface of the virtual whipboard 2501. That is, the virtual whipboard 2501 may display a "mailing list" option that enable the user to generate an email directly in the virtual whipboard 2501 interface.

Figure 26:
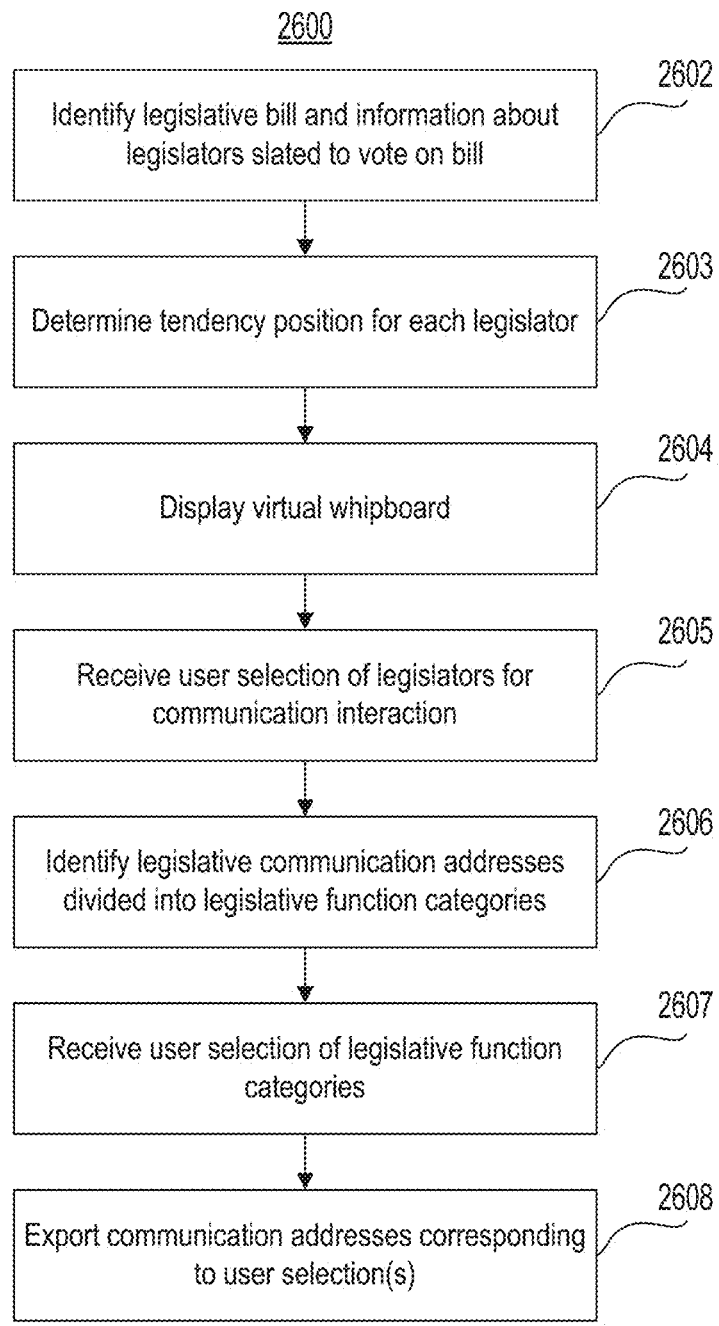
FIG. 26 is a flow chart illustrating an example of a method for using a virtual whipboard in conjunction with a communication system.

FIG. 26 illustrates a method 2600 for using the virtual whipboard 2501 in conjunction with a communication system in accordance with a disclosed embodiment. Method 2600 may, for example, be executed by one or more processors of a server (e.g., central server 105 of FIG. 1) or any other appropriate hardware and/or software. Further, when executing method 2600, the one or more processors may execute instructions stored in any one of the modules discussed above.

In accordance with the method 2600, the server may identify a legislative bill and information about legislators slated to vote on the bill at block 2602. Block 2602 may be facilitated by software instructions of information identification module 2401. Information identification module 2401 may be configured to scrape the Internet to identify a currently pending legislative bill relevant to the system user. For example, if the system user is interested in bills influencing the environment, the Internet may be scraped to identify bills being discussed on environmental blogs, or mentioned on a governmental website associated with the environment. Once the bill is identified, information identification module 2401 may identify information about the legislators slated to vote on the bill, as described in detail above.

The identified information about the legislators may be processed via software steps executed by tendency position identification module 2402. For example, at block 2603, the server may execute tendency position identification module 2402 to determine a tendency position for each legislator slated to vote on the identified bill. For further example, tendency position identification module 2402 may determine whether each legislator takes a position that is affirmative, leaning affirmative, neutral, leaning negative, or negative.

At block 2604, the server may execute action execution module 2403 to transmit for display to a system user the virtual whipboard grouping legislators into one or more groups based on the tendency positions determined in block 2603. For example, the virtual whipboard 2501 may be displayed to the system user to show which legislators were assigned to which groups. This display enables the system user to select one or more of the displayed groups for a communication interaction, and the user selection is received by the system user input module at block 2605. For example, the system user may select to target the legislators grouped in the leaning affirmative, neutral, and leaning negative groups in an attempt to sway the legislators from their current tendency positions.

At block 2606, the server may execute database access module 2405 to access legislator database 2406 to retrieve legislative communication addresses of legislative personnel scraped from the Internet and divided into a plurality of legislative function categories. At block 2607, system user may then provide a selection of one or more legislative function categories (e.g., legislative staff) for the communication 2502 via system user input module 2404. The communication addresses corresponding to the system user's selections of the legislator group(s) and legislative function categories are then exported, for example, to the system user's email system. In this way, the system user may target communication 2502 to the people associated with the legislators in the target tendency position groups.

Altering Issue Outcomes

As described in more detail below, presently disclosed embodiments include systems and methods for predicting and prescribing actions for impacting policymaking outcomes. Policymaking is understood to include legislation, rulemaking decisions, and the like. For example, in some embodiments, a prediction may be rendered with respect to whether a given policymaking outcome (e.g., bill will pass, bill will not pass, regulation will be adopted, regulation will not be adopted, etc.) is likely to occur. Further, in one embodiment, the system may include a prescription engine that prescribes particular actions that can be taken in order to increases the chances of achieving a desired outcome. For example, the prescription engine may advise the system user to engage in a direct mailing campaign directed at a particular policymaker to sway the policymaker to decide in accordance with the user's desired outcome for the policy.

In some embodiments, the initial prediction of the outcome with respected to the pending policy may include both a prediction of the voting direction of each policymaker and a measure of the confidence level with which the voting prediction is made. For example, one initial prediction may be that a given policymaker is likely to decide in the affirmative for the policy. The confidence level may then be set at 90% if, for example, the policymaker consistently decides for bills or regulations favorable to a cause furthered by the bill or regulation (e.g., environmental causes). In that way, the confidence level may be reflective of the policymaker's prior behavior. In other embodiments, however, the confidence level may be reflective of the confidence the system has in its analysis of the voting propensity of the policymaker. For example, if a greater amount of information is available about the policymaker's past decisions, the confidence level may be greater than if the system is working with a sparser set of information about the policymaker.

Figure 27:
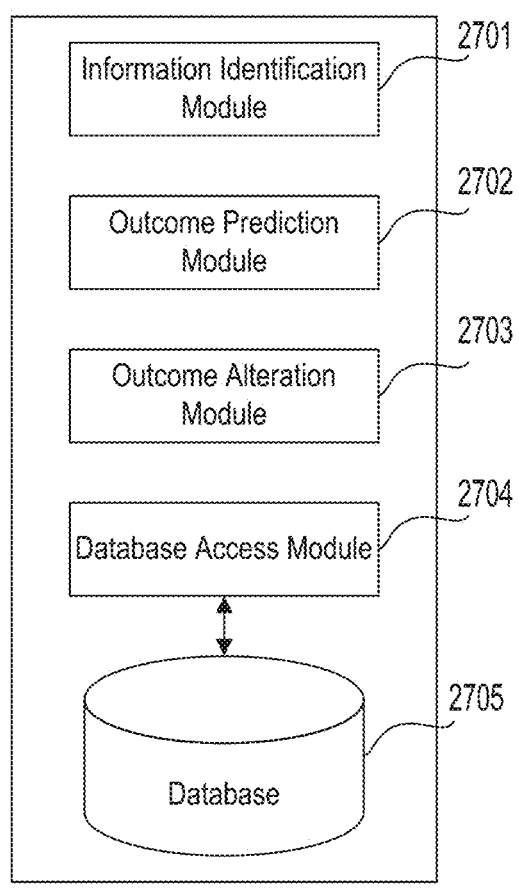
FIG. 27 illustrates an example of a memory containing software modules.

FIG. 27 is a diagram illustrating an example of memory 2700 storing a plurality of modules. The modules may be executable by one or more processors included in a server (e.g., central server 105, discussed above). Further, in other embodiments, the components of memory 2700 may be distributed over more than one location (e.g., stored in a plurality of servers in communication with, for example, network 101).

As illustrated in FIG. 27, memory 2700 may store software instructions to execute an information identification module 2701, an outcome prediction module 2702, an outcome alteration module 2703, a database access module 2704, and database(s) 2705. Information identification module 2701 may include software instructions for receiving event data, which may be scraped or proprietary data related to a policymaking process (e.g., information that a particular piece of legislation is pending) and alignment data associated with the event data (e.g., information indicating whether legislators slated to vote on the legislation are predicted to align with or against the legislation) from at least one internet server. Outcome prediction module 2702 may include software instructions for generating assumption data, a predicted outcome and likelihood (e.g., an initial prediction and likelihood of how each legislator is likely to vote, and the initial prediction and likelihood of the legislation being enacted). Outcome alteration module 2703 may include software instructions for determining actions that may successfully alter predicted outcome to a desired outcome (e.g., increase the likelihood that a bill will be enacted). Database access module 2704 may include software instructions executable to interact with database(s) 2705, to store and/or retrieve information.

Information identification module 2701 may include software instructions for receiving event data and alignment data associated with the event data, which may be scraped data from at least one internet server. Event data may refer to information indicating that a given thing is going to occur. For example, event data may be scraped data that includes information that a particular piece of legislation is pending. For further example, scraped data may include information that an environmentally related bill has been proposed in Congress and is under consideration.

Information identification module 2701 may further receive from a system user, via an interactive interface of a browser, a desired outcome indicator corresponding to the event. A desired outcome indicator, as used herein, may be an indication of a desired result with respect to the event data. For example, if the scraped data is the information that a policy is pending, the desired outcome indicator may be whether a user would like the policy to pass or not pass, be adopted, not pass, or not be adopted. If the user has not provided a desired outcome indicator for a given policy, a system-generated or user-generated model for predicting the user position (e.g. desired outcome) may be used in place of the explicit user position on a policy.

More particularly, in some embodiments, information identification module 2701 may store software instructions for scraping the Internet to identify a currently pending policy (e.g., a legislative bill) or accessing information scraped from the Internet. For example, the software instructions may direct a processor to access publically available information from online websites associated with government entities, non-profit corporations, private organizations, etc. The scraped information might include legislative bills in the form of proposed legislation, regulations, or judicial proceedings at the local, state, or federal level. The currently pending legislative bill may include, for example, a regulation proposed by an administrative agency (e.g., a rule promulgated by the United States Patent and Trademark Office), a federal bill proposed by a member of Congress (e.g., a health care bill), an ongoing case in the Fifth Circuit Court of Appeals, or any other type of legislative bill.

The data collection via Internet scraping may occur at any desired time interval. For example, the Internet may be scraped at preset periods (e.g., once per day), at initiated periods (e.g., in response to user input directing such scraping), in real-time (i.e., continuously throughout a given operation), etc.

Information identification module 2701 may further include software instructions for scraping the Internet, or accessing information scraped from the Internet, to identify information about policymakers slated to decide on the identified pending policy. For example, the information about policymakers slated to decide on the policy may include, for one or more of the policymakers, party affiliation, past voting history on similar or opposing policies, written or auditory public comments (e.g., speeches, opinion pieces in newsletters, etc.), features of the represented legislative district (e.g., which industries supply jobs in the policymaker's district), or any other available information about characteristics, prior actions or tendencies, or proclivities of the policymaker.

Outcome prediction module 2702 may store software instructions for generating assumption data and/or applying one or more models as discussed above. Assumption data, as used herein, may represent an assumed value for a feature used by the model. For example, in one embodiment, assumption data may indicate a likelihood of an affirmative (or negative) vote for each legislator of a plurality of legislators slated to vote on a piece of legislation. Assumption data may also indicate a likelihood of a particular piece of legislation passing or not passing. The assumption data may be output to an interface in some embodiments. Outcome prediction module 2702 may receive information from database access module 2704 and use the received information as input in one or more models. After applying one or more models, prediction and output prediction module 2702 may output one or more predictions and/or one or more likelihoods related to the policy. Instead of using raw scraped data, in some embodiments, the server may extract one or more features from the data, as discussed above, to use as inputs for the model. In other embodiments, the extracted features and their assumed values may constitute the assumption data. Still further, outcome prediction module 2702 may calculate a success probability of the desired outcome based on the assumption data and the desired outcome data. Success probability, as used herein, may be an indicator of a likelihood of success of the event. For example, success probability may correspond to a probability that a legislative bill will pass. Further, it should be noted that success probability may be expressed in any suitable manner, including but not limited to a percentage, a ratio, etc.

More specifically, in one embodiment, outcome prediction module 2702 may include software instructions for parsing the scraped information to determine a prediction relating to an outcome of the pending policy. The initial prediction (e.g., assumption data) may include a prediction for each of a plurality of policymakers slated to decide on the pending policy and a measure of the propensity of each of the plurality of policymakers to decide in accordance with the initial prediction. For example, in one embodiment, the initial prediction may indicate that a given policymaker is going to decide affirmatively for the pending policy with a confidence level of 90%. Once determined, outcome prediction module 2702 may display to the system user the initial prediction. The initial prediction may be displayed in any suitable manner. For example, the initial prediction may display a symbol corresponding to a graphical representation of an affirmative or negative position, along with a percentage confidence of the position.

Outcome alteration module 2703 may include software instructions for generating a suggested alteration to the assumption data that impacts the success probability. In some embodiments, the suggested alteration may be generated based on the scraped data, proprietary data, and the success probability. For example, in one embodiment, the suggested alteration to the assumption data may be a change as to which policymakers (e.g., legislators) are likely to decide (e.g., vote) in the affirmative (or negative) for the pending policy (e.g., a legislative bill).

More specifically, in some embodiments, outcome alteration module 2703 may access second information to identify an action likely to change at least one of the assumption data. For example, second information could identify an action likely to change at least one of the initial prediction and the propensity of at least one policymaker to generate a subsequent prediction corresponding to an increase in a likelihood of achieving the desired outcome. For example, outcome alteration module 2703 may access information scraped from the Internet that indicates that when a given policymaker receives a large number of letters from his/her constituents in support of the policy, he/she typically decides for the policy. Outcome alteration module 2703 may then display to the system user a recommendation to take the action in order to increase the likelihood of achieving the desired outcome. For example, the system user may receive a prompt indicating the user should motivate the policymaker's constituents to send letters to the policymaker in support of the policy.

However, it should be noted that the provided recommendation may be any suitable action, depending on implementation-specific considerations. For example, the recommendation may be to take action for regulatory policymaking. In such embodiments, the recommendation may include identifying language to change the pending regulation, identifying language to be added to the pending regulation, identifying policymakers, and/or suggesting at least one organization that desires the desired outcome or an outcome related to the desired outcome. For further example, in other embodiments, the recommendation may be to take action for judicial policymaking. In such embodiments, the recommendation may include identifying language to present in briefs, identifying language to be used in oral arguments, identifying policymakers, and/or suggesting at least one organization that desires the desired outcome or an outcome related to the desired outcome.

As discussed above, FIG. 19E illustrates an embodiment of a graphical user interface that may be used for viewing information related to influencing an outcome. The server may generate an initial prediction of the user(s)' likelihood of supporting the bill. In some embodiments, based on that predicted desired outcome indicator, the outcome alteration module 2703 may recommend two sets of actions to alter the assumption data. The first set of assumption data may relate to the contribution a cosponsor makes to the success of a bill. For example, if the bill has no cosponsors, the predicted outcome may have no contribution from cosponsors, but the assumption data prediction may indicate that by convincing either Sen. Rob Smith or Sen. Kevin Bloom, for example, to cosponsor, the success probability will increase. The second set of assumption data may relate to the voting likelihood of individual legislators. The assumption data may suggest that Sen. Julie Andrews is currently 37% likely to vote affirmatively, but by contacting her and motivating her to vote yes, she would increase the success probability by 13%.

Database access module 2704 may access database(s) 2705 to retrieve information used by modules 2701-2703. Database(s) 2705 may be configured to store any type of information of use to modules 2701-2703, depending on implementation-specific considerations. For example, database(s) 2705 may store the first information (e.g., information scraped from the Internet about a plurality of policymakers) and/or the second information (e.g., information regarding what public actions influenced a policymaker in the past). Indeed, database(s) 2705 may be configured to store any information associated with the functions of modules 2701-2704.

Figure 28:
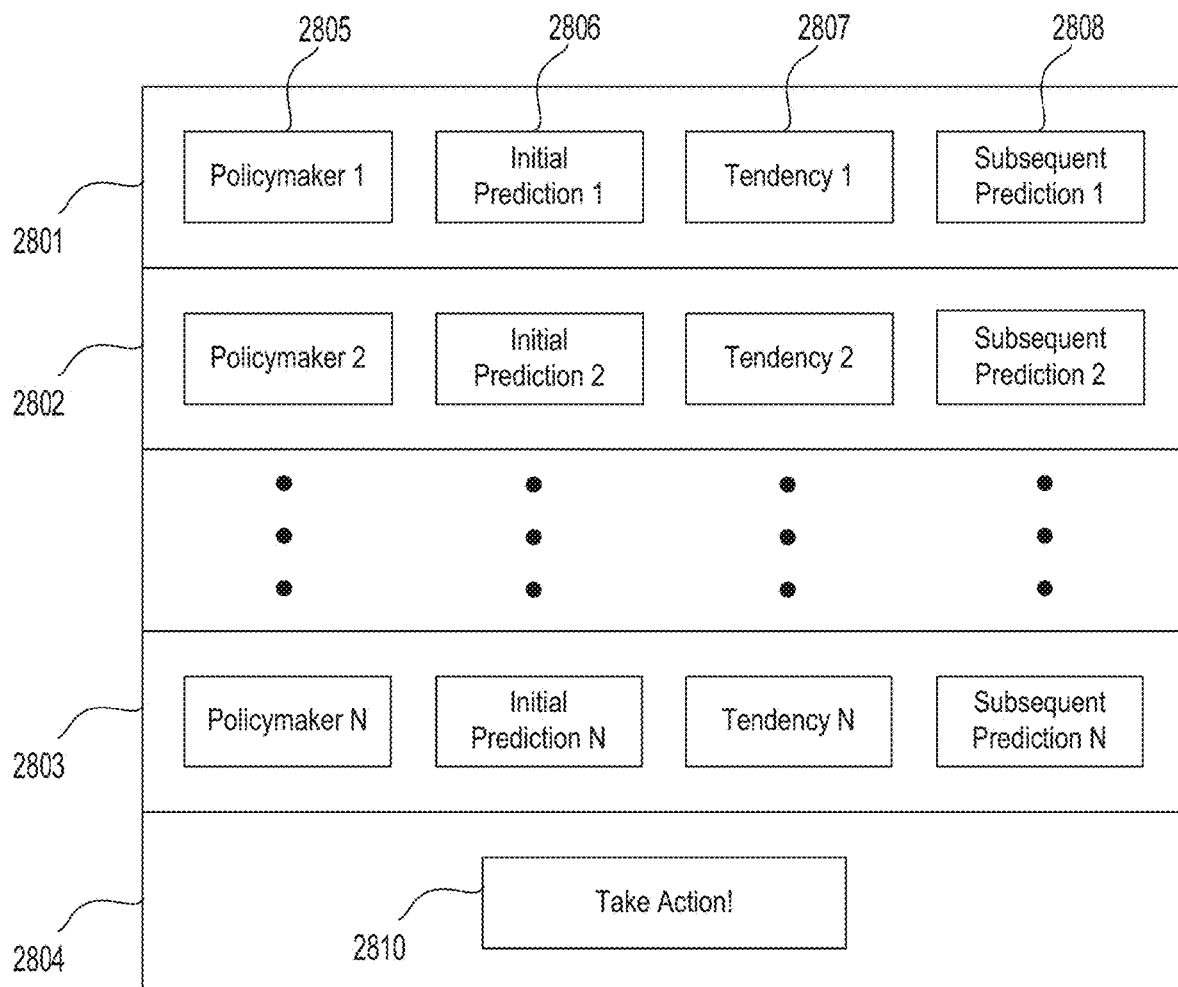
FIG. 28 illustrates an example of a policymaking outcome prediction display.

FIG. 28 illustrates an embodiment of a policymaking outcome prediction display 2800. As illustrated, display 2800 may be configured to illustrate to a system user the initial and subsequent predictions with respect to a given event. For example, in the illustrated embodiment, display 2800 includes a first panel 2801, a second panel 2802, and an $N^{th}$ panel 2803, each corresponding to a policymaker of a plurality of policymakers slated to decide on a policy. Each panel 2801-2803 may include an initial prediction and a subsequent prediction. For example, panel 2801 includes a display of a policymaker block 2805 configured to display an indication as to which policymaker the predictions are associated with. Policymaker block 2805 may be a graphical display of a policymaker's name, picture, represented district, etc.

An initial prediction block 2806 may include a graphical indication of an initial prediction for the first policymaker. For example, initial prediction block 2806 may indicate that the first policymaker is likely to decide in the affirmative for a given policy. A tendency block 2807 may indicate a confidence level for the initial prediction in block 2806. For example, tendency block 2807 may indicate that the first policymaker is 75% likely to decide in the affirmative. Further, a subsequent prediction block 2808 may be configured to indicate an updated prediction associated with the user taking a particular action (e.g., engaging in a direct mailing campaign targeting the first policymaker).

The illustrated display 2800 also includes a recommendation panel 2804 including a recommendation block 2810 configured to display a recommendation to the user. For example, recommendation block 2810 may advise the user to engage in a direct mailing campaign targeted at the policymaker, call the policymaker's office, form a protest outside the policymaker's office, etc. Recommendation panel 2804 may display the system recommendation in any suitable manner. For example, it may display words that can be read by the user, graphics illustrating the recommended action, a button to click that enables an audio recording of the recommendation to play, etc. Indeed, recommendation panel 2804 may display the recommendation in any suitable manner.

The illustrated display 2800 also includes a recommendation panel 2804 including a recommendation block 2810 configured to display a recommendation to the user. For example, recommendation block 2810 may advise the user to engage in a direct mailing campaign targeted at the policymaker, call the policymaker's office, form a protest outside the legislator's office, etc. Recommendation panel 2804 may display the system recommendation in any suitable manner. For example, it may display words that can be read by the user, graphics illustrating the recommended action, a button to click that enables an audio recording of the recommendation to play, etc. Indeed, recommendation panel 2804 may display the recommendation in any suitable manner.

Figure 29:
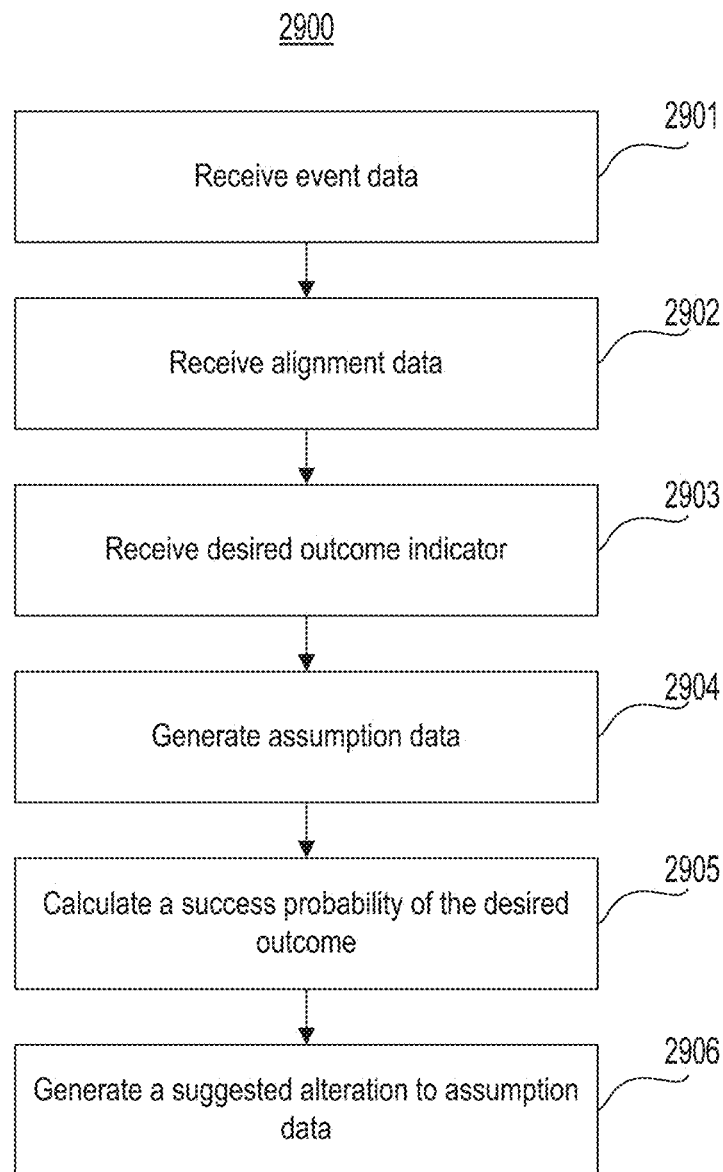
FIG. 29 is a flow chart illustrating an example of a method for providing a predicted outcome based on aggregated data.

FIG. 29 illustrates a method 2900 for generating a suggested alteration to the assumption data to impact the success probability of an event in accordance with a disclosed embodiment. Method 2900 may, for example, be executed by one or more processors of a server (e.g., central server 105 of FIG. 1) or any other appropriate hardware and/or software. Further, when executing method 2900, the one or more processors may execute instructions stored in any one of the modules discussed above.

In accordance with method 2900, the server may receive event data at block 2901. Block 2901 may be facilitated by software instructions of information identification module 2701. Information identification module 2701 may be configured to access scraped data from database 2705 via database access module 2704. For example, information identification module 2701 may access the database 2705 to identify information indicating that a particular policy is pending.

At block 2902, the server may receive alignment data including support or opposition data of at least one individual relating to the outcome of an event. For example, the alignment data may indicate that at least one legislator supports or opposes pending legislation. The server may further receive or compute a desired outcome indicator corresponding to the event at block 2903. The desired outcome indicator may be received from a system user via an interactive interface of a browser in some embodiments. For example, the desired outcome indicator may be the system user's desire for the pending bill to pass or not pass.

At block 2904, the server may be configured to generate assumption data. The assumption data may be generated based on the scraped proprietary data in some embodiments. For example, the assumption data may include information indicating the likelihood that each of the plurality of policymakers slated to decide on the pending policy will support or oppose the policy. Further, outcome prediction module 2702 may be configured to calculate a success probability of the desired outcome at block 2905. For example, the success probability may be the probability that the pending policy will pass or be adopted.

At block 2906, the server may be configured to generate a suggested alteration to the assumption data that would further the system user's desired outcome with respect to the event. For example, the suggested alteration may include a suggestion to target a given policymaker with direct mailings, phone calls, emails, etc.

Figure 30:
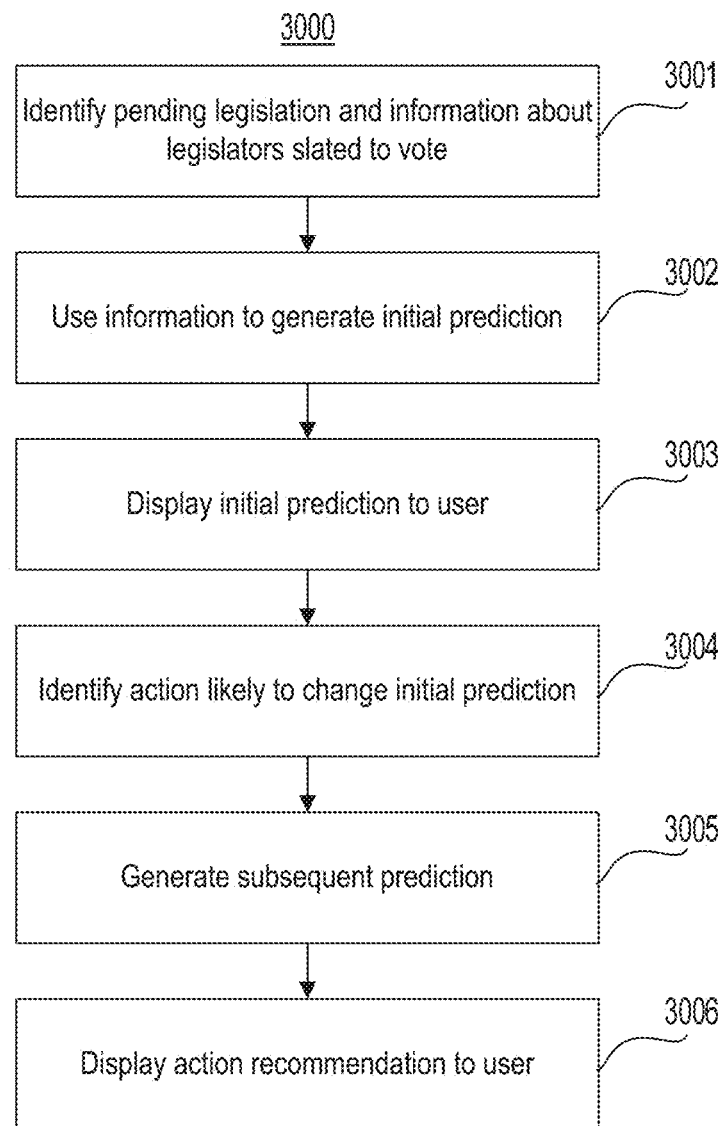
FIG. 30 is a flow chart illustrating an example of a method for predicting and prescribing actions for impacting policymaking outcomes.

FIG. 30 illustrates a method 3000 for generating an action recommendation to a user in accordance with a disclosed embodiment. Method 3000 may be carried out, for example, by one or more processors included in a server (e.g., central server 105, discussed above) or any other appropriate hardware and/or software. Further, when executing method 3000, the one or more processors may execute instructions stored in any one of the modules discussed above.

In accordance with method 3000, the server may identify pending policy and information about policymakers slated to decide on the policy at block 3001. For example, information identification module 2701 may access database 2705 to retrieve information scraped from the Internet about a plurality of policymakers slated to decide on a given policy. In some embodiments, the information about policymakers slated to decide on the policy may include, for one or more of the policymakers, party affiliation, past voting history on similar or opposing policies, written or auditory public comments (e.g., speeches, opinion pieces in newsletters, etc.), features of the represented legislative district (e.g., which industries supply jobs in the policymaker's district), or any other available information about characteristics, prior actions or tendencies, or proclivities of the policymaker.

At block 3002, the identified information about the policymakers may be used to generate an initial prediction relating to an outcome of the pending policy. For example, the initial prediction may include a initial prediction for each policymaker, which indicates whether the policymaker is likely to decide in the affirmative or negative for the pending policy. The initial prediction may further include a measure of the propensity of each of the plurality of policymakers to decide in accordance with the initial prediction. For example, the measure of the propensity may be a confidence level assigned to each initial prediction.

At block 3003, the server may display the initial prediction to the user, for example, as shown on display 2800. At block 3004, the server may then identify an action likely to change the initial prediction. For example, if a policymaker has been swayed by letters from his/her constituents in the past, this action may be sufficient to change the policymaker from a negative prediction to a positive prediction for the pending policy.

At block 3005, the server is configured to generate a subsequent prediction. For example, outcome alteration module 2703 may be configured to indicate an updated prediction associated with the user taking a particular action (e.g., engaging in a direct mailing campaign targeting the first policymaker). The server may then display an action recommendation to the user at block 3006. For example, outcome alteration module 2703 may recommend that the user engage in an action (e.g., targeted mailing to a policymaker) consistent with the user's desired outcome for the pending policy.

Correlating Comments and Sentiment to Policy Document Sub-Sections

In some embodiments, the policymaking being analyzed may consist of multi-sectioned documents. For example, regulatory documents associated with a rule (or regulation) proposed in the rule-making process have multiple sections. These policies may be associated with a variety of potential outcomes. For example, the set of potential outcomes may include the likelihood of rule promulgation (i.e., the likelihood that the rule will be adopted), information related to the timeline of a rule-making process (i.e., the estimated amount of time until the rule is voted on, adopted, or denied), arguments made for or against the rule, likelihood of regulatory enforcement, the form in which the regulatory document will be finalized (i.e., what language may be included in the rule), the impact of the rule (including favorability and significance), and the factors helping or hurting the likelihood of any aforementioned potential outcome. The factors helping or hurting the likelihood may include, for example, policymakers or events.

Multi-sectioned documents may have different predicted outcomes for each section. For example, a bill is a multi-sectioned document, where a first section of a bill may be enacted, while a second section may be removed prior to enactment. The outcome of the policymaking, and the outcome of each section of the multi-sectioned policy document can be influenced by comments.

In some embodiments, comments may include those that are considered officially submitted comments, while other comments may not be officially submitted. For example, officially submitted comments may include statements of position, arguments, transcripts, scientific studies, meeting notes, financial analyses, and the like, which are sent to the policymakers directly. By contrast, a comment may also include documents not officially submitted to the policymakers, such as public statements from individuals, organizations, companies, social media, and news. As used throughout the present disclosure, a "comment" may refer to any of the above described comments (both officially submitted and not). For example, the potential outcomes of a rule may be greatly influenced by reactions and feedback throughout the rule-making process. One of the primary forms of feedback is through the notice and comment process. Individuals and organizations, including private and public companies, government bodies, and foreign entities may submit their positions regarding the proposed rule. Regulatory agencies then review and respond to these comments made during the process prior to issuing a final rule (or obtaining additional feedback). Analysis of the submitted comments (which can often be extensive and, for example, exceed over a million comments per rule) may increase an understanding as to what the outcome of the final rule will be.

Figure 31:
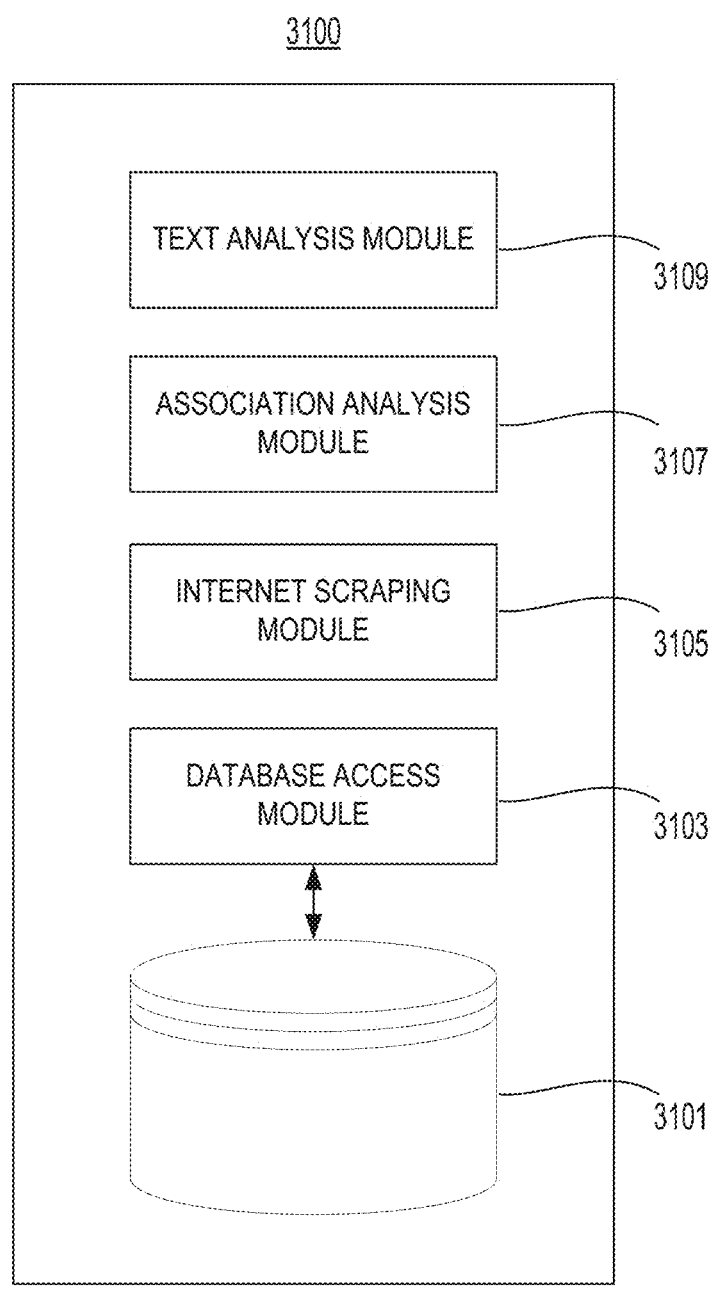
FIG. 31 illustrates an example of a memory associated with a text analytics system.

FIG. 31 is a memory 3100 consistent with the embodiments disclosed herein. In some embodiments, memory 3100 may be included in, for example, central server 105, discussed above. Further, in other embodiments, the components of memory 3100 may be distributed over more than one location (e.g., stored in a plurality of servers in communication with, for example, network 101).

Memory 3100 may include a database 3101, which may store information about multi-sectioned documents and comments. Memory 3100 may also include database access module 3103, which may be used to access information stored in database 3101 about a multi-sectioned document or comment. In some embodiments, the multi-sectioned documents stored in database 3101 may include one or more proposed policies. In some embodiments, the multi-sectioned documents stored in database 3101 may include one or more proposed bills. In some embodiments, the comments stored in database 3101 may be public comments on the one or more proposed policies. The information stored in database 3101 may be gathered through a variety of sources, for example, one or more of sources 103a-103c, as shown in FIG. 1 via, for example, network 101 (e.g., the internet).

Internet scraping module 3105 may gather information from open internet resources, such as legislative websites, regulatory websites, news websites, financial websites, and social media websites, or other data repositories provided by the user, such as proprietary data repositories, contained in repositories, including those not hosted on the internet (e.g., repositories available on internal networks, user accessed networks, and the like), which may be stored in database 3101, as described above. In general, internet scraping module 3105 may gather information about multi-sectioned documents and comments, which is stored in database 3101.

In some embodiments, the comments stored in database 3101 may be associated with certain sections of a multi-sectioned document using association analysis module 3107. For example, sections of the multi-sectioned document may be explicitly indicated in the comment (through citation, linking, and the like), or they may be implicit. Implicit mentions of the multi-sectioned document sections in the comment may be mapped from the comment to the multi-sectioned document through a mapping mechanism of association analysis module 3107.

In some embodiments, one such mapping mechanism may be in the form of a model used by association analysis module 3107. A model may represent each subsection of a comment as a feature vector, each subsection of a multi-sectioned document as a feature vector, and compute the similarity between feature vectors to map subsections of the comment to subsections of the multi-sectioned document. Many methods of computing similarity of vectors are available, including cosine similarity, kernel functions, or Euclidean distance. For example, nearest-neighbor search may be used for detection of a similar section between the comment and multi-sectioned document. Furthermore, a clustering model may be used, which automatically groups similar vectors together (either in a flat or hierarchical fashion to a specified depth).

In some embodiments, a text analysis module 3109 may determine the sentiment of a comment stored in database 3101. The sentiment may include a stance, position, or an argument, or general disposition toward the multi-sectioned policy document, or the like, with varying degrees of stance, position, of disposition. In some embodiments, the sentiment of a comment may express support for one section and opposition towards a different section of the multi-sectioned document (or may express neither support nor opposition). In other embodiments, the sentiment of a comment may be either positive, negative, or neither. In some embodiments, there can be more than one sentiment associated with each comment. In yet further embodiments, the text analysis module 3109 may also determine the levels of influence of each comment (e.g., based on the author of the comment), and weigh each comment based on an influence level. For example, different commenters may be given a higher or lower influence level, which may then be applied to that author's comment. As a further example, a comment authored by Morgan Stanley may be deemed to have a higher influence on a proposed SEC rule than a comment from a local grocer. In some embodiments, a text analytics filter may be applied to the text data.

Figure 32:
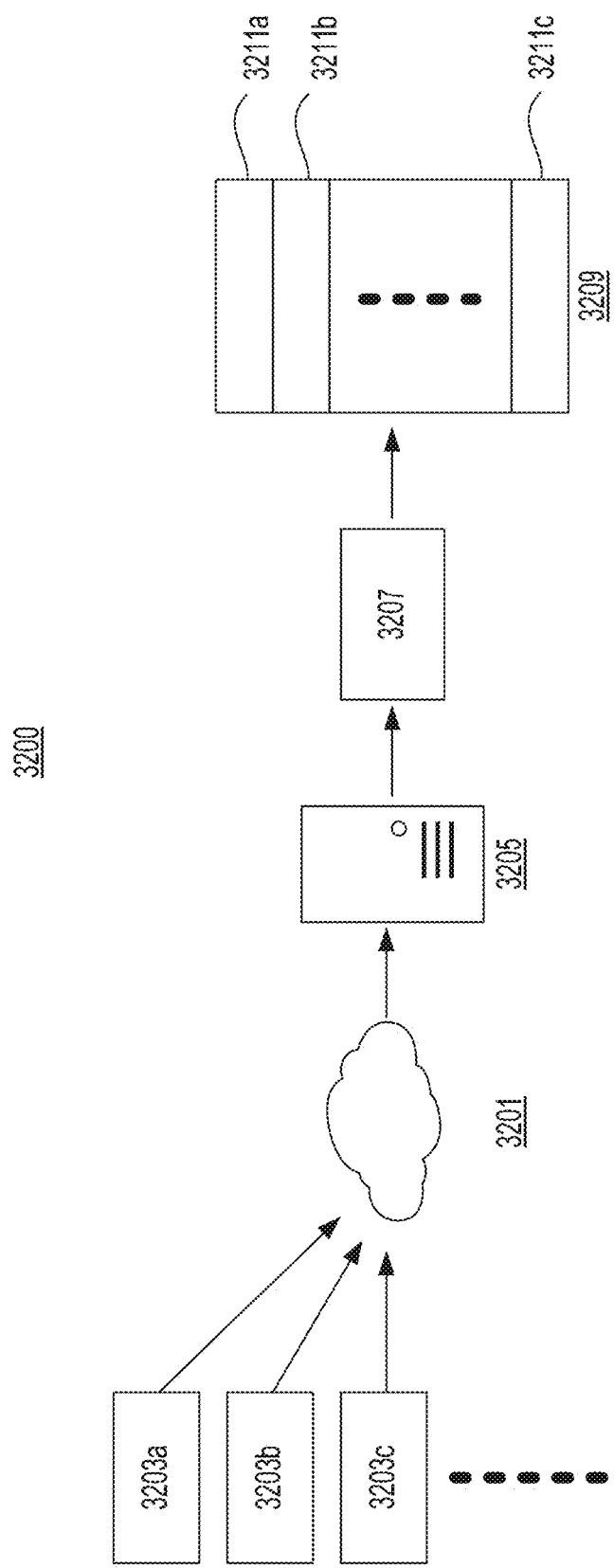
FIG. 32 illustrates an example of text analytics consistent with one or more disclosed embodiments of the present disclosure.

FIG. 32 is a depiction of an exemplary auto-correlation system consistent with one or more disclosed embodiments of the present disclosure. As depicted in FIG. 32, system 3200 may comprise a network 3201, a plurality of comments, e.g., comments 3203a, 3203b, and 3203c, a central server 3205, modules 3207, and at least one multi-sectioned document 3209 containing a plurality of sections, e.g., sections 3211a, 3211b, and 3211c. One skilled in the art may vary the structure and/or components of system 3200. For example, system 3200 may include additional servers—for example, central server 3205 may comprise multiple servers and/or one or more sources may be stored on a server. By way of further example, one or more comments may be distributed over a plurality or servers, and/or one or more comments may be stored on the same server.

Network 3201 may be any type of network that provides communication(s) and/or facilitates the exchange of information between two or more nodes/terminals and may correspond to network 101, discussed above. For example, network 3201 may comprise the Internet, a Local Area Network (LAN), or other suitable telecommunications network, as discussed above in connection with FIG. 1. In some embodiments, one or more nodes of system 3200 may communication with one or more additional nodes via a dedicated communications medium.

Central server 3205 may comprise a single server or a plurality of servers. In some embodiments, the plurality of servers may be connected to form one or more server racks, e.g., as depicted in FIG. 2. In some embodiments, central server 3205 may store instructions to perform one or more operations of the disclosed embodiments in one or more memory devices. In some embodiments, central server 3205 may further comprise one or more processors (e.g., CPUs, GPUs) for performing stored instructions.

In some embodiments, comments 3203a, 3203b, and 3203c may be gathered using internet scraping module 3105. For example, comments 3203a, 3203b, and 3203c may be gathered from open internet resources, such as legislative websites, regulatory websites, news websites, financial websites, and social media websites, or other data repositories provided by the user, such as proprietary data repositories, including those not hosted on the internet (e.g., repositories available on internal networks, user accessed networks, and the like). In some embodiments, central server 3205 may receive information about one or more comments, e.g., comments 3203a, 3203b, and 3203c over network 3201.

In some embodiments, additional analysis may be performed on the comments by the central server 3205 using modules 3207 (e.g., the modules 3207 may be the previously described association analysis module 3107 and/or text analysis module 3109). As a result of this analysis, a multi-sectioned document 3209 may be analyzed by the system. For example, central server 3205 may use text analysis module 3109 to determine the influence level of the comment, and apply a corresponding weight to each comment 3203a, 3203b, and 3203c.

In some embodiments, the processor located in central server 3205 may be configured to predict, based on the weighted comments, a predicted outcome for the entire multi-sectioned document or a section of it. For example, the predicted outcome may be whether a section of the multi-sectioned document will be revised prior to adoption. For example, a section of the multi-sectioned document 3209 that has many weighted comments associated with it may provide the system with information for predicting that the section may be revised prior to adoption. In other embodiments, the processor located in central server 3205 may be configured to predict, based on the weighted comments, which sections of the multi-section document 3209 may change. In yet other embodiments, the processor located in central server 3205 may be configured to predict, based on the weighted comments, how likely an agency will change at least one section of the multi-sectioned document 3209.

In some embodiments, the processor located in central server 3205 may be configured to determine that, based on the weighted comments, one or more changes will be made to at least one section of the multi-sectioned document 3209. In other embodiments, the processor located in central server 3205 may be configured to recommend, based on the weighted comments, changes in language to a section of the multi-section document 3209 in order to increase a likelihood of adoption.

In some exemplary embodiments, the sections 3211*a*, 3211*b*, and 3211*c* of the multi-sectioned document 3209 may include officially delineated parts of the document, syntactically defined units of text (e.g., a sentence, paragraph, page, or multiple pages), subjectively defined units of text (e.g., a chapter), where the subjectively defined units of text may share a property (e.g., relating to the same subject area or performing the same action).

For example, within multi-sectioned document 3209, section 3211*a* may be in the introduction part of the document, section 3211*b* may be the argument part of the document, and section 3211*c* may be the conclusion of the document. In other embodiments, within multi-sectioned document 3209, sections 3211*a*, 3211*b*, and 3211*c* may each be a single page or multiple pages.

Figure 33:
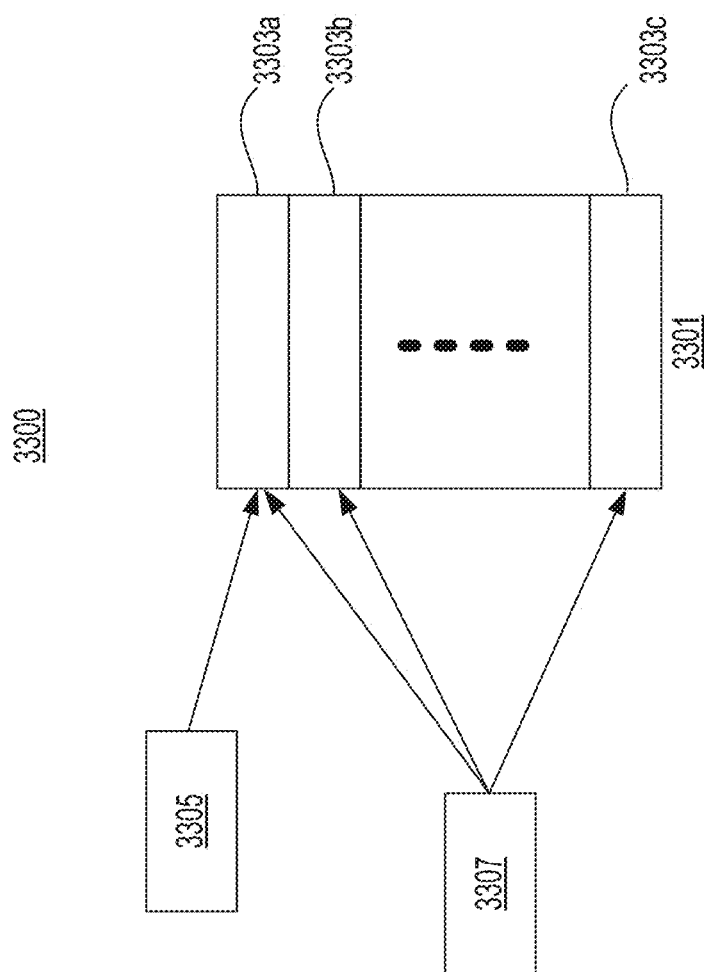
FIG. 33 illustrates an example of a multi-sectioned document with correlated comments.

FIG. 33 is an example of a multi-sectioned document with correlated comments. For example, FIG. 33 may represent a visualization 3300, which may be displayed to a user on a user interface of a device (e.g., a display screen, a laptop, a handheld device such as a smartphone, or tablet, or a smartwatch). In some embodiments, the visualization 3300 may include a graphical depiction of sentiment relative to the one or more sections of the multi-sectioned document 3301. As shown in FIG. 33, a multi-sectioned document 3301 may have a plurality of sections, e.g., sections 3303*a*, 3303*b*, and 3303*c*. The visualization 3300 may also include a first comment 3305, and a second comment 3307. As shown in FIG. 33, the first comment 3305 may be auto-correlated to only one section 3303*a* of the multi-sectioned document 3301 using association analysis module 3107 and/or text analysis module 3109 as described above. Second comment 3307 may be associated with additional sections of multi-sectioned document 3301, i.e., sections 3303*a*, 3303*b*, and 3303*c*. In some embodiments, the visualization 3300 may include extracted text from the multi-sectioned document 3301 juxtaposed with textual representations of sentiment found in a comment 3305 or 3307. As described above, the sentiment of a comment 3305 or 3307 may express support for one section (i.e., 3303*a*, 3303*b*, and 3303*c*) and opposition towards a different section of the multi-sectioned document 3301.

FIG. 34 is a depiction of an exemplary multi-sectioned document with correlated comments. For example, visualization 3400 may include a multi-sectioned document 3401, which may be displayed to a user on a user interface of a device (e.g., a display screen, a laptop, a handheld device such as a smartphone, or tablet, or a smartwatch). In some embodiments, the visualization 3300 may include a graphical depiction of sentiment relative to the one or more sections of the multi-sectioned document 3401. For example, a set of comments 3403 may be associated with a highlighted portion of multi-sectioned document 3401. In some embodiments, the system user may interact with a highlighted portion of multi-sectioned document 3401 to display additional information about a set of comments 3403, including the published date, organization, submitter, sentiment analysis, and attachments associated with the comments. In yet further embodiments, heatmap 3405 may highlight each section of multi-sectioned document 3401 in which positive, negative, supporting, opposing, or neutral language appears. The heatmap 3405 may display various colors associated with a section of multi-sectioned document 3401 to indicate the various language being used.

Figure 35:
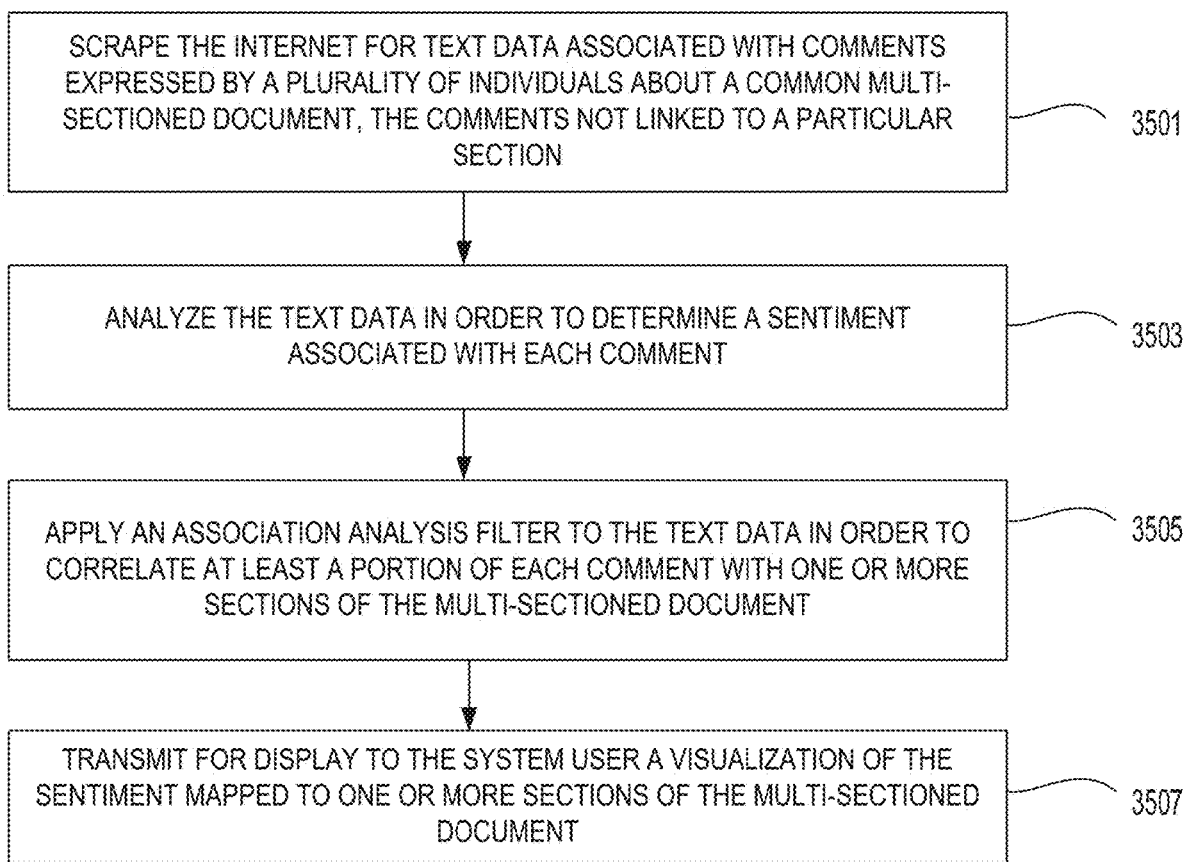
FIG. 35 illustrates a flow chart of an example of a method for ascertaining sentiment about a multi-sectioned document associating the sentiment with particular sections.

FIG. 35 is an example of an auto-correlation method 3500, consistent with the disclosed embodiments. Method 3500 may, for example, be executed by one or more processors of a server (e.g., central server 105 of FIG. 1) or any other appropriate hardware and/or software. Further, when executing method 3500, the one or more processors may execute instructions stored in any one of the modules discussed above.

In step 3501, the server may scrape the internet for text data associated with comments expressed by a plurality of individuals about a common multi-sectioned document, the comments not being linked to a particular section of the multi-sectioned document. For example, comments may be gathered from open internet resources, such as legislative websites, regulatory websites, news websites, financial websites, and social media websites, or other data repositories, such as proprietary data repositories, including those not hosted on the internet (e.g., repositories available on internal networks, user accessed networks, and the like).

In step 3503, the server may analyze the text data in order to determine a sentiment associated with each comment. The sentiment may include a stance, position, or an argument, or the like, as described above. In some embodiments, the sentiment of a comment may express support for one section and opposition towards a different section of the multi-sectioned document (or may express neither support nor opposition). In other embodiments, the sentiment of a comment may be either positive, negative, or neither. In yet further embodiments, the text analysis module 3109 may also determine the levels of influence of each comment (e.g., based on the author of the comment), and weigh each comment based on an influence level. For example, different commenters may be given a higher or lower influence level, which may then be applied to that author's comment.

In step 3505, the server may apply an association analysis filter to the text data in order to correlate at least a portion of each comment with one or more sections of the multi-sectioned document. For example, sections of the multi-sectioned document may be explicitly indicated in the comment (through citation, linking, and the like), or they may be implicit. Implicit mentions of the multi-sectioned document sections in the comment may be mapped from the comment to the multi-sectioned document through a mapping mechanism of association analysis module 3107.

In step 3507, the server may transmit for display to a system user a visualization of the sentiment mapped to one or more sections of the multi-sectioned document, as shown in FIGS. 33 and 34.

While the disclosure above has focused on primarily on predicting the outcomes for comments made in relation to a regulation, and associating comments and stances to rules, and subsections of rules, these analyses may also be performed in other policymaking areas, such as legislation. For example, comments made in support or opposition of a piece of legislation may be associated with specific sections of the legislation, the stance and arguments of those comments may be computed, and a resulting prediction made to the likelihood of a section of the legislation changing or being enacted.

Predicting Policy Adoption

Once a policy (e.g., a rule) is promulgated, a set of potential outcomes may include the likelihood of policy promulgation (e.g., the likelihood that the rule will be adopted), information related to the timeline of the policy-making process (e.g., the estimated amount of time until a rule is voted on, adopted, or denied), arguments made for or against the policy, likelihood of enforcement (e.g., regulatory enforcement), the form in which the document will be finalized (e.g., what language may be included in the rule), the impact of the policy (including favorability and significance), and the factors helping or hurting the likelihood of any aforementioned potential outcome, where these factors helping or hurting the likelihood may include people or events. In some embodiments, the same may be determined regarding a legislative bill.

As previously discussed, in some embodiments, analysis of comments, which may often number in the millions of comments per rule, may be useful for understanding what the outcome of the final rule may be.

In some embodiments, this set of potential outcomes may be predicted using a model to generate a predicted outcome. Thus, in some embodiments, predicted outcomes of a policy may be generated by analyzing the comments associated with a policy. In other embodiments, the predicted outcomes of a bill may be generated by analyzing the comments associated with a bill. Furthermore, the arguments from the comments may be aggregated to predict how the policy may change. For example, if one or more comments on a given policy suggest the policy lacks clarity, is based on bad science, or is an overreach, or the like, a predicted outcome for that policy may be that it will include modified language (e.g., additional clarifying language, additional scientific reporting, additional justifications for authority), or removal of language.

In some embodiments, various data may be used within the model constructed for predicting if a policy will take effect, when a policy will take effect, what language will be modified and retained in the final version, how likely it is to be challenged, or how likely is it to be enforced. For example, the data used may be any combination of the following: the previous timelines of policies promulgated by the authoring agency, the number of currently considered policies, the text of the policy itself, the statute or act the policy is drawing its authority from, the number of comments, the arguments determined from comments, the authoring organizations of comments, similar policies from other agencies, other unrelated data as discussed above, and the like.

The comments may be associated with portions (e.g., sections) of the policy, allowing analysis to be applied to each subsection of the document. For instance, if one or more comments against the policy and arguing for clarity may be associated with a particular section of the policy, a predicted outcome for the policy may be that the associated section will be clarified. In another embodiment, the predicted outcome of a policy may be how likely a particular section of a policy is to be challenged, or how likely a policy and/or sections of a policy are to be enforced.

In some embodiments, the server may determine the predicted outcomes of a policy and their associated likelihood based on model generated from the scraped data. The scraped data used to create this model may rely on the comments themselves, related documents, and analysis thereof, including the content (e.g., some or all of the text data, terms, and other derived linguistic analysis consistent with the disclosure above) or metadata (e.g., dates of activity, author of comment, authors organization, and the like). For example, the server may apply one or more models with some or all of the scraped data as one or more inputs. Instead of using raw scraped data, the server may extract one or more features from the data, as discussed above, to use as inputs for the model.

In some embodiments, this automated model and analysis may be carried out in various ways. As described above, a document or policy may be represented as a feature vector, and a function may be created which produces an association between the feature vector and the outcome. This function may be used to compute a score, which may be a likelihood score, or a probability, reflecting how likely a given document or policy is to result in certain predicted outcomes. For a comment, this score relays the likelihood of predicted outcomes (e.g., who and where the comment is from, does the author of the comment support the policy, the gravitas of the commenter, what arguments are being made, and the like).

In some embodiments, the comment may be represented by the identity of the author. Specifically, the feature vector representing the comment may only include the identity of the comment's author, without any further analysis of the document. In some embodiments, the scoring mechanism of the function to compute a likelihood score for a given comment document supporting the policy may then be based on a count of how many comments this author has submitted in the past that have been opposed to policies, or may be further divided by regulation on this topic, or from an agency.

The comment may also be represented by a feature vector comprised of some or all of the text, including terms and other derived linguistic analysis and metadata (e.g., dates of activity, the individual or organizational author, whether the comment is a commonly-used template or unique, and the like) associated with the comment document. Linguistic analysis used may include sentiment dictionaries, parsers for detecting various syntactic patterns, and other knowledge bases. In some embodiments, the features derived from analysis of the document may be combined with features derived from analysis of the author, forming a larger feature vector. In some embodiments, the analysis methods described herein used to generate the feature vector may use machine learning techniques.

Author related characteristics may include whether the author is an individual or an organization, where organization may be further divided into public, private, large, small, or a number of other designations. Authors may have further associated features, such as geography, previous activity, such as submitted comments, relationships to regulators, financial contributions, campaign financials, previous regulations supported, collaboration with other organizations or policymakers, public statements, news, and external information based on online social presence.

Figure 36:
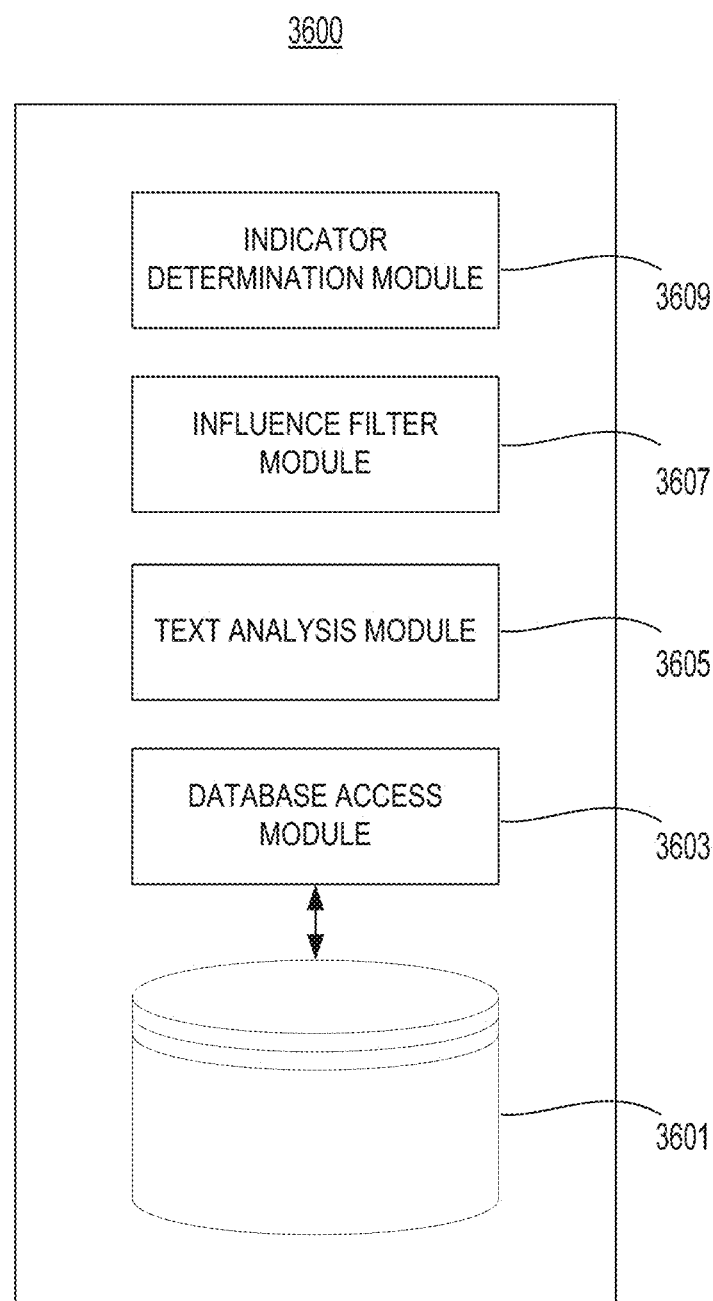
FIG. 36 illustrates an example of a memory associated with a text analytics system.

FIG. 36 is a memory 3600 consistent with the embodiments disclosed herein. In some embodiments, memory 3600 may be included in, for example, central server 105, discussed above. Further, in other embodiments, the components of memory 3600 may be distributed over more than one location (e.g., stored in a plurality of servers in communication with, for example, network 101).

Memory 3600 may include a database 3601, which may store information about the proposed policy and comments. Memory 3600 may also include database access module 3603, which may be used to access information stored in database 3601 about a proposed policy or comment. In some embodiments, the comments stored in database 3601 may be public comments on the one or more proposed policies. The information stored in database 3601 may be gathered through a variety of sources, for example, one or more of sources 103a-103c, as shown in FIG. 1 via, for example, network 101 (e.g., the internet).

In some embodiments, a text analysis module 3605 may determine the sentiment of a comment stored in database 3601. The sentiment may include a stance, position, argument, or the like, as described above. In some embodiments, the sentiment of a comment may express support for one or more sections and opposition towards a different section of the policy (or may express neither support nor opposition). In other embodiments, the sentiment of a comment may be either positive, negative, or neither. A potential outcome of text analytics filter module 3605 may be the stance that the comments author is taking regarding the proposed policy.

In some embodiments, the text analysis module 3605 may be applied to the text data in order to determine a sentiment, including matching at least one piece of text data from the comment to at least one other piece of text data stored in a database. For example, text analysis module 3605 may associate each comment with a predicted stance (e.g., where a stance may be supporting, opposing, or neutral), and the average stance may be taken as the predicted outcome of the policy, where if the average stance is negative, the predicted outcome is for the policy to not be adopted in the current form, and if the current stance is positive, the predicted outcome is for the policy to be adopted. The function to compute stance can be represented by a model derived from machine-learned algorithms or other computer-implemented policies, the model comprised of policies, weights, and the like, in accordance with other models described in the present disclosure.

In some embodiments, the comments stored in database 3601 may have their influence determined using influence filter module 3607. For example, influence filter module 3607 may also determine the levels of influence of each comment (e.g., based on the author of the comment), and weigh each comment based on an influence level. For example, different commenters may be given a higher or lower influence level, which may then be applied to that author's comment.

In some embodiments, the influence filter module 3607 may access a database of terms associated with a heightened degree of influence. For example, these terms associated with a heightened degree of influence may include zip codes, organizations names, or addresses. In some embodiments, the system may automatically assign a heightened degree of influence to specific terms, or alternatively, a user may input terms with which to assign a heightened degree of influence.

In some embodiments, an indicator determination module 3609 may generate an indicator associated with a proposed policy. In some embodiments, the indicator determined by indicator determination module 3609 is a likelihood measure reflecting a probability that the regulation will be adopted.

Figure 37:
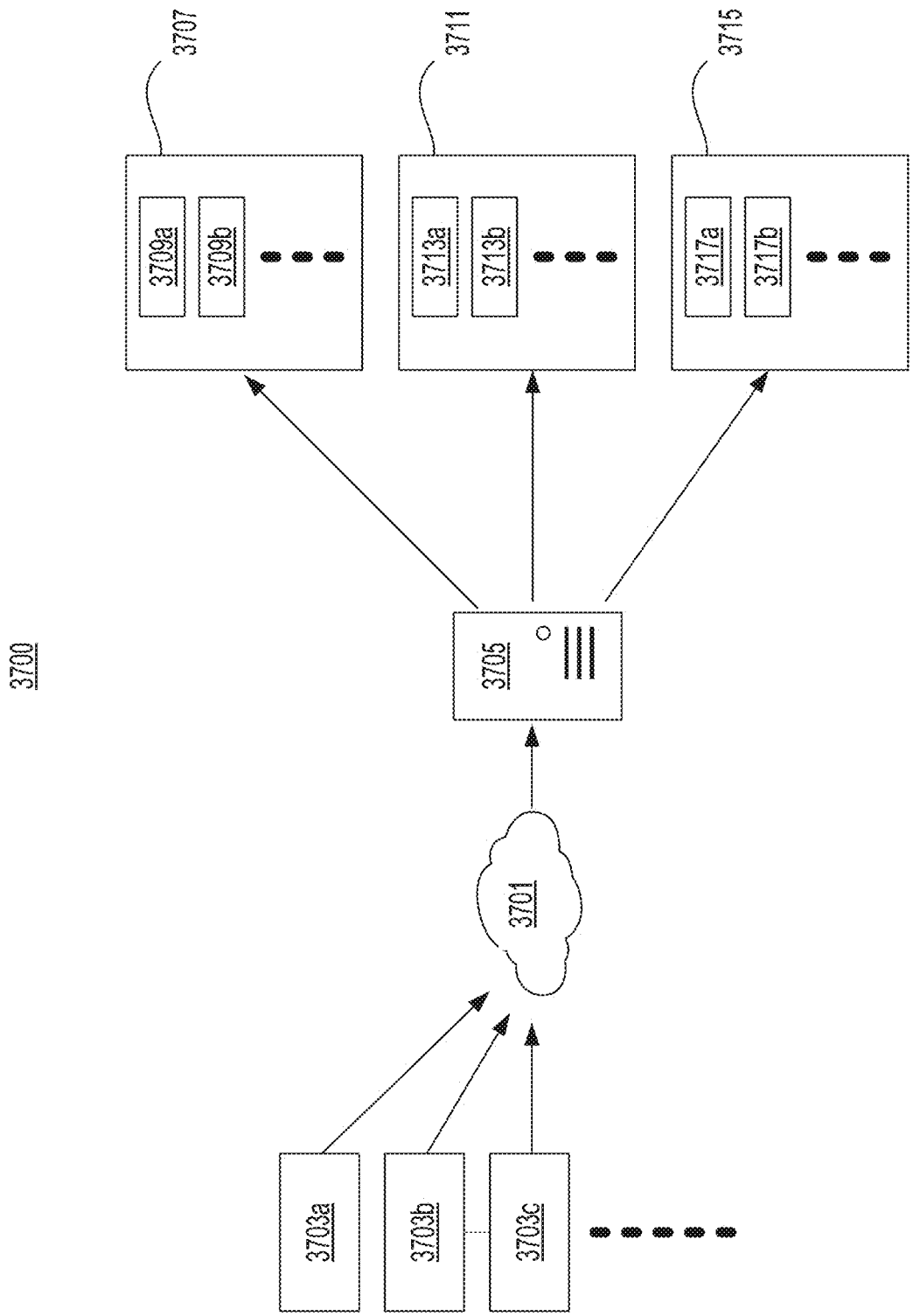
FIG. 37 illustrates an example of a text analytics system consistent with one or more disclosed embodiments of the present disclosure.

FIG. 37 is an example of a text analytics system consistent with one or more disclosed embodiments of the present disclosure. As depicted in FIG. 37, system 3700 may comprise a network 3701, a plurality of comments, e.g., comments 3703a, 3703b, and 3703c, a central server 3705, comments weighted with high influence 3707, comments weighted with average influence 3711, and comments weighted with low influence 3715. One skilled in the art may vary the structure and/or components of system 3700. For example, system 3700 may include additional servers—for example, central server 3705 may comprise multiple servers and/or one or more sources may be stored on a server. By way of further example, one or more comments may be distributed over a plurality or servers, and/or one or more comments may be stored on the same server.

Network 3701 may be any type of network that provides communication(s) and/or facilitates the exchange of information between two or more nodes/terminals and may correspond to network 101, discussed above. For example, network 3701 may comprise the Internet, a Local Area Network (LAN), or other suitable telecommunications network, as discussed above in connection with FIG. 1. In some embodiments, one or more nodes of system 3700 may communication with one or more additional nodes via a dedicated communications medium.

Central server 3705 may comprise a single server or a plurality of servers. In some embodiments, the plurality of servers may be connected to form one or more server racks, e.g., as depicted in FIG. 2. In some embodiments, central server 3705 may store instructions to perform one or more operations of the disclosed embodiments in one or more memory devices. In some embodiments, central server 3705 may further comprise one or more processors (e.g., CPUs, GPUs) for performing stored instructions.

In some embodiments, the processor located in server 3705 may be configured to apply an association analysis filter to the text data in order to correlate at least a portion of each comment with a particular section of the proposed regulation 3709.

In some embodiments, comments 3703a, 3703b, and 3703c may be stored in database 3601. In some embodiments, central server 3705 may receive information about one or more comments, e.g., comments 3703a, 3703b, and 3703c, over network 3701. Although discussed in connection with central server 3705, the preceding disclosure is exemplary in nature, and the execution of the method may be distributed across multiple devices (e.g., servers).

In some embodiments, the central server 3705 may weigh the comments 3703a, 3703b, and 3703c, into a plurality of categories. For example, central server 3705 may use text analysis module 3605 and influence filter module 3607 to weigh comments, consistent with the disclosure above. After weighing the comments, central server 3705 may categorize the comments into one or more categories. As shown in FIG. 37, comments may be categorized into comments weighted with high influence 3707 (e.g., comments 3709a, 3709b), comments weighted with average influence 3711 (e.g., comments 3713a, 3713b), and comments weighted with low influence 3715 (e.g., comments 3717a, 3717b). More comment categories can be included by central server 3705 as desired.

Figure 38:
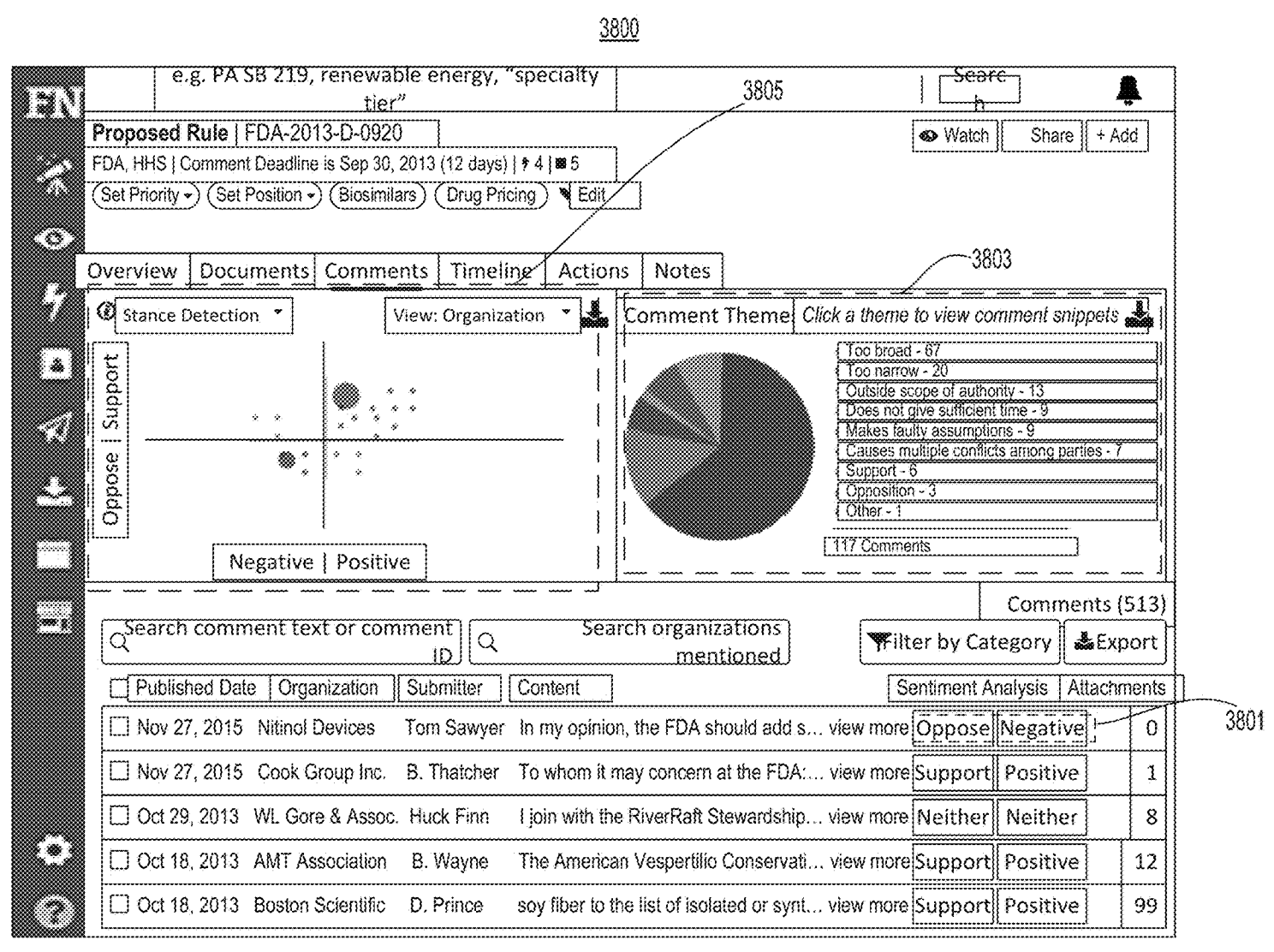

FIG. 38 is a depiction of an example of a prediction with an indicator associated with adoption of the regulation. For example, sentiment indicator 3801 may depict the sentiment associated with a particular comment, comment theme indicator 3803 may depict various arguments associated with the comments, and stance detection indicator 3805 may depict graphically various stances taken within the comments. For example, text analysis module 3605 may be applied to the text data of a comment in order to generate a sentiment indicator 3801 associated with a comment. For example, as shown in FIG. 38, the sentiment indicator 3801 generated by text analysis module 3605 may show that the comment supports or opposes the policy (or neither). Similarly, the sentiment indicator 3801 generated by text analysis module 3605 may show that the comment contains positive or negative language (or neither). The information analyzed by text analysis module 3605 may also be used to generate comment theme indicator 3803 and stance detection indicator 3805.

Figure 39:
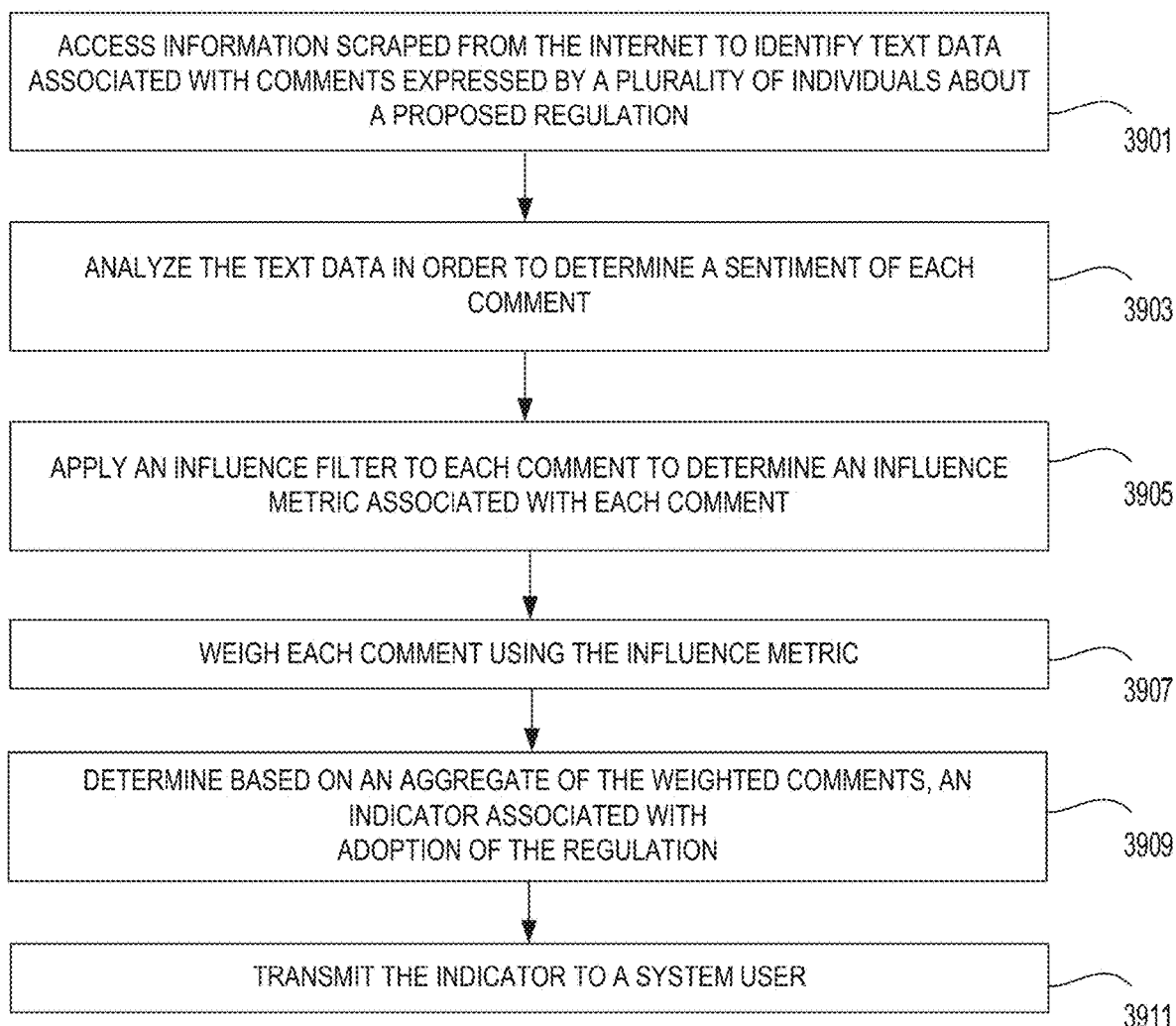
FIG. 39 illustrates s a flow chart of an example of a method for predicting regulation adoption.

FIG. 39 is a flow diagram of an example of a method 3900 for predicting whether a regulation will be adopted. Method 3900 may, for example, be executed by one or more processors of a server (e.g., central server 105 of FIG. 1) or any other appropriate hardware and/or software. Further, when executing method 3900, the one or more processors may execute instructions stored in any one of the modules discussed above.

At step 3901, the server may access information scraped from the internet to identify text data associated with comments expressed by a plurality of individuals about a proposed regulation. For example, the text analytics system may access comments stored in database 3601, containing comments related to a specific proposed regulation.

At step 3903, the server may analyze the text data in order to determine a sentiment of each comment. For example, the server may analyze the text data of a comment in order to determine a sentiment, which may include matching at least one piece of text data from the comment to at least one other piece of text data stored in a database. Furthermore, the text analytics filter may associate each comment with a predicted stance (e.g., where a stance may be supporting, opposing, or neutral), and the average stance may be taken as the predicted outcome of the policy, where if the average stance if negative, the predicted outcome is for the policy to not be adopted in the current form, and if the current stance is positive, the predicted outcome is for the policy to be adopted.

At step 3905, the server may apply an influence filter to each comment to determine an influence metric associated with each comment. As described above, the influence metric may be determined using a variety of factors. For example, dates of activity, the individual or organizational author, whether the comment is a commonly-used template or unique, and the like.

At step 3907, the server may weigh each comment using the influence metric. For example, influence filter module 3607 may also determine the levels of influence of each comment (e.g., based on the author of the comment), and weigh each comment based on an influence level. For example, different commenters may be given a higher or lower influence level, which may then be applied to that author's comment. Other factors that may be considered may include who and where the comment is from, whether the author of the comment supports the policy, the gravitas of the commenter, what arguments are being made, and the like At step 3909, the text analytics system determines, based on an aggregate of the weighted comments, an indicator associated with adoption of the regulation. For example, the indicator determined in this step by indicator determination module 3609 is a likelihood measure reflecting a probability that the regulation will be adopted (e.g., a percentage).

At step 3911, the server may transmit the indicator to a system user. For example, this indicator may be a comparative indicator expressed through text (e.g., whether the policy is "more likely" or "less likely" to be approved when compared to another policy), expressed as a percentage (e.g., "53.5% chance for being promulgated unchanged in this form," "92.5% of Section 3 changing,"), or expressed in a number of votes (e.g., "43 Senators likely to vote yes").

While the disclosure above has focused on primarily on predicting the outcomes for comments made in relation to a regulation, and associating comments and stances to policies, and subsections of policies, these analyses may also be performed in other policy areas, such as legislation. For example, comments made in support or opposition of a piece of legislation may be associated with specific sections of the legislation, the stance and arguments of those comments may be computed, and a resulting prediction made to the likelihood of a section or the entirety of the legislation changing or being enacted.

The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, Ultra HD Blu-ray, or other optical drive media.

Computer programs based on the written description and disclosed methods are within the skill of an experienced developer. The various programs or program modules may be created using any of the techniques known to one skilled in the art or can be designed in connection with existing software. For example, program sections or program modules may be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. The steps of the disclosed methods may be modified in any manner, including by reordering steps and/or inserting or deleting steps. Further, the section headings contained herein are merely for ease of reference and are not limiting. It is intended, therefore, that the specification and examples be considered as illustrative only, with a true scope and spirit being indicated by the following claims and their full scope of equivalents.

What is claimed is:

1. A hybrid prediction system for aggregating electronic data from at least one Internet server and proprietary data, to identify and initially predict an outcome of a future policy-making event decided by a plurality of policymakers and to subsequently update the initial prediction, the system comprising:

at least one processor configured to execute instructions; and a memory storing the instructions to:
  generate and transmit, to a data input terminal, a first interactive interface configured to receive a query;
  receive the query from the data input terminal using the first interactive interface;
  identify, based on the query, at least one future policymaking event;
  access data scraped from the Internet, the data being associated with the at least one future policymaking event;
  store the scraped data;
  determine, from the scraped data, initial predictions of how the plurality of policymakers will decide with respect to the at least one future policymaking event;
  aggregate the predictions to determine an initial prediction of the outcome of the at least one future policymaking event;
  generate, from the scraped data, initial likelihoods associated with the predictions;
  aggregate the likelihoods to determine an initial likelihood indication associated with the initial prediction;
  generate a second interactive interface with the initial prediction and the initial likelihood and configured to receive user input related to the at least one policymaker;
  transmit the initial prediction and the initial likelihood indication to the data input terminal by transmitting the second interactive interface;
  using the second interactive interface, receive user input from the data input terminal including proprietary information, the proprietary information being related to at least one policymaker and privy to the user;
  store the proprietary information;
  in response to receiving the user input, determine, using the scraped data and the proprietary information, at least one subsequent prediction for at least one policymaker and at least one subsequent likelihood associated with the at least one subsequent prediction;
  aggregate the at least one subsequent likelihood to determine a subsequent likelihood indication reflecting a change in the initial likelihood associated with the initial prediction;
  generate a third interactive interface with the subsequent likelihood indication; and
  transmit the subsequent likelihood indication to the data input terminal by transmitting the third interactive interface.

2. The system of claim 1, wherein the user input is received from an individual associated with a first organization, and the at least one processor is further configured to store the proprietary information obtained by the first organization in a manner preventing access by individuals associated with a second unrelated organization.

3. The system of claim 2, wherein the at least one processor is further configured to, after determining the subsequent likelihood indication, enable individuals associated with the second unrelated organization to access the initial prediction and the initial likelihood indication while preventing individuals associated with the second unrelated organization from accessing the subsequent likelihood indication.

4. The system of claim 2, wherein the at least one processor is further configured to:
  receive from at least one data input terminal associated with the second unrelated organization, proprietary information obtained by the second organization;
  determine using the first data and the proprietary information of the second organization, a second organizational update of the initial likelihood indication reflecting a change in the initial likelihood of the initial prediction; and
  prevent the second organizational update from being accessed by individuals associated with the first organization.

5. The system of claim 4, wherein the at least one processor is further configured to receive authorization from the second organization to permit access by the first organization to the second organizational update.

6. The system of claim 1, wherein the at least one processor is further configured to:
  transmit a graphical display of a geography divided into sub-areas to the data input terminal;
  scrape the Internet for policymaking data associated with multiple government bodies;
  tag specific government data to corresponding sub-areas;
  receive, from a user of the data input terminal, a term of interest;
  cause the graphical display to indicate for each sub-area, whether the term of interest appears in policymaking data corresponding to each sub-area;
  enable the user to interact with the graphical display in a manner permitting the user to select a sub-area;
  receive, from the user of the data input terminal, a selected sub-area; and
  transmit to the data input terminal, after receiving the selected sub-area, scraped government data associated with the selected sub-area and which contains the term of interest.

7. The system of claim 6, wherein at least one of the government bodies includes a legislature and the policymaking data corresponds to legislation.

8. The system of claim 6, wherein at least one of the government bodies includes an administrative department and the policymaking data corresponds to one or more regulations.

9. The system of claim 6, wherein at least one of the government bodies includes a court and the policymaking data corresponds to one or more court decisions.

10. The system of claim 7, wherein the at least one processor is further configured to cause display to the user of a number of pieces of legislation that are associated with the selected sub-area.

11. The system of claim 7, wherein the processor is further configured to receive, from the user, a request to filter a presentation to a specific legislative session, and wherein, in response to the request to filter, the at least one processor is further configured, after receiving the selection of the sub-area, display only scraped information relating to the specific legislative session.

12. The system of claim 6, wherein enabling the user to interact with the graphical display includes enabling a user to hover a cursor over a sub-area, and to receive data in response to the hovering.

13. The system of claim 6, wherein enabling the user to interact with the graphical display includes enabling a user to click on a sub-area, and to receive data in response to the clicking.

14. The system of claim 6, wherein the government enactment data presented to the user includes at least one of a bill number, a designation for the sub-area, a session, a title, a description, a status, or at least one prediction relating to a likelihood of passage of the government enactment data.

15. The system of claim 1, wherein the at least one future event involves a vote on a legislative bill, and the processor is further configured to access one or more websites of government bodies to identify pending legislation related to the query.

16. The system of claim 1, wherein the at least one future event involves adoption of a government regulation, and the processor is further configured to access one or more websites of government bodies to identify pending regulations related to the query.

17. The system of claim 1, wherein the at least one future even involves a decision in a court case, and the processor is further configured to access one or more websites of government bodies to identify pending cases related to the query.

18. The system of claim 1, wherein the proprietary information includes data obtained through proprietary research.

19. The system of claim 15, wherein the processor is further configured to determine the initial likelihood indication based on identified legislators supporting and opposing a legislative bill, and an influence measure associated with each of the identified legislators.

20. The system of claim 15, wherein the processor is further configured to determine the initial likelihood indication based on voting histories of legislators.

21. A method for aggregating electronic data from at least one Internet server and proprietary data to identify and initially predict an outcome of a future policymaking event decided by a plurality of policymakers and to subsequently update the initial prediction, the method comprising:
  generating and transmitting, to a data input terminal, a first interactive interface configured to receive a query;
  receiving the query from the data input terminal using the first interactive interface;
  identifying, based on the query, at least one future policymaking event;
  accessing data scraped from the Internet, the data being associated with the at least one future policymaking event;
  storing the scraped data;
  determining, from the scraped data, initial predictions of how the plurality of policymakers will decide with respect to the at least one future policymaking event;
  aggregating the predictions to determine an initial prediction of the outcome of the at least one future policymaking event;
  generating, from the scraped data, initial likelihoods associated with the predictions;
  aggregating the likelihoods to determine an initial likelihood indication associated with the initial prediction;
  generating a second interactive interface with the initial prediction and the initial likelihood and configured to receive user input related to the at least one policymaker;
  transmitting the initial prediction and the initial likelihood indication to the data input terminal by transmitting the second interactive interface;
  using the second interactive interface, receiving user input from the data input terminal including proprietary information, the proprietary information being related to at least one policymaker and privy to the user;
  storing the proprietary information;
  in response to receiving the user input, determining, using the scraped data and the proprietary information, at least one subsequent prediction for at least one policymaker and at least one subsequent likelihood associated with the at least one subsequent prediction;
  aggregating the at least one subsequent likelihood to determine a subsequent likelihood indication reflecting a change in the initial likelihood associated with the initial prediction;
  generating a third interactive interface with the subsequent likelihood indication; and
  transmitting the subsequent likelihood indication to the data input terminal by transmitting the third interactive interface.

22. A non-transitory computer readable storage media storing instructions for aggregating electronic data from at least one Internet server and proprietary data to identify and initially predict an outcome of a future policymaking event decided by a plurality of policymakers and to subsequently update the initial prediction, the instructions comprising:
  generating and transmitting, to a data input terminal, a first interactive interface configured to receive a query;
  receiving the query from the data input terminal using the first interactive interface;
  identifying, based on the query, at least one future policymaking event;
  accessing data scraped from the Internet, the data being associated with the at least one future policymaking event;
  storing the scraped data;
  determining, from the scraped data, initial predictions of how the plurality of policymakers will decide with respect to the at least one future policymaking event;
  aggregating the predictions to determine an initial prediction of the outcome of the at least one future policymaking event;
  generating, from the scraped data, initial likelihoods associated with the predictions;
  aggregating the likelihoods to determine an initial likelihood indication associated with the initial prediction;
  generating a second interactive interface with the initial prediction and the initial likelihood and configured to receive user input related to the at least one policymaker;
  transmitting the initial prediction and the initial likelihood indication to the data input terminal by transmitting the second interactive interface;
  using the second interactive interface, receiving user input from the data input terminal including proprietary information, the proprietary information being related to at least one policymaker and privy to the user;
  storing the proprietary information;
  in response to receiving the user input, determining, using the scraped data and the proprietary information, at least one subsequent prediction for at least one policymaker and at least one subsequent likelihood associated with the at least one subsequent prediction;
  aggregating the at least one subsequent likelihood to determine a subsequent likelihood indication reflecting a change in the initial likelihood associated with the initial prediction;
  generating a third interactive interface with the subsequent likelihood indication; and
  transmitting the subsequent likelihood indication to the data input terminal by transmitting the third interactive interface.

23. A hybrid prediction system for aggregating electronic data from at least one Internet server and proprietary data, to identify and initially predict an outcome of a future policymaking event decided by a plurality of policymakers and to subsequently update the initial prediction, the system comprising:
- at least one processor configured to execute instructions; and
- a memory storing the instructions to:
    - access data scraped from the Internet, the data being associated with at least one future policymaking event;
    - store the scraped data;
    - generate a first set of multi-dimensional feature vectors for a plurality of the scraped data;
    - determine, from the first set of multi-dimensional features vectors, a plurality of likelihoods associated with the plurality of policymakers, a likelihood representing odds of a policymaker making a particular decision with respect to the at least one future policymaking event;
    - determine, based on an aggregation of the plurality of likelihoods, an initial prediction of the outcome of the at least one future policymaking event;
    - generate, based on an aggregation of the plurality of likelihoods, an initial likelihood indication associated with the initial prediction;
    - generate a first interactive interface with the initial prediction and the initial likelihood and configured to receive user input related to the at least one policymaker;
    - transmit the initial prediction and the initial likelihood indication to a device by transmitting the first interactive interface;
    - automatically receive proprietary information obtained through automated scraping of at least one proprietary data source;
    - store the proprietary information;
    - generate at least one of a second set of multi-dimensional feature vectors or an update to the first set of multi-dimensional feature vectors for the proprietary information;
    - determine, from the first set of multi-dimensional features vectors and the at least one of the second set of multi-dimensional feature vectors or the update to the first set of multi-dimensional feature vectors, an update to the plurality of likelihoods, the update representing a change in at least one likelihood associated with at least one policymaker;
    - determine, using the update to the plurality of likelihoods, a subsequent likelihood indication reflecting a change in the initial likelihood associated with the initial prediction;
    - generate a second interactive interface with the subsequent likelihood indication; and
    - transmit the subsequent likelihood indication to the device by transmitting the second interactive interface.

* * * * *